(12) United States Patent
Vitale et al.

(10) Patent No.: US 11,662,651 B2
(45) Date of Patent: May 30, 2023

(54) CAMERA AND CAMERA MOUNT

(71) Applicant: GoPro, Inc., San Mateo, CA (US)

(72) Inventors: Nicholas Vitale, Foster City, CA (US); John George Muhlenkamp, IV, Brisbane, CA (US); Huy Phuong Nguyen, San Mateo, CA (US); Marco Marroquin, San Mateo, CA (US); Nicholas D. Woodman, Big Sky, MT (US); Kielan C. Crow, San Mateo, CA (US)

(73) Assignee: GoPro, Inc., San Mateo, CA (US)

( * ) Notice: Subject to any disclaimer, the term of this patent is extended or adjusted under 35 U.S.C. 154(b) by 23 days.

(21) Appl. No.: 17/181,163

(22) Filed: Feb. 22, 2021

(65) Prior Publication Data

US 2021/0173288 A1 Jun. 10, 2021

Related U.S. Application Data

(63) Continuation of application No. 16/697,947, filed on Nov. 27, 2019, now Pat. No. 10,928,711, which is a
(Continued)

(51) Int. Cl.
*G03B 17/56* (2021.01)
*F16M 11/12* (2006.01)
(Continued)

(52) U.S. Cl.
CPC ......... *G03B 17/561* (2013.01); *F16M 11/121* (2013.01); *G03B 17/08* (2013.01); *H04N 5/2254* (2013.01)

(58) Field of Classification Search
CPC .............................. G03B 17/561; F16M 13/00
See application file for complete search history.

(56) References Cited

U.S. PATENT DOCUMENTS 1,467,556 A 9/1923 Nagel
1,612,277 A 12/1926 Leo
(Continued)

FOREIGN PATENT DOCUMENTS

CN 1740899 A 3/2006
CN 100432830 11/2008
(Continued)

OTHER PUBLICATIONS

'Day of the (most recent) update in DPMAregister' (German Patent and Trademark Office) Jul. 5, 2014 (Jul. 5, 2014), 19 Pages, [ONLINE] retrieved from DPMAregister <URL:https://register.dpma.de/DPMAregister/pat/register/PAT2020130052392_2015-10-137AKZ=2020130052392&VIEW=pdf >, (used to establish publication date of 'File Inspection' publication by Maas listed directly above).
(Continued)

*Primary Examiner* — Noam Reisner
(74) *Attorney, Agent, or Firm* — Young Basile Hanlon & MacFarlane, P.C.

(57) ABSTRACT

An electronic device includes a body, electronic components contained in the body, and two finger members. The two finger members movable relative to the body between an extended state and a collapsed state. In the extended state, the two finger members extend outward from the body for receipt by a mount of an external support. In the collapsed state, the two finger members are collapsed toward the body. In the extended state, the two finger members may extend parallel with each other for receipt in parallel slots of the mount of the external support.

20 Claims, 23 Drawing Sheets

Related U.S. Application Data continuation-in-part of application No. PCT/US2019/045281, filed on Aug. 6, 2019.

(60) Provisional application No. 62/881,023, filed on Jul. 31, 2019, provisional application No. 62/868,099, filed on Jun. 28, 2019, provisional application No. 62/786,059, filed on Dec. 28, 2018, provisional application No. 62/715,794, filed on Aug. 7, 2018.

(51) Int. Cl.
*G03B 17/08* (2021.01)
*H04N 5/225* (2006.01)

(56) References Cited

U.S. PATENT DOCUMENTS

| | | |
|---|---|---|
| D118,296 S | 12/1939 | Tuomey |
| 2,651,981 A | 9/1953 | Calhoun |
| 2,890,067 A | 6/1959 | Morin |
| 2,962,251 A | 11/1960 | Nikolaus |
| 3,073,227 A | 1/1963 | Richard |
| 3,508,482 A | 4/1970 | Taylor |
| D219,768 S | 1/1971 | Conwill |
| 3,762,797 A | 10/1973 | Heller |
| 3,776,649 A | 12/1973 | Kemezys |
| 3,860,937 A | 1/1975 | Wolfe |
| D243,655 S | 3/1977 | Matousek |
| 4,025,930 A | 5/1977 | Wolff |
| 4,091,402 A | 5/1978 | Siegel |
| 4,208,028 A | 6/1980 | Brown |
| D272,392 S | 1/1984 | Bigelow |
| 4,646,141 A | 2/1987 | Timmermans |
| 4,733,259 A | 3/1988 | Ng |
| 4,763,151 A | 8/1988 | Klinger |
| 4,837,817 A | 6/1989 | Maemori |
| 4,864,335 A | 9/1989 | Corrales |
| 4,887,161 A | 12/1989 | Watanabe |
| 4,888,795 A | 12/1989 | Ando |
| 5,021,813 A | 6/1991 | Corrales |
| 5,092,458 A | 3/1992 | Yokoyama |
| 5,244,326 A | 9/1993 | Henriksen |
| 5,294,988 A | 3/1994 | Wakabayashi |
| 5,327,265 A | 7/1994 | McDonald |
| 5,336,086 A | 8/1994 | Simmen |
| 5,400,234 A | 3/1995 | Yu |
| 5,429,466 A | 7/1995 | Nagayama |
| D363,562 S | 10/1995 | Schildt |
| 5,485,357 A | 1/1996 | Zolninger |
| 5,486,852 A | 1/1996 | Arai |
| 5,505,424 A | 4/1996 | Niemann |
| D373,947 S | 9/1996 | Parduhn |
| 5,563,661 A | 10/1996 | Takahashi |
| 5,627,587 A | 5/1997 | Murata |
| 5,657,081 A | 8/1997 | Kurahashi |
| 5,661,823 A | 8/1997 | Yamauchi |
| D391,217 S | 2/1998 | Pingel |
| 5,729,289 A | 3/1998 | Etoh |
| 5,769,370 A | 6/1998 | Ashjaee |
| 5,775,558 A | 7/1998 | Montalbano |
| 5,805,219 A | 9/1998 | Ejima |
| 5,808,663 A | 9/1998 | Okaya |
| 5,842,069 A | 11/1998 | Konno |
| 5,887,375 A | 3/1999 | Watson |
| 5,926,218 A | 7/1999 | Smith |
| 5,938,492 A | 8/1999 | Carlini |
| 5,946,501 A | 8/1999 | Hayakawa |
| 5,969,750 A | 10/1999 | Hsieh |
| D418,044 S | 12/1999 | Schoeneweis |
| 6,034,728 A | 3/2000 | Arena |
| 6,035,147 A | 3/2000 | Kurosawa |
| 6,104,887 A | 8/2000 | Hamasaki |
| 6,118,929 A | 9/2000 | Kawamura |
| 6,128,441 A | 10/2000 | Kamata |
| 6,138,826 A | 10/2000 | Kanamori |
| D437,772 S | 2/2001 | Erwin |
| D441,386 S | 5/2001 | Yamazaki |
| D442,982 S | 5/2001 | Adachi |
| 6,315,180 B1 | 11/2001 | Watkins |
| 6,332,146 B1 | 12/2001 | Jebens |
| 6,360,928 B1 | 3/2002 | Russo |
| D460,474 S | 7/2002 | Gotham, Sr. |
| D462,893 S | 9/2002 | Sung |
| 6,480,671 B2 | 11/2002 | Takahashi |
| 6,483,542 B1 | 11/2002 | Morinaga |
| D467,605 S | 12/2002 | Dordick |
| 6,530,784 B1 | 3/2003 | Yim |
| 6,583,809 B1 | 6/2003 | Fujiwara |
| 6,654,235 B2 | 11/2003 | Imsand |
| D483,789 S | 12/2003 | Dordick |
| 6,727,954 B1 | 4/2004 | Hiroyuki |
| 6,741,287 B1 | 5/2004 | Fuchimukai |
| D491,968 S | 6/2004 | Isshiki |
| D492,893 S | 7/2004 | Oddsen, Jr |
| D494,450 S | 8/2004 | Schultz |
| 6,809,759 B1 | 10/2004 | Chiang |
| D504,904 S | 5/2005 | Nagai |
| 6,955,484 B2 | 10/2005 | Woodman |
| D511,960 S | 11/2005 | Ogino |
| D515,121 S | 2/2006 | Bleau |
| D515,613 S | 2/2006 | Holmes |
| D515,910 S | 2/2006 | Gates |
| 7,011,460 B1 | 3/2006 | Todd |
| 7,060,921 B2 | 6/2006 | Kubo |
| 7,077,582 B2 | 7/2006 | Johnson |
| 7,129,981 B2 | 10/2006 | Berstis |
| 7,185,862 B1 | 3/2007 | Yang |
| 7,196,722 B2 | 3/2007 | White |
| 7,226,261 B1 | 6/2007 | Bristol |
| D551,969 S | 10/2007 | Aurilio |
| 7,285,879 B2 | 10/2007 | Osaka |
| 7,295,388 B2 | 11/2007 | Shyu |
| D559,083 S | 1/2008 | Brassard |
| 7,327,396 B2 | 2/2008 | Schultz |
| 7,337,403 B2 | 2/2008 | Pavley |
| 7,362,352 B2 | 4/2008 | Ueyama |
| 7,379,664 B2 | 5/2008 | Marcus |
| D571,188 S | 6/2008 | Brassard |
| D576,486 S | 9/2008 | Koza |
| D577,729 S | 9/2008 | Derry |
| D577,731 S | 9/2008 | Altonji |
| 7,440,693 B2 | 10/2008 | Kouchi |
| D581,255 S | 11/2008 | Calvin |
| D582,955 S | 12/2008 | Sekine |
| 7,463,304 B2 | 12/2008 | Murray |
| 7,464,215 B2 | 12/2008 | Kawai |
| 7,496,293 B2 | 2/2009 | Shamir |
| 7,508,420 B2 | 3/2009 | Kitajima |
| D591,325 S | 4/2009 | Dordick |
| 7,537,399 B2 | 5/2009 | Mayumi |
| 7,543,327 B1 | 6/2009 | Kaplinsky |
| D596,217 S | 7/2009 | Kim |
| D596,658 S | 7/2009 | Dordick |
| 7,612,821 B1 | 11/2009 | Hsia |
| 7,613,386 B2 | 11/2009 | Shimamura |
| 7,643,056 B2 | 1/2010 | Silsby |
| 7,656,294 B2 | 2/2010 | Boss |
| 7,663,666 B2 | 2/2010 | Kawai |
| 7,671,886 B2 | 3/2010 | Sawada |
| 7,674,081 B2 | 3/2010 | Selle |
| D616,286 S | 5/2010 | Foresman |
| D616,480 S | 5/2010 | Ookawa |
| D616,742 S | 6/2010 | Lymn |
| 7,728,905 B2 | 6/2010 | Tanaka |
| 7,752,732 B2 | 7/2010 | Brown |
| 7,801,425 B2 | 9/2010 | Fantone |
| D625,750 S | 10/2010 | Dittmer |
| 7,823,771 B2 | 11/2010 | Sawachi |
| D635,445 S | 4/2011 | Foresman |
| D640,304 S | 6/2011 | Green |
| 8,013,932 B2 | 9/2011 | Chan |
| 8,014,656 B2 | 9/2011 | Woodman |
| 8,026,945 B2 | 9/2011 | Garoutte |
| D646,313 S | 10/2011 | Woodman |

(56) References Cited

U.S. PATENT DOCUMENTS

| | | |
|---|---|---|
| 8,031,222 B2 | 10/2011 | Crinon |
| D657,808 S | 4/2012 | Woodman |
| 8,150,248 B1 | 4/2012 | Woodman |
| 8,194,145 B2 | 6/2012 | Lee |
| 8,194,174 B2 | 6/2012 | Roskowski |
| 8,199,251 B2 | 6/2012 | Woodman |
| 8,218,025 B2 | 7/2012 | Yonaha |
| 8,235,635 B1 | 8/2012 | Brown |
| 8,267,361 B1 | 9/2012 | Dordick |
| 8,300,107 B2 | 10/2012 | Strandwitz |
| D671,394 S | 11/2012 | Derry |
| 8,325,270 B2 | 12/2012 | Woodman |
| 8,328,055 B1 | 12/2012 | Snyder |
| D675,242 S | 1/2013 | O'Donnell |
| 8,348,214 B2 | 1/2013 | Vogt |
| 8,356,948 B2 | 1/2013 | Onishi |
| 8,368,748 B2 | 2/2013 | Ho |
| 8,371,729 B2 | 2/2013 | Sharrah |
| D679,576 S | 4/2013 | Paul |
| D680,097 S | 4/2013 | Davies |
| D683,207 S | 5/2013 | Papadopoulos |
| 8,467,675 B2 | 6/2013 | Chen |
| 8,485,910 B2 | 7/2013 | Selle |
| D690,280 S | 9/2013 | Schul |
| 8,542,308 B2 | 9/2013 | Ozawa |
| 8,544,643 B2 | 10/2013 | Yim |
| 8,638,392 B2 | 1/2014 | Woodman |
| D699,276 S | 2/2014 | Samuels |
| D699,277 S | 2/2014 | Samuels |
| D700,166 S | 2/2014 | Petersen |
| D701,840 S | 4/2014 | Kazakia |
| D702,276 S | 4/2014 | Woodman |
| 8,727,642 B1 | 5/2014 | Tse |
| 8,743,277 B2 | 6/2014 | Matsuzawa |
| 8,749,966 B1 | 6/2014 | Boudreau |
| 8,792,003 B2 | 7/2014 | Nakamura |
| 8,807,849 B2 | 8/2014 | Apter |
| D713,868 S | 9/2014 | Yang |
| 8,825,124 B1 | 9/2014 | Davies |
| 8,827,219 B2 | 9/2014 | Kessler |
| 8,830,326 B2 | 9/2014 | Kitagawa |
| 8,837,928 B1 | 9/2014 | Clearman |
| 8,870,475 B1 | 10/2014 | Bennett |
| D718,617 S | 12/2014 | Taylor |
| 8,917,496 B2 | 12/2014 | Richardson |
| D722,864 S | 2/2015 | Greenthal |
| D724,637 S | 3/2015 | Samuels |
| D724,638 S | 3/2015 | Samuels |
| 8,970,689 B2 | 3/2015 | Campbell |
| 8,992,102 B1 | 3/2015 | Samuels |
| D727,387 S | 4/2015 | Hasegawa |
| D727,991 S | 4/2015 | Hasegawa |
| 9,004,783 B1 | 4/2015 | Woodman |
| 9,014,766 B2 | 4/2015 | Hu |
| D729,059 S | 5/2015 | Taylor |
| D729,761 S | 5/2015 | Hu |
| D729,762 S | 5/2015 | Hu |
| D730,423 S | 5/2015 | Vandenbussche |
| 9,033,596 B2 | 5/2015 | Samuels |
| D732,593 S | 6/2015 | Woodman |
| D732,933 S | 6/2015 | Jansen |
| 9,097,962 B2 | 8/2015 | Johnson, Sr. |
| 9,122,133 B2 | 9/2015 | Bennett |
| 9,152,019 B2 | 10/2015 | Kintner |
| 9,161,110 B1 | 10/2015 | Patsis |
| 9,204,022 B2 | 12/2015 | Campbell |
| 9,204,710 B1 | 12/2015 | Burns |
| 9,229,299 B2 | 1/2016 | Morlon |
| 9,243,737 B2 | 1/2016 | Hida |
| 9,243,739 B2 | 1/2016 | Peters |
| 9,244,337 B2 | 1/2016 | Weihe |
| D749,164 S | 2/2016 | Raccah |
| 9,268,200 B2 | 2/2016 | Clearman |
| 9,268,201 B1 | 2/2016 | Montgomery |
| D750,687 S | 3/2016 | Samuels |
| 9,282,226 B2 | 3/2016 | Samuels |
| 9,297,616 B2 | 3/2016 | Daniel |
| 9,297,640 B2 | 3/2016 | Tassakos |
| 9,300,345 B2 | 3/2016 | Johnson |
| D754,238 S | 4/2016 | Woodman |
| 9,357,115 B2 | 5/2016 | Campbell |
| 9,360,742 B1 | 6/2016 | Harrison |
| 9,372,383 B2 | 6/2016 | Johnson |
| 9,377,672 B1 | 6/2016 | Clearman |
| 9,395,031 B1 | 7/2016 | Clearman |
| 9,395,603 B2 | 7/2016 | Achenbach |
| D762,536 S | 8/2016 | Wurzer |
| D764,566 S | 8/2016 | Bennett |
| D764,567 S | 8/2016 | Bennett |
| 9,423,673 B2 | 8/2016 | Clearman |
| 9,426,341 B1 | 8/2016 | Baldrige |
| 9,507,245 B1 | 11/2016 | Druker |
| 9,513,535 B2 | 12/2016 | Bennett |
| 9,521,302 B2 | 12/2016 | Samuels |
| D776,746 S | 1/2017 | Bennett |
| D777,240 S | 1/2017 | Costa |
| 9,551,915 B2 | 1/2017 | Clearman |
| D780,249 S | 2/2017 | Ramsthaler |
| 9,588,407 B1 | 3/2017 | Harrison |
| 9,596,388 B2 | 3/2017 | Woodman |
| 9,622,556 B2 | 4/2017 | Fathollahi |
| 9,625,791 B2 | 4/2017 | Harrison |
| 9,628,681 B2 | 4/2017 | Clearman |
| 9,635,226 B2 | 4/2017 | Samuels |
| 9,661,197 B2 | 5/2017 | Clearman |
| 9,681,029 B2 | 6/2017 | Harrison |
| 9,699,360 B2 | 7/2017 | Woodman |
| D795,061 S | 8/2017 | Bacallao |
| 9,736,376 B1 | 8/2017 | Holway |
| 9,763,548 B2 | 9/2017 | Theising |
| 9,772,542 B2 | 9/2017 | Clearman |
| D799,953 S | 10/2017 | Papafagos |
| D800,205 S | 10/2017 | Harrison |
| D800,822 S | 10/2017 | Costa |
| 9,823,549 B1 | 11/2017 | Miyashita |
| 9,829,772 B2 | 11/2017 | Harrison |
| 9,851,622 B2 | 12/2017 | Song |
| 9,864,257 B1 | 1/2018 | Wroblewski |
| 9,880,451 B2 | 1/2018 | Clearman |
| D811,335 S | 2/2018 | Weng |
| 9,904,148 B1 | 2/2018 | Druker |
| 9,915,855 B1 | 3/2018 | Miyashita |
| 9,926,029 B2 | 3/2018 | Rucker |
| 9,930,231 B2 | 3/2018 | Clearman |
| D818,517 S | 5/2018 | Szarawarski |
| 10,025,166 B2 | 7/2018 | Clearman |
| 10,094,513 B2 | 10/2018 | Bennett |
| D837,623 S | 1/2019 | Powers |
| D839,946 S | 2/2019 | De Vries |
| D840,795 S | 2/2019 | Tribbett |
| D841,721 S | 2/2019 | Muhlenkamp, IV |
| D847,609 S | 5/2019 | Ng |
| 10,306,115 B2 | 5/2019 | Samuels |
| 10,356,291 B2 | 7/2019 | Woodman |
| 10,416,538 B2 | 9/2019 | Clearman |
| 10,511,750 B2 | 12/2019 | Clearman |
| D873,833 S | 1/2020 | Leimer |
| 10,539,858 B2 | 1/2020 | Clearman |
| 10,547,769 B2 | 1/2020 | Harrison |
| D874,248 S | 2/2020 | Stekr |
| D879,762 S | 3/2020 | Luo |
| D894,256 S | 8/2020 | Vitale |
| D905,786 S | 12/2020 | Vitale |
| 10,928,711 B2 | 2/2021 | Vitale |
| D947,357 S | 3/2022 | Chen |
| 2001/0017339 A1 | 8/2001 | Brotz |
| 2001/0043281 A1 | 11/2001 | Onuki |
| 2002/0005907 A1 | 1/2002 | Alten |
| 2002/0046218 A1 | 4/2002 | Gilbert |
| 2002/0101534 A1 | 8/2002 | Liu |
| 2002/0178116 A1 | 11/2002 | Yamasaki |
| 2003/0035052 A1 | 2/2003 | Baron |
| 2003/0085244 A1 | 5/2003 | Parsons |
| 2003/0104806 A1 | 6/2003 | Ruef |

(56) References Cited

U.S. PATENT DOCUMENTS

| | | |
|---|---|---|
| 2003/0115662 A1 | 6/2003 | Dobbie |
| 2003/0156212 A1 | 8/2003 | Kingetsu |
| 2003/0179306 A1 | 9/2003 | Lee |
| 2004/0066457 A1 | 4/2004 | Silverstein |
| 2004/0076415 A1 | 4/2004 | Da |
| 2004/0095506 A1 | 5/2004 | Scott |
| 2004/0201745 A1 | 10/2004 | Wess |
| 2004/0212687 A1 | 10/2004 | Patwari |
| 2004/0223752 A1 | 11/2004 | Ghanouni |
| 2005/0025472 A1 | 2/2005 | Sugita |
| 2005/0041966 A1 | 2/2005 | Johnson |
| 2005/0122424 A1 | 6/2005 | Overstreet |
| 2005/0190263 A1 | 9/2005 | Monroe |
| 2005/0265711 A1 | 12/2005 | Heibel |
| 2006/0007551 A1 | 1/2006 | Sakurai |
| 2006/0015664 A1 | 1/2006 | Zhang |
| 2006/0022108 A1 | 2/2006 | Kuga |
| 2006/0061663 A1 | 3/2006 | Park |
| 2006/0066753 A1 | 3/2006 | Gennetten |
| 2006/0072020 A1 | 4/2006 | McCutchen |
| 2006/0098966 A1 | 5/2006 | Takahashi |
| 2006/0139459 A1 | 6/2006 | Zhong |
| 2006/0177215 A1 | 8/2006 | Johnson |
| 2006/0257137 A1 | 11/2006 | Fromm |
| 2006/0262365 A1 | 11/2006 | Imao |
| 2006/0274157 A1 | 12/2006 | Levien |
| 2006/0274493 A1 | 12/2006 | Richardson |
| 2007/0024734 A1 | 2/2007 | Headley |
| 2007/0025711 A1 | 2/2007 | Marcus |
| 2007/0053680 A1 | 3/2007 | Fromm |
| 2007/0071423 A1 | 3/2007 | Fantone |
| 2007/0077062 A1 | 4/2007 | Senba |
| 2007/0109417 A1 | 5/2007 | Hyttfors |
| 2007/0126883 A1 | 6/2007 | Ishige |
| 2007/0140686 A1 | 6/2007 | Misawa |
| 2007/0154254 A1 | 7/2007 | Bevirt |
| 2007/0242134 A1 | 10/2007 | Zernov |
| 2007/0244634 A1 | 10/2007 | Koch |
| 2007/0268382 A1 | 11/2007 | Shiomi |
| 2007/0268588 A1 | 11/2007 | Elias |
| 2008/0011344 A1 | 1/2008 | Barker |
| 2008/0023607 A1 | 1/2008 | Barker |
| 2008/0063392 A1 | 3/2008 | Ahn |
| 2008/0072163 A1 | 3/2008 | Teng |
| 2008/0074487 A1 | 3/2008 | Ryckman |
| 2008/0100712 A1 | 5/2008 | Hayes |
| 2008/0107414 A1 | 5/2008 | Showalter |
| 2008/0117328 A1 | 5/2008 | Daoud |
| 2008/0122958 A1 | 5/2008 | Huseth |
| 2008/0180537 A1 | 7/2008 | Weinberg |
| 2008/0237414 A1 | 10/2008 | Lien |
| 2008/0248703 A1 | 10/2008 | Russell |
| 2008/0266389 A1 | 10/2008 | Dewind |
| 2008/0267613 A1 | 10/2008 | Darrow |
| 2008/0316327 A1 | 12/2008 | Steinberg |
| 2008/0316734 A1 | 12/2008 | Spartano |
| 2009/0003821 A1 | 1/2009 | Son |
| 2009/0032420 A1 | 2/2009 | Zenzai |
| 2009/0059064 A1 | 3/2009 | Terakado |
| 2009/0109286 A1 | 4/2009 | Ennis |
| 2009/0110380 A1 | 4/2009 | Fantone |
| 2009/0111543 A1 | 4/2009 | Tai |
| 2009/0173863 A1 | 7/2009 | Crown |
| 2009/0206077 A1 | 8/2009 | Melmon |
| 2009/0283184 A1 | 11/2009 | Han |
| 2009/0321483 A1 | 12/2009 | Froloff |
| 2010/0060747 A1 | 3/2010 | Woodman |
| 2010/0061711 A1 | 3/2010 | Woodman |
| 2010/0079607 A1 | 4/2010 | Won |
| 2010/0118158 A1 | 5/2010 | Boland |
| 2010/0141762 A1 | 6/2010 | Siann |
| 2010/0205537 A1 | 8/2010 | Knighton |
| 2010/0220188 A1 | 9/2010 | Renkis |
| 2010/0229450 A1 | 9/2010 | Becker |
| 2010/0246669 A1 | 9/2010 | Harel |
| 2010/0252188 A1 | 10/2010 | Inanami |
| 2010/0253832 A1 | 10/2010 | Duparre |
| 2010/0266273 A1 | 10/2010 | Wood |
| 2010/0283843 A1 | 11/2010 | Cai |
| 2010/0289904 A1 | 11/2010 | Zhang |
| 2010/0299814 A1 | 12/2010 | Celona |
| 2010/0333155 A1 | 12/2010 | Royall |
| 2011/0001834 A1 | 1/2011 | Herrell |
| 2011/0042530 A1 | 2/2011 | Phillips |
| 2011/0064401 A1 | 3/2011 | Desorbo |
| 2011/0129210 A1 | 6/2011 | McGucken |
| 2011/0138673 A1 | 6/2011 | Deros |
| 2011/0147245 A1 | 6/2011 | Yim |
| 2011/0211820 A1 | 9/2011 | Yim |
| 2011/0216195 A1 | 9/2011 | Tanaka |
| 2011/0224798 A1 | 9/2011 | Caillouette |
| 2011/0252188 A1 | 10/2011 | Weingarten |
| 2011/0260022 A1 | 10/2011 | Lin |
| 2011/0297578 A1 | 12/2011 | Stiehl |
| 2011/0298970 A1 | 12/2011 | Shinohara |
| 2011/0317065 A1 | 12/2011 | Lin |
| 2012/0017922 A1 | 1/2012 | Hirshberg |
| 2012/0043236 A1 | 2/2012 | Szucs |
| 2012/0070223 A1 | 3/2012 | Wimberley |
| 2012/0099849 A1 | 4/2012 | Onishi |
| 2012/0120236 A1 | 5/2012 | Xiao |
| 2012/0133758 A1 | 5/2012 | Foss |
| 2012/0195585 A1 | 8/2012 | Wagner |
| 2012/0224078 A1 | 9/2012 | Woodman |
| 2012/0228346 A1* | 9/2012 | Huang ................. A45F 5/00 224/218 |
| 2012/0240444 A1 | 9/2012 | Russell |
| 2012/0242785 A1 | 9/2012 | Sasagawa |
| 2012/0242786 A1 | 9/2012 | Sasagawa |
| 2012/0262618 A1 | 10/2012 | Weakly |
| 2012/0288269 A1 | 11/2012 | Jensen |
| 2012/0312309 A1 | 12/2012 | Zimmerman |
| 2012/0315813 A1 | 12/2012 | Rossini |
| 2012/0324682 A1 | 12/2012 | Ballentine |
| 2013/0029515 A1 | 1/2013 | Lin |
| 2013/0057758 A1 | 3/2013 | Woodman |
| 2013/0082963 A1 | 4/2013 | Chu |
| 2013/0107111 A1 | 5/2013 | Campbell |
| 2013/0127309 A1 | 5/2013 | Wyner |
| 2013/0148951 A1 | 6/2013 | Zhang |
| 2013/0170823 A1 | 7/2013 | McDonald |
| 2013/0184033 A1 | 7/2013 | Willenborg |
| 2013/0186310 A1 | 7/2013 | Lymberis |
| 2013/0250134 A1 | 9/2013 | McCauley |
| 2013/0263865 A1 | 10/2013 | Khast |
| 2013/0306689 A1 | 11/2013 | Johnson |
| 2013/0315577 A1 | 11/2013 | Clark |
| 2013/0324189 A1 | 12/2013 | Katis |
| 2013/0331976 A1 | 12/2013 | Freeman |
| 2014/0016922 A1 | 1/2014 | Greenthal |
| 2014/0027591 A1 | 1/2014 | Fountain |
| 2014/0028484 A1 | 1/2014 | Ho |
| 2014/0036420 A1 | 2/2014 | Chen |
| 2014/0050468 A1 | 2/2014 | Henry |
| 2014/0060582 A1 | 3/2014 | Hartranft |
| 2014/0066144 A1 | 3/2014 | Hong |
| 2014/0069824 A1 | 3/2014 | Kalashnikov |
| 2014/0098241 A1 | 4/2014 | Stout |
| 2014/0099093 A1 | 4/2014 | Johnson |
| 2014/0104447 A1 | 4/2014 | Woodman |
| 2014/0105589 A1 | 4/2014 | Samuels |
| 2014/0190841 A1 | 7/2014 | Nash |
| 2014/0226268 A1 | 8/2014 | Oneill |
| 2014/0231475 A1 | 8/2014 | Donnelly |
| 2014/0252188 A1 | 9/2014 | Webster |
| 2014/0267894 A1 | 9/2014 | Campbell |
| 2014/0321843 A1 | 10/2014 | Hulse |
| 2014/0353178 A1 | 12/2014 | Kim |
| 2015/0030320 A1 | 1/2015 | Clearman |
| 2015/0040917 A1 | 2/2015 | Gottsch |
| 2015/0078737 A1 | 3/2015 | Albonico |
| 2015/0122849 A1 | 5/2015 | Jones |
| 2015/0130998 A1 | 5/2015 | Campbell |
| 2015/0136620 A1 | 5/2015 | Williams |

(56) References Cited

U.S. PATENT DOCUMENTS

| | | | |
|---|---|---|---|
| 2015/0143618 A1 | 5/2015 | Pereira | |
| 2015/0171404 A1 | 6/2015 | Kwon | |
| 2015/0177597 A1 | 6/2015 | Harrison | |
| 2015/0180527 A1 | 6/2015 | Fathollahi | |
| 2015/0192841 A1 | 7/2015 | Bennett | |
| 2015/0195436 A1 | 7/2015 | Samuels | |
| 2015/0201113 A1* | 7/2015 | Wood | F16M 11/041 348/376 |
| 2015/0234258 A1 | 8/2015 | Hida | |
| 2015/0253651 A1 | 9/2015 | Russell | |
| 2015/0264226 A1 | 9/2015 | Gafni | |
| 2015/0286115 A1 | 10/2015 | Koch | |
| 2015/0286117 A1 | 10/2015 | Sung | |
| 2015/0288892 A1 | 10/2015 | Frank | |
| 2015/0305518 A1 | 10/2015 | Galant | |
| 2015/0312446 A1 | 10/2015 | Blackman | |
| 2015/0323856 A1 | 11/2015 | Nordhaug | |
| 2015/0332129 A1 | 11/2015 | Murphy | |
| 2015/0346588 A1 | 12/2015 | Hudson | |
| 2015/0366093 A1 | 12/2015 | Battista | |
| 2016/0077409 A1 | 3/2016 | Samuels | |
| 2016/0100083 A1 | 4/2016 | Harrison | |
| 2016/0119516 A1 | 4/2016 | Clearman | |
| 2016/0131963 A1 | 5/2016 | Clearman | |
| 2016/0131964 A1 | 5/2016 | Basulto | |
| 2016/0134788 A1 | 5/2016 | Clearman | |
| 2016/0139494 A1 | 5/2016 | Tien | |
| 2016/0186919 A1 | 6/2016 | Zhao | |
| 2016/0209733 A1 | 7/2016 | Akai | |
| 2016/0216597 A1 | 7/2016 | Lim | |
| 2016/0219202 A1 | 7/2016 | Barros | |
| 2016/0269629 A1 | 9/2016 | Martin | |
| 2016/0309064 A1 | 10/2016 | Woodman | |
| 2016/0330352 A1 | 11/2016 | Samuels | |
| 2016/0355121 A1 | 12/2016 | Gertsma | |
| 2016/0373623 A1 | 12/2016 | Woodman | |
| 2017/0050794 A1 | 2/2017 | Clark | |
| 2017/0059967 A1 | 3/2017 | Harrison | |
| 2017/0060184 A1 | 3/2017 | Ranetkins | |
| 2017/0090273 A1 | 3/2017 | Clearman | |
| 2017/0108759 A1 | 4/2017 | Clearman | |
| 2017/0142300 A1 | 5/2017 | Rice | |
| 2017/0176843 A1 | 6/2017 | Yamakose | |
| 2017/0223238 A1 | 8/2017 | Clearman | |
| 2017/0235213 A1 | 8/2017 | Clearman | |
| 2017/0255082 A1 | 9/2017 | Song | |
| 2017/0272626 A1 | 9/2017 | Harrison | |
| 2017/0289413 A1 | 10/2017 | Samuels | |
| 2017/0324890 A1 | 11/2017 | Moskovchenko | |
| 2017/0339319 A1 | 11/2017 | Woodman | |
| 2018/0059514 A1 | 3/2018 | Druker | |
| 2018/0095343 A1 | 4/2018 | Wroblewski | |
| 2018/0136546 A1 | 5/2018 | Clearman | |
| 2018/0157153 A1 | 6/2018 | Clearman | |
| 2018/0220050 A1 | 8/2018 | Clearman | |
| 2019/0025675 A1 | 1/2019 | Druker | |
| 2019/0238729 A1 | 8/2019 | Samuels | |
| 2019/0258142 A1 | 8/2019 | Liu | |
| 2019/0281197 A1 | 9/2019 | Woodman | |
| 2019/0342473 A1 | 11/2019 | Clearman | |
| 2019/0342474 A1 | 11/2019 | Woodman | |
| 2019/0369466 A1 | 12/2019 | Clearman | |
| 2020/0159091 A1 | 5/2020 | Vitale | |

FOREIGN PATENT DOCUMENTS

| | | |
|---|---|---|
| CN | 201796220 U | 4/2011 |
| CN | 202353622 U | 7/2012 |
| CN | 104871082 A | 8/2015 |
| CN | 105474089 | 4/2016 |
| CN | 106164768 | 11/2016 |
| CN | 106516141 A | 3/2017 |
| CN | 206579852 U | 10/2017 |
| CN | 109375454 | 2/2019 |
| CN | 110426910 | 11/2019 |
| DE | 202005004068 U1 | 6/2005 |
| DE | 202013005239 | 7/2013 |
| DE | 202014011346 | 8/2019 |
| EP | 0845399 A2 | 6/1998 |
| EP | 1653423 A1 | 5/2006 |
| EP | 2464096 A1 | 6/2012 |
| EP | 2906993 | 8/2015 |
| EP | 3025193 | 6/2016 |
| EP | 3092527 | 11/2016 |
| GB | 2018929 A | 10/1979 |
| GB | 2363028 A | 12/2001 |
| GB | 6006189 | 1/2017 |
| JP | H05304625 A | 11/1993 |
| JP | 2004080256 A | 3/2004 |
| JP | 2004221775 A | 8/2004 |
| JP | 2005142671 A | 6/2005 |
| JP | 2008109364 A | 5/2008 |
| JP | 2011193209 A | 9/2011 |
| WO | 2004023795 A1 | 3/2004 |
| WO | 2004081713 A2 | 9/2004 |
| WO | 2005096760 A2 | 10/2005 |
| WO | 2005098304 A1 | 10/2005 |
| WO | 2007128317 A1 | 11/2007 |
| WO | 2007130146 A1 | 11/2007 |
| WO | 2010005975 A1 | 1/2010 |
| WO | 2010005976 A1 | 1/2010 |
| WO | 2013067340 | 5/2013 |
| WO | 2014062360 A1 | 4/2014 |
| WO | 2015013054 A1 | 1/2015 |
| WO | 2015102888 A1 | 7/2015 |
| WO | 2016053472 | 4/2016 |
| WO | 2016064468 | 4/2016 |
| WO | 2016073188 | 5/2016 |

OTHER PUBLICATIONS

'GoPro Hero 3 Sports Wrist Camera Review,' PaddleDogNation, 2006, 6 pages, [Online] [Retrieved on Aug. 8, 2007] Retrieved from the Internet <URL:http://paddledognation.com/Reviews/PaddlingGearReviews/He-ro3Ca . . . >.

'Tekkno Trading Project—Brandnews,' NSP, Jan. 2008, p. 59.

"WoCase 360 Degree Panoramic Swiveling Glove Mount Hand Mount (Compatible with left handed) for GoPro HERO4 HERO3+3 2 1 Cameras (Rotary Mount, Retail Package, Gifting Ready)," Amazon.com, Jul. 11, 2013, 8 pages, [online] [retrieved on Feb. 22, 2020] Retrieved from the internet <URL:http://www.amazon.com/WoCase-Panoramic-Swiveling-Compatible-Cameras/dp/B00HMLYMHW/ref=pd_sim_sbs_421_1?ie=UTF8&dpID=51%2BoLD9jb2L&dpSrc=sims&preST=_AC_UL160_SR160%2C160_&refRID=097XMG8E8BDXQAJRSS0D>.

Canon, 'Wireless file Transmitter WFT-EF E,'2009, 132 pages, [Online] [Retrieved on Feb. 11, 2015] Retrieved from the lnternet<URL:http://shuttersnitch.com/downloads/manuals/canon/wft-e5-en.pdf.

CheesyCam.com, 'Remote LCD Live View + Remote Shutter for DSLR Video—Exciting!', Jul. 16, 2010, 12 pages, [Online] [Retrieved on Feb. 11, 2015] Retrieved from the lnternet<URL:http://cheesycam.com/remote-LCD-live-view-for-dslr-video-exciting/>.

Chinese Office Action dated May 30, 2018 forCN Application No. 201480072371.9, (6 pages).

Double male GoPro bar by eliotg Thingiverse. [online] Published on Jan. 16, 2016. Retrieved from URL:https://www.thingiverse.com/thing: 1273246 (2 pages).

European Search Report for European Patent Application No. EP 14876907.8, dated Jan. 10, 2017, 8 Pages.

Fantaseal Action Camera Bike Mount Aluminum Alloy 2-Rail Saddle Bike Seat Mount for GoPro Pro Seat Rail Mount GoPro Bike Mount GoPro Bicycle Seat Rack Mount for GoPro Garmin Virb XE SJCAM DBPOWER-BK. Online, published date unknown. Retrieved on May 23, 2018 from URL: https://www.amazon.com/fantaseal-Action-Camera-Bi (1 page).

File Inspection - DE 20 2013 005 239.2, (MAAS) Retrieved on Oct. 13, 2015 (Oct. 13, 2015) entire document, 4 Pages, [ONLINE]

(56) References Cited

OTHER PUBLICATIONS retrieved from DPMAregister <URL:https://registerdpma.de/DPMAregister/pat/PatAkteneinsicht?akz=2020130052392>.
Guarnera, M. et al., 'Manet: Possible Applications with PDA in Wireless Imagining Environment', IEEE International Symposium, Sep. 2002, vol. 7, pp. 2394-2398, vol. 5, pp. 15-18.
http://web.archive.org/web/20190503083635/http://www.fvshare.com:80/en/viltag Note—wayback machine link may take extra time to load pictures May 3, 2019, 8 pages.
https://www.amazon.com/Adjust-Straight-Joints-HSU-Direction/dp/B01IQPD9DU/ref=sr_1_1?keywords=long+and+short+straight+joint+tripod+mount+adapter+for+GoPro+hero+5+4+3&qid=1582047554&sr=8-1, retrieved Feb. 22, 2020, 9 pages.
https://www.amazon.com/Fotasy-Aluminum-Folding-Release-Cameras/dp/B0058FJHR4/ref=sr_1_8?keywords=z+tripod+mount&qid=1582047698&sr=8-8, retrieved Feb. 22, 2020, 10 pages.
https://www.amazon.com/Tripod-Pistol-Cameras-Weighing-2-5lbs/dp/B0739YGN9M/ref=sr_1_1?keywords=Handheld+Grip+Mini+Tripod+Stand+for+DC+Digital+Camera+Camcorder&qid=1582047442&sr=8-1, Retrieved Feb. 22, 2020, 9 pages.
https://www.youtube.com/watch?v=sOfMcPM5Xg4 (@7:08 mark), retrieved Feb. 22, 2020. NO pdf attached, please see video at link.
Huang, J., "Part 19 - Oct. 21: Interbike Bits and Baubles," Interbike Show, Las Vegas, Nevada, USA, Sep. 22-26, 2008, Cyclingnews.com, [Online] [Retrieved on Oct. 21, 2008] Retrieved from the Internet<URL:http://www.cyclingnews.com/tech/2008/shows/interbike08/?i- d=result . . . >. 3 pages.
I Phone X Outfitting it for Adventure, [online] Published on Nov. 29, 2017. Retrieved from URL: https://explore.globalcreations.com/reviews/tools/outfitting-iphone-x-adventure/ (13 pages).
Instagram Account for "mygomount", First post uploaded on Mar. 19, 2017, 3 Pages, [online] Retrieved on Jul. 25, 2017] Retrieved from the internet <URL:https://www.instagmm.com/mygomount/?h1 =en>.
International Preliminary Report on Patentability for App. No. PCT/US2019/045281, dated Feb. 18, 2021, 7 pages.
International Search Report and Written Opinion for Application No. PCT/US2019/045281, dated Oct. 24, 2019, 10 pages.
International Search Report and Written Opinion for International Application No. PCT/US2014/046552, dated Aug. 18, 2014, 7 pages.
ION USA, 'Wi-Fi PODZ,' Date Unknown, 2 pages. [Online] [Retrieved Oct. 11, 2016] Retrieved from the internet <https://usa.ioncamera.com/shop/wi-fi-podz/>.
JP-05304625 A, 1993, 5 pages, (Machine Translation available from JPO website), [Online]. [Retrieved Dec. 14, 2014], Retrieved from the Internet < http://dossier1.ipdl.inpit.go.jp/cgi-bin/tran_web_cgi_e-ije?u=http%3A%2F%2Fdossier1% . . . >.
JP5-304625 English Machine Translation available from JPO website. 7 pages.
Non-Final Rejection for U.S. Appl. No. 13/665,594 dated Mar. 29, 2013, 25 Pages.
Non-Final Rejection for U.S. Appl. No. 12/498,890 dated Aug. 30, 2011, 31 Pages.
Norouznezhad, E. et al. "A High Resolution Smart Camera with GigE Vision Extension for Surveillance Applications," Second ACM/IEEE International Conference on Distributed Smart Cameras, 2008, 8 pages.
Office Action for U.S. Appl. No. 14/521,458, filed Feb. 25, 2016, 13 Pages.
Office Action for U.S. Appl. No. 14/521,458, filed Jul. 28, 2015, 12 Pages.
PCT International Search Report and Written Opinion for PCT/US15/43958, dated Nov. 9, 2015, 14 Pages.
PCT International Search Report and Written Opinion for PCT/US15/45403, dated Nov. 19, 2015, 12 Pages.
PCT International Search Report and Written Opinion for PCT/US15/56478, dated Jan. 15, 2016, 9 Pages.
PCT International Search Report and Written Opinion for PCT/US2014/058465, dated Dec. 23, 2014, 17 pages.
PCT International Search Report and Written Opinion for PCT/US2014/070655, dated Apr. 29, 2015, 13 Pages.
PCT International Search Report and Written Opinion for PCT/US2015/028377, dated Jul. 24, 2015, 16 Pages.
PCT International Search Report and Written Opinion, PCT Application No. PCT/US2009/049821, dated Sep. 3, 2009, 8 pages.
PCT International Search Report and Written Opinion, PCT/US2012/063304, dated Jan. 22, 2013, 7 Pages.
PCT International Search Report for Written Opinion for PCT/US2013/062061, dated Mar. 3, 2014, 15 Pages.
Pro Camera Bracket Integrated Mount. Online, published date unknown. Retrieved on May 23, 2018 from URL: https://www.annaincycling.conn/pro-camera-bracket-integrated-mount-black-17-pro-saddle-connpatible-prac0129/p612468 (1 page).
Pro Standard, "The Grill Mount Multi-Function Mouth Mount," Date unknown, 8 Pages, [online] Retrieved on Jul. 25, 2017] Retrieved from the internet <URL:https://www.prostandard com/collections/pro-standard/products/the-grill-mount?variant=7683423299>.
Re-Fuel, '24hr Action Pack Battery for GoPro Hero4, Hero3+ & Hero3,' Date Unknown, 5 pages. [Online] [Retrieved Oct. 11, 2016] Retrieved from the internet <https://re-fuel.com/action-packs/24hr-action-battery-pack.html>.
Spypoint Xcel Action Camera Adhesive Mount XHD-AM. Online, published date unknown. Retrieved on May 14, 2020 from URL: https://www.opticsplanet.com/spy-point-xcel-action-camera-adhesive-mount.html, 1 page.
Sun, X. et al. "Region of Interest Extraction and Virtual Camera Control Based on Panoramic Video Capturing," IEEE Transactions on Multimedia, 2005, pp. 981-990, vol. 7, issue 5.
Supplementary European Search Report for European Patent Application No. EP 14829354, dated Aug. 16, 2016, 6 Pages.
United States Advisory Action, U.S. Appl. No. 14/521,458, filed Aug. 12, 2016, 2 pages.
United States Advisory Action, U.S. Appl. No. 14/521,458, filed Jun. 20, 2016, 4 pages.
United States Advisory Action, U.S. Appl. No. 14/947,766, filed Aug. 29, 2016, 3 pages.
United States Office Action for U.S. Appl. No. 14/148,536, filed Jul. 9, 2014, 9 pages.
United States Office Action for U.S. Appl. No. 14/536,683, filed Dec. 18, 2014, 14 Pages.
United States Office Action for U.S. Appl. No. 14/536,683, filed Jun. 9, 2015, 16 pages.
United States Office Action for U.S. Appl. No. 14/536,683, filed Sep. 21, 2015. 15 Pages.
United States Office Action for U.S. Appl. No. 13/666,807, filed Oct. 6, 2014, 11 pages.
United States Office Action for U.S. Appl. No. 14/149,502, filed Jul. 9, 2014, 8 pages.
United States Office Action for U.S. Appl. No. 14/495,673, filed Jan. 28, 2015, 16 pages.
United States Office Action for U.S. Appl. No. 14/495,673, filed Mar. 24, 2015, 15 pages.
United States Office Action for U.S. Appl. No. 14/495,673, filed Nov. 7, 2014, 16 pages.
United States Office Action for U.S. Appl. No. 14/604,118, filed Apr. 14, 2015, 11 pages.
United States Office Action, U.S. Appl. No. 14/459,650, filed Jun. 10, 2015, 7 pages.
United States Office Action, U.S. Appl. No. 14/132,554, filed Apr. 24, 2015, 13 pages.
United States Office Action, U.S. Appl. No. 14/132,554, filed Dec. 3, 2015, 28 pages.
United States Office Action, U.S. Appl. No. 14/132,554, filed Feb. 26, 2016, 31 pages.
United States Office Action, U.S. Appl. No. 14/854,040, filed Feb. 4, 2016, 7 pages.
United States Office Action, U.S. Appl. No. 14/521,458, filed Feb. 25, 2016, 13 pages.
United States Office Action, U.S. Appl. No. 14/521,458, filed Jul. 28, 2015, 12 pages.

(56) References Cited

OTHER PUBLICATIONS

United States Office Action, U.S. Appl. No. 14/521,458, filed Sep. 20, 2016, 16 pages.
United States Office Action, U.S. Appl. No. 14/606,018, filed Dec. 2, 2016, 19 pages.
United States Office Action, U.S. Appl. No. 14/606,018, filed Jan. 13, 2016, 16 pages.
United States Office Action, U.S. Appl. No. 14/606,018, filed Jul. 15, 2016, 21 pages.
United States Office Action, U.S. Appl. No. 14/606,018, filed Jun. 2, 2016, 19 pages.
United States Office Action, U.S. Appl. No. 14/947,766, filed Apr. 21, 2016, 13 pages.
United States Office Action, U.S. Appl. No. 14/947,766, filed Aug. 16, 2016, 6 pages.
United States Office Action, U.S. Appl. No. 14/947,766, filed Nov. 9, 2016, 11 pages.
United States Office Action, U.S. Appl. No. 15/180,535, filed Jan. 17, 2017, 12 pages.
United States Office Action, U.S. Appl. No. 15/187,708, filed Oct. 7, 2016, 13 pages.
Design U.S. Appl. No. 29/661,818, filed Aug. 31, 2018, 75 pages.
Design U.S. Appl. No. 29/661,819, filed Aug. 31, 2018, 77 pages.
Design U.S. Appl. No. 29/681,087, filed Feb. 22, 2019, 38 pages.
Design U.S. Appl. No. 29/694,559, filed Jun. 11, 2019, 25 pages.
Design U.S. Appl. No. 29/706,013, filed Sep. 17, 2019, 93 pages.
U.S. Appl. No. 16/697,947, filed Nov. 27, 2019, 73 pages.
Vilta-G-Freevision Intelligent Technology, URL:http://www.fvshare.com/en/viltag, retrieved on Feb. 22, 2020, 8 pages.
Vixen Polarie StarTracker Review, [online] Published date Mar. 22, 2013. Retrieved on Oct. 25, 2016 from <URL: https://www.ephotozine.com/article/vixen-polarie-star-tracker-review-21516> 6 pages.
Volk, W., 'Go Pro's Digital Hero Camera,' Divester, Posted Dec. 5, 2008, [Online] [Retrieved on Sep. 16, 2009] Retrieved from the Internet<URL:http://www.divester.com/2006/12/05/go-pro-digital-hero-camera/>. 3 pages.
YourDealer, 'Aputure Gigtube Digital Screen Remote Viewfinder gives you more remote control with most DSLRs,' 2009 Deals-World.com, Apr. 11, 2010, 3 pages, [Online] [Retrieved on Feb. 11, 2015] Retrieved from the Internet <URL:http://www.deals-world.com/deals/2010/04/11/aputure-gigtube-digital-screen-remote-viewfinder-gives-you-more-remote-control-with-most-dslrs/, Apr. 11, 2010.
Youtube.Com, Video for 'The Air Pro Wi-Fi Podz,' Aug. 18, 2014, 1 page, [Online] [Retrieved Oct. 11, 2016] Can be retrieved from the internet <URL:https://www.youtube.com/watch?v=YpWZ44aCdGA>.
Youtube.Com, Video for 'The WiFi PODZ Tutorial,' Jun. 15, 2012, 2 pages. [Online] [Retrieved Oct. 11, 2016] Can be retrieved from the internet <URL:https://www.youtube.com/watch?v=kGGwGobzQBg>.

\* cited by examiner

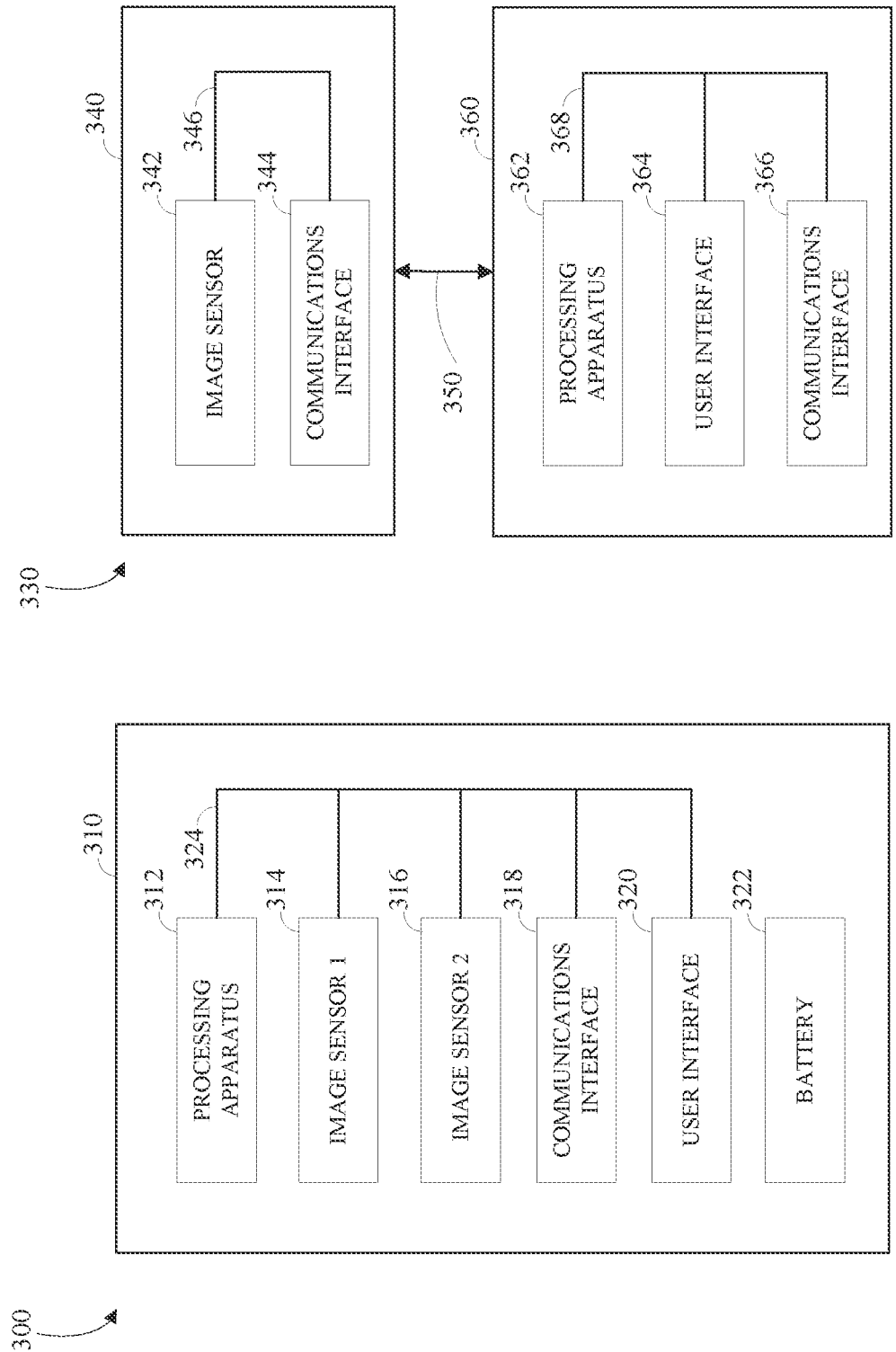

CAMERA AND CAMERA MOUNT

CROSS-REFERENCE TO RELATED APPLICATION(S)

This application is a continuation of U.S. application Ser. No. 16/697,947, filed Nov. 27, 2019, which is a continuation-in-part of PCT Application No. PCT/US2019/045281, filed Aug. 6, 2019, which claims priority to and the benefit of U.S. Provisional Application No. 62/881,023, filed Jul. 31, 2019, U.S. Provisional Application No. 62/868,099, filed Jun. 28, 2019, U.S. Provisional Application No. 62/786,059, filed Dec. 28, 2018, and U.S. Provisional Application No. 62/715,794, filed Aug. 7, 2018, the entire disclosures of which are hereby incorporated by reference.

TECHNICAL FIELD

This disclosure relates to electronic devices and, in particular, mounting systems for cameras.

SUMMARY

Disclosed herein are implementations of electronic devices and mounts thereof.

In one implementation, an electronic device includes a body, electronic components contained in the body, and two finger members. The two finger members are movable relative to the body between an extended state and a collapsed state. In the extended state, the two finger members extend outward from the body for receipt by a mount of an external support. In the collapsed state, the two finger members are collapsed toward the body. In the extended state, the two finger members may extend parallel with each other for receipt in parallel slots of the mount of the external support.

In one implementation, a mount for an electronic device includes a base and two finger members. The base is configured to couple to the electronic device. The two finger members are movable relative to the base between an extended state and a collapsed state. In the extended state, the two finger members extend parallel with each other to be insertable into parallel slots a support mount of an external support. In the collapsed state, the two finger members are biased away from each other.

In one implementation, a mount for a camera includes two protrusions and a base. The two protrusions each include opposed planar surfaces that define a thickness of the protrusion, which is less than a width and a length of the protrusion. The protrusions are rotatably coupled to the base. The two protrusions are movable relative to the base between respective extended positions and collapsed positions. When the two protrusions are in the extended positions, the two protrusions extend parallel with each other in a common direction to define a slot therebetween.

In an implementation, a camera mount includes two finger members that are coupleable to a camera. Each of the two finger members includes opposed planar surfaces that are parallel with and define a thickness of thereof and an aperture extending through the thickness. The two finger members are rotatable relative to the camera about different respective axes of rotation between respective extended positions and respective collapsed positions. When the finger members are in the respective extended positions, the camera mount is in an extended state with the finger members extending parallel with each other in a common direction and the apertures being coaxial with each other. When the finger members are in the respective collapsed positions, the camera mount is in a collapsed state. A camera may include a body, a lens coupled to the body, and the mount coupled to the body.

In an implementation, a camera includes a body, electronic components contained in the body and including an image sensor, and two finger members coupled to and movable relative to the body between an extended state and a non-extended state. In the extended state, the two finger members extend away from the body for receipt by a mount of an external support. In the non-extended state, the two finger members are biased toward the body relative to the extended state.

The camera may further include a mount assembly that includes a base and the two finger members rotatably coupled to the base. The base may be removably coupled to the body with the two finger members being coupled to the body of the camera by the base of the mount assembly. The two finger members may each include opposed planar surfaces that define a thickness thereof with the thickness being less than a width and a length thereof. The two finger members may be rotatable relative to the body about different axes to move between the extended state and the non-extended state. The two finger members may rotate toward each other when moving from the non-extended state to the extended state. In the extended state, the finger members may be parallel and extend in a common direction away from the body. In the non-extended state, the finger members may be parallel and extend in opposite directions. The two finger members may be retainable in each of the extended state and the non-extended state. In the non-extended state, each of the finger members may be contained substantially within a recess of the body. In the extended state, each of the finger members may protrude outward from the recess.

In an implementation, a mount for a camera includes a base configured to couple to the camera, and two fingers that are movable relative to the base between an extended state and a non-extended state. In the extended state, the two fingers extend parallel with each other to be insertable into parallel slots of a support mount of an external support. In the non-extended state, the two fingers are biased away from each other as compared to the extended state. The two fingers may be rotatable relative to the base about parallel axes independent of each other. The mount may retain the fingers frictionally in the extended state and magnetically in the non-extended state. The two fingers may each include opposed planar surfaces that define a thickness thereof and an aperture extending through the thickness with the thickness being less than a width and a length thereof.

In an implementation, a mount for a camera includes two protrusions and a base. Each of the protrusions includes opposed planar surfaces that define a thickness of the protrusion and an aperture extending through the thickness with thickness being less than a width and a length of the protrusion. The protrusions are coupled to the base and rotatable between respective first positions and respective second positions. When the two protrusions are in the respective first positions, the two protrusions extend parallel with each other in a common direction to define a slot therebetween.

In an implementation, a camera mount includes a finger member that is coupleable to a camera. The finger member includes a proximal portion, a distal portion, an axis of rotation, and an aperture. The distal portion extends from the proximal portion and includes opposed planar surfaces that are parallel with each other and define a thickness thereof.

The axis of rotation extends through the proximal portion and about which the finger member is rotatable relative to the camera when coupled thereto. The aperture extends through the distal portion. An end of the distal portion is rounded about the aperture and includes a finger pick for a user to rotate the finger member about the axis of rotation.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

FIGS. 3A-B are block diagrams of examples of image capture systems.

DETAILED DESCRIPTION

Figure 1A:
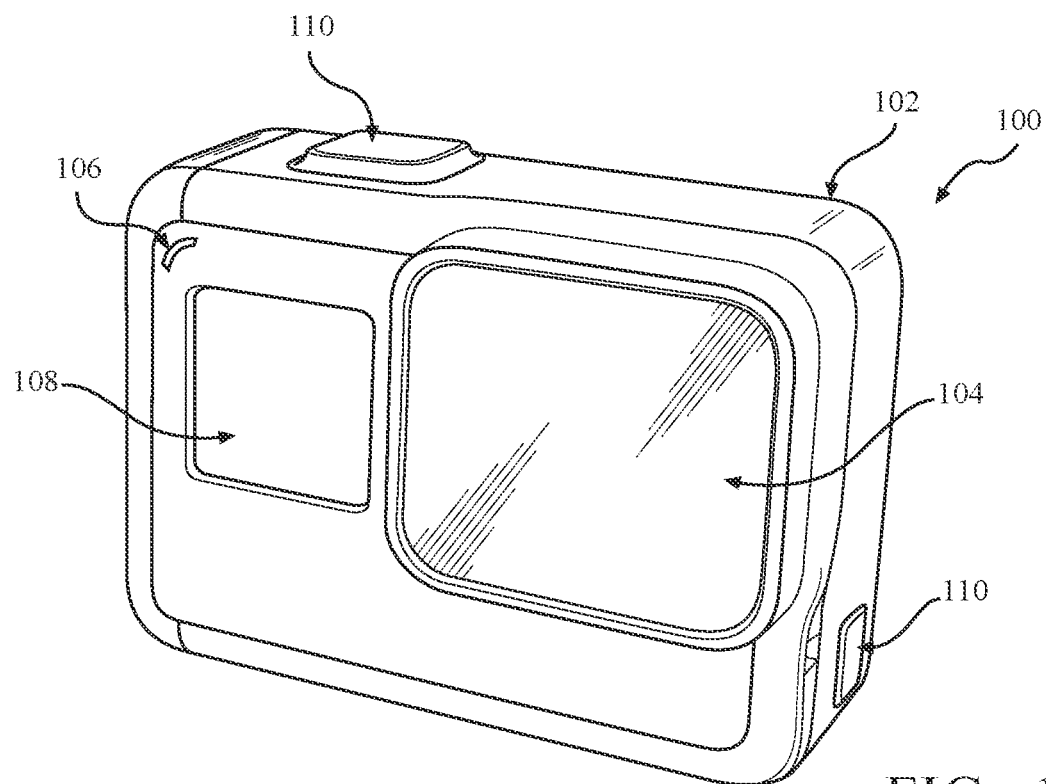
FIGS. 1A-C are perspective views of an example of an image capture device.
Figure 1B:
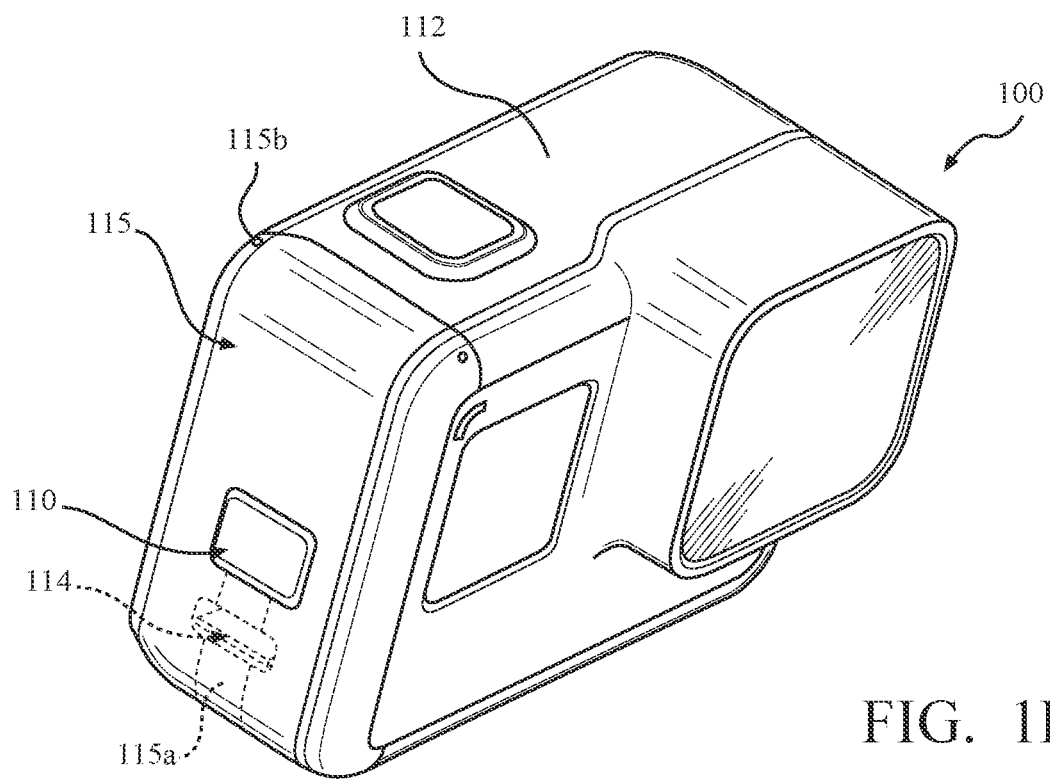
Figure 1C:
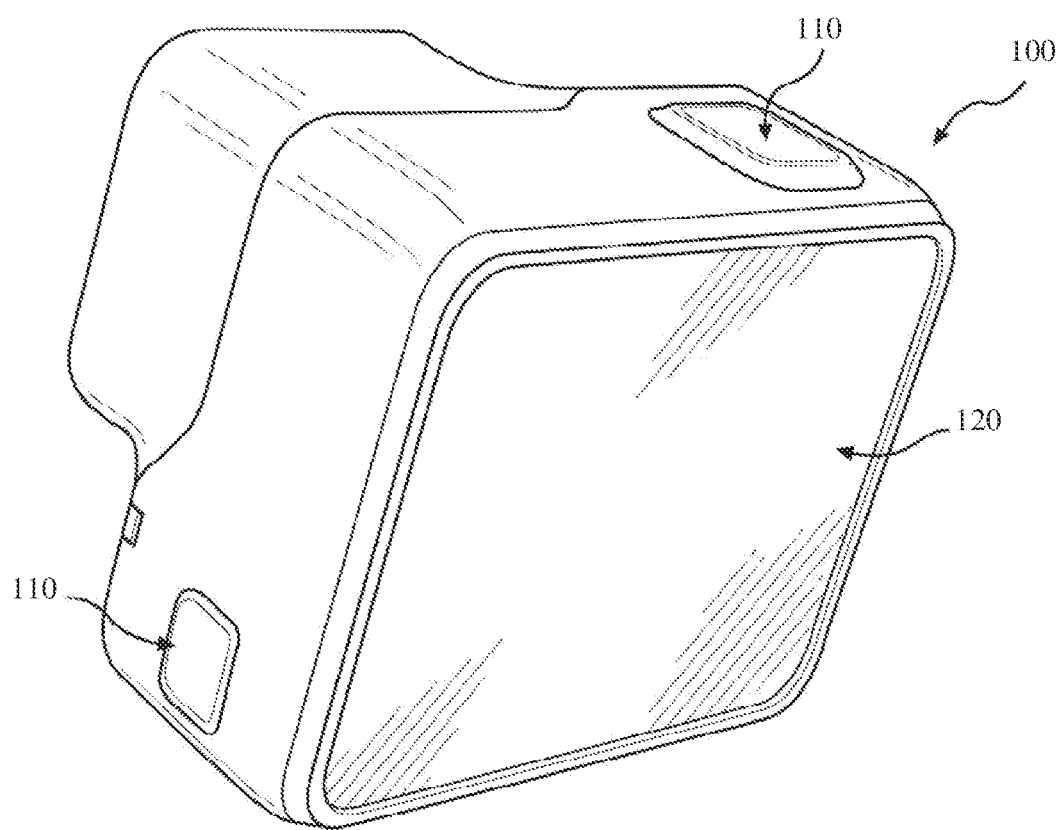

Disclosed herein are embodiments of electronic devices (e.g., cameras) and mounts therefor, which are configured to connect to an external mount for supporting the electronic device. FIGS. 1A-C are perspective views of an example of an image capture device 100. The image capture device 100 may include a body 102 having a lens 104 structured on a front surface of the body 102, various indicators on the front of the surface of the body 102 (such as LEDs, displays, and the like), various input mechanisms (such as buttons, switches, and touch-screen mechanisms), and electronics (e.g., imaging electronics, power electronics, etc.) internal to the body 102 for capturing images via the lens 104 and/or performing other functions. The image capture device 100 may be configured to capture images and video and to store captured images and video for subsequent display or playback.

The image capture device 100 may include various indicators, including LED lights 106 and LCD display 108. The image capture device 100 may also include buttons 110 configured to allow a user of the image capture device 100 to interact with the image capture device 100, to turn the image capture device 100 on, to operate latches or hinges associated with doors of the image capture device 100, and/or to otherwise configure the operating mode of the image capture device 100. The image capture device 100 may also include a microphone 112 configured to receive and record audio signals in conjunction with recording video.

The image capture device 100 may include an I/O interface 114 (e.g., hidden as indicated using dotted lines). As best shown in FIG. 1B, the I/O interface 114 can be covered and sealed by a removable door 115 of the image capture device 100. The removable door 115 can be secured, for example, using a latch mechanism 115a (e.g., hidden as indicated using dotted lines) that is opened by engaging the associated button 110 as shown.

The removable door 115 can also be secured to the image capture device 100 using a hinge mechanism 115b, allowing the removable door 115 to pivot between an open position allowing access to the I/O interface 114 and a closed position blocking access to the I/O interface 114. The removable door 115 can also have a removed position (not shown) where the entire removable door 115 is separated from the image capture device 100, that is, where both the latch mechanism 115*a* and the hinge mechanism 115*b* allow the removable door 115 to be removed from the image capture device 100.

The image capture device 100 may also include another microphone integrated into the body 102 or housing. The front surface of the image capture device 100 may include two drainage ports as part of a drainage channel. The image capture device 100 may include an interactive display 120 that allows for interaction with the image capture device 100 while simultaneously displaying information on a surface of the image capture device 100. As illustrated, the image capture device 100 may include the lens 104 that is configured to receive light incident upon the lens 104 and to direct received light onto an image sensor internal to the lens 104.

The image capture device 100 of FIGS. 1A-C includes an exterior that encompasses and protects internal electronics. In the present example, the exterior includes six surfaces (i.e. a front face, a left face, a right face, a back face, a top face, and a bottom face) that form a rectangular cuboid. Furthermore, both the front and rear surfaces of the image capture device 100 are rectangular. In other embodiments, the exterior may have a different shape. The image capture device 100 may be made of a rigid material such as plastic, aluminum, steel, or fiberglass. The image capture device 100 may include features other than those described here. For example, the image capture device 100 may include additional buttons or different interface features, such as interchangeable lenses, cold shoes and hot shoes that can add functional features to the image capture device 100, etc.

The image capture device 100 may include various types of image sensors, such as a charge-coupled device (CCD) sensors, active pixel sensors (APS), complementary metal-oxide-semiconductor (CMOS) sensors, N-type metal-oxide-semiconductor (NMOS) sensors, and/or any other image sensor or combination of image sensors.

Although not illustrated, in various embodiments, the image capture device 100 may include other additional electrical components (e.g., an image processor, camera SoC (system-on-chip), etc.), which may be included on one or more circuit boards within the body 102 of the image capture device 100.

The image capture device 100 may interface with or communicate with an external device, such as an external user interface device, via a wired or wireless computing communication link (e.g., the I/O interface 114). The user interface device may, for example, be the personal computing device 360 described below with respect to FIG. 3B. Any number of computing communication links may be used. The computing communication link may be a direct computing communication link or an indirect computing communication link, such as a link including another device or a network, such as the internet, may be used.

In some implementations, the computing communication link may be a Wi-Fi link, an infrared link, a Bluetooth (BT) link, a cellular link, a ZigBee link, a near field communications (NFC) link, such as an ISO/IEC 20643 protocol link, an Advanced Network Technology interoperability (ANT+) link, and/or any other wireless communications link or combination of links.

In some implementations, the computing communication link may be an HDMI link, a USB link, a digital video interface link, a display port interface link, such as a Video Electronics Standards Association (VESA) digital display interface link, an Ethernet link, a Thunderbolt link, and/or other wired computing communication link.

The image capture device 100 may transmit images, such as panoramic images, or portions thereof, to the user interface device (not shown) via the computing communication link, and the user interface device may store, process, display, or a combination thereof the panoramic images.

The user interface device may be a computing device, such as a smartphone, a tablet computer, a phablet, a smart watch, a portable computer, and/or another device or combination of devices configured to receive user input, communicate information with the image capture device 100 via the computing communication link, or receive user input and communicate information with the image capture device 100 via the computing communication link.22

The user interface device may display, or otherwise present, content, such as images or video, acquired by the image capture device 100. For example, a display of the user interface device may be a viewport into the three-dimensional space represented by the panoramic images or video captured or created by the image capture device 100.

The user interface device may communicate information, such as metadata, to the image capture device 100. For example, the user interface device may send orientation information of the user interface device with respect to a defined coordinate system to the image capture device 100, such that the image capture device 100 may determine an orientation of the user interface device relative to the image capture device 100.

Based on the determined orientation, the image capture device 100 may identify a portion of the panoramic images or video captured by the image capture device 100 for the image capture device 100 to send to the user interface device for presentation as the viewport. In some implementations, based on the determined orientation, the image capture device 100 may determine the location of the user interface device and/or the dimensions for viewing of a portion of the panoramic images or video.

The user interface device may implement or execute one or more applications to manage or control the image capture device 100. For example, the user interface device may include an application for controlling camera configuration, video acquisition, video display, or any other configurable or controllable aspect of the image capture device 100.

The user interface device, such as via an application, may generate and share, such as via a cloud-based or social media service, one or more images, or short video clips, such as in response to user input. In some implementations, the user interface device, such as via an application, may remotely control the image capture device 100 such as in response to user input.

The user interface device, such as via an application, may display unprocessed or minimally processed images or video captured by the image capture device 100 contemporaneously with capturing the images or video by the image capture device 100, such as for shot framing, which may be referred to herein as a live preview, and which may be performed in response to user input. In some implementations, the user interface device, such as via an application, may mark one or more key moments contemporaneously with capturing the images or video by the image capture device 100, such as with a tag, such as in response to user input.

The user interface device, such as via an application, may display, or otherwise present, marks or tags associated with images or video, such as in response to user input. For example, marks may be presented in a camera roll application for location review and/or playback of video highlights.

The user interface device, such as via an application, may wirelessly control camera software, hardware, or both. For example, the user interface device may include a web-based graphical interface accessible by a user for selecting a live or previously recorded video stream from the image capture device 100 for display on the user interface device.

The user interface device may receive information indicating a user setting, such as an image resolution setting (e.g., 3840 pixels by 2160 pixels), a frame rate setting (e.g., 60 frames per second (fps)), a location setting, and/or a context setting, which may indicate an activity, such as mountain biking, in response to user input, and may communicate the settings, or related information, to the image capture device 100.

Figure 2A:
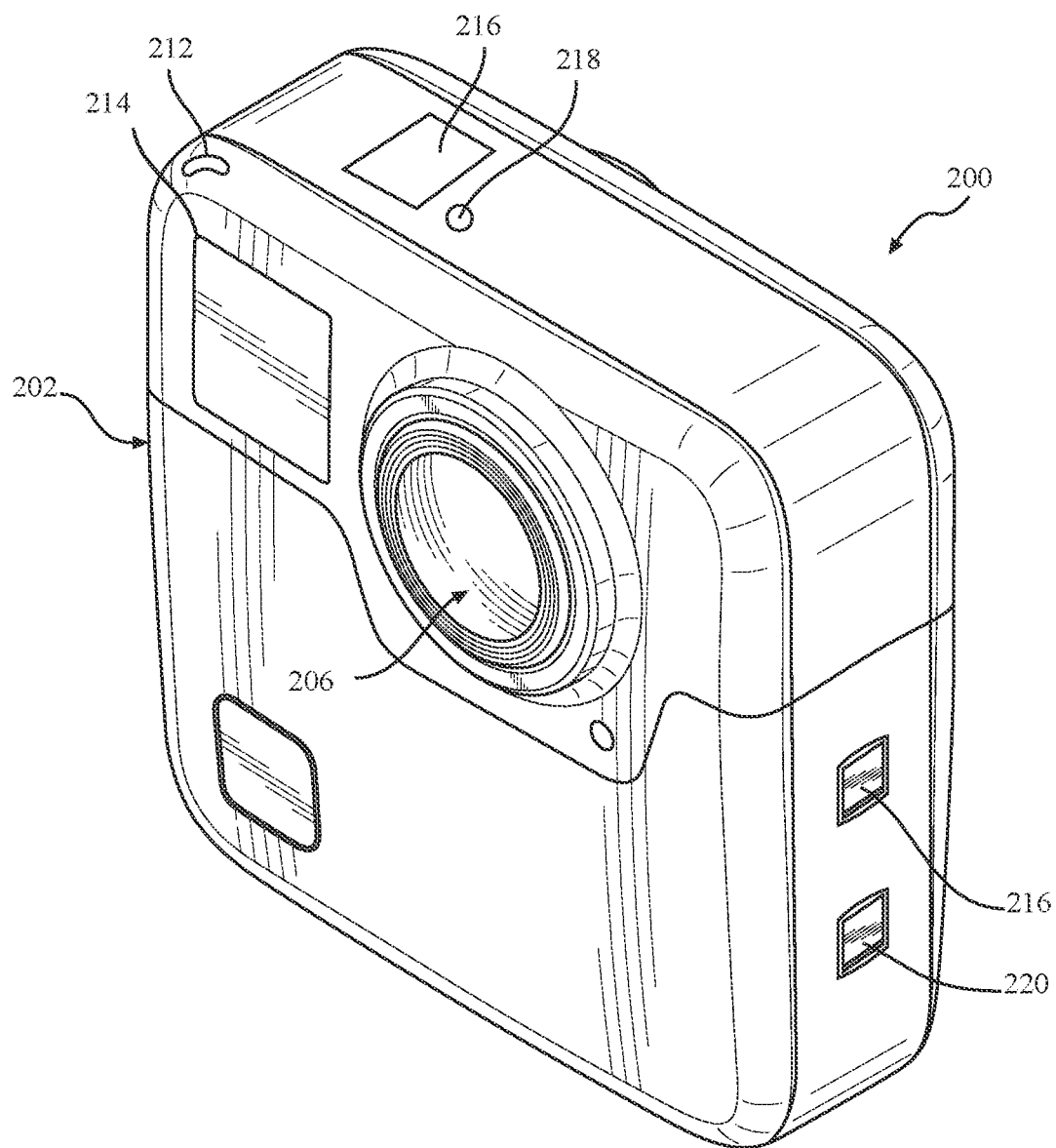
FIGS. 2A-B are perspective views of another example of an image capture device.
Figure 2B:
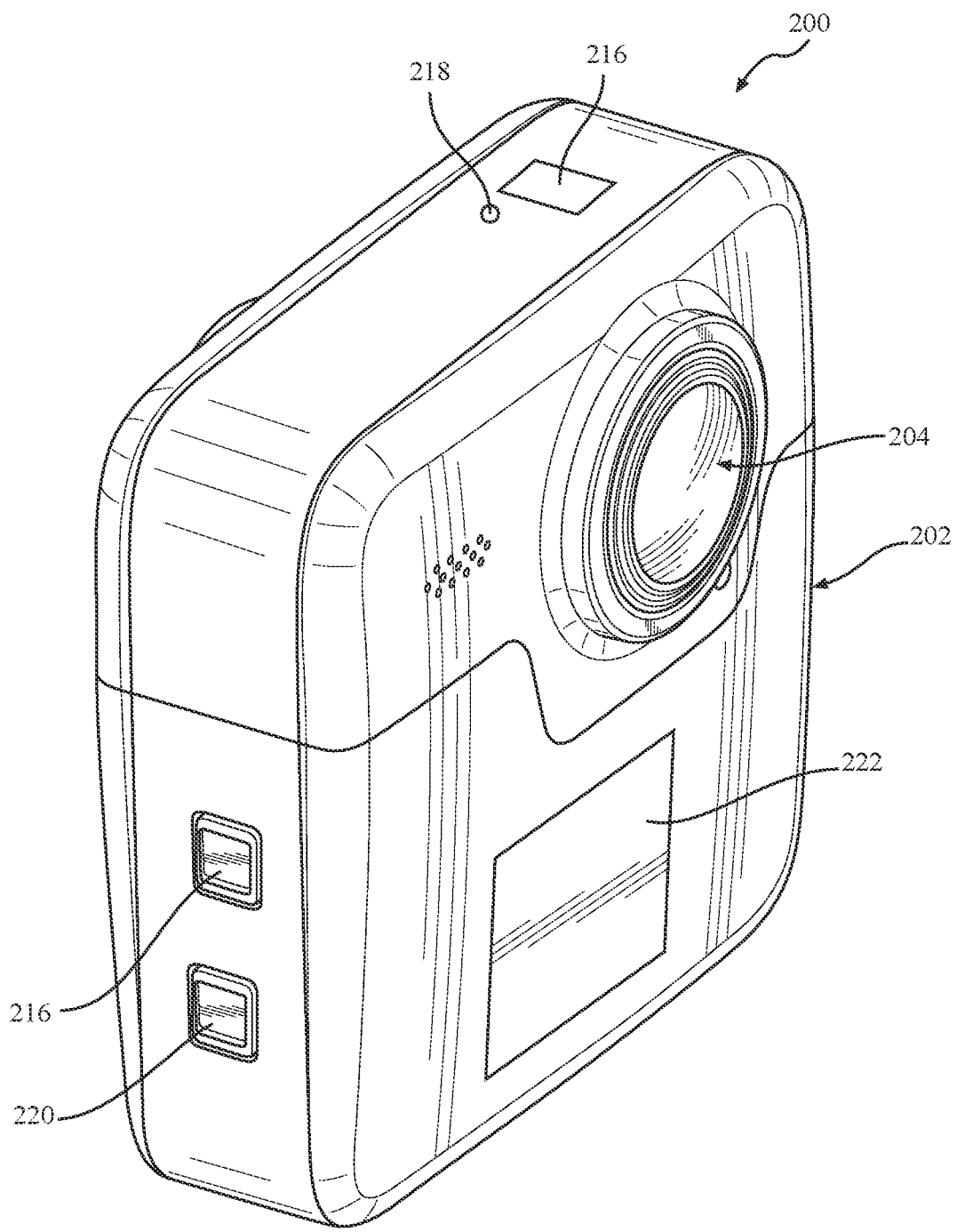

FIGS. 2A-B illustrate another example of an image capture device 200. The image capture device 200 includes a body 202 and two camera lenses 204, 206 disposed on opposing surfaces of the body 202, for example, in a back-to-back or Janus configuration.

The image capture device may include electronics (e.g., imaging electronics, power electronics, etc.) internal to the body 202 for capturing images via the lenses 204, 206 and/or performing other functions. The image capture device may include various indicators such as an LED light 212 and an LCD display 214.

The image capture device 200 may include various input mechanisms such as buttons, switches, and touchscreen mechanisms. For example, the image capture device 200 may include buttons 216 configured to allow a user of the image capture device 200 to interact with the image capture device 200, to turn the image capture device 200 on, and to otherwise configure the operating mode of the image capture device 200. In an implementation, the image capture device 200 includes a shutter button and a mode button. It should be appreciated, however, that, in alternate embodiments, the image capture device 200 may include additional buttons to support and/or control additional functionality.

The image capture device 200 may also include one or more microphones 218 configured to receive and record audio signals (e.g., voice or other audio commands) in conjunction with recording video.

The image capture device 200 may include an I/O interface 220 and an interactive display 222 that allows for interaction with the image capture device 200 while simultaneously displaying information on a surface of the image capture device 200.

The image capture device 200 may be made of a rigid material such as plastic, aluminum, steel, or fiberglass. In some embodiments, the image capture device 200 described herein includes features other than those described. For example, instead of the I/O interface 220 and the interactive display 222, the image capture device 200 may include additional interfaces or different interface features. For example, the image capture device 200 may include additional buttons or different interface features, such as interchangeable lenses, cold shoes and hot shoes that can add functional features to the image capture device 200, etc.

Figure 2C:
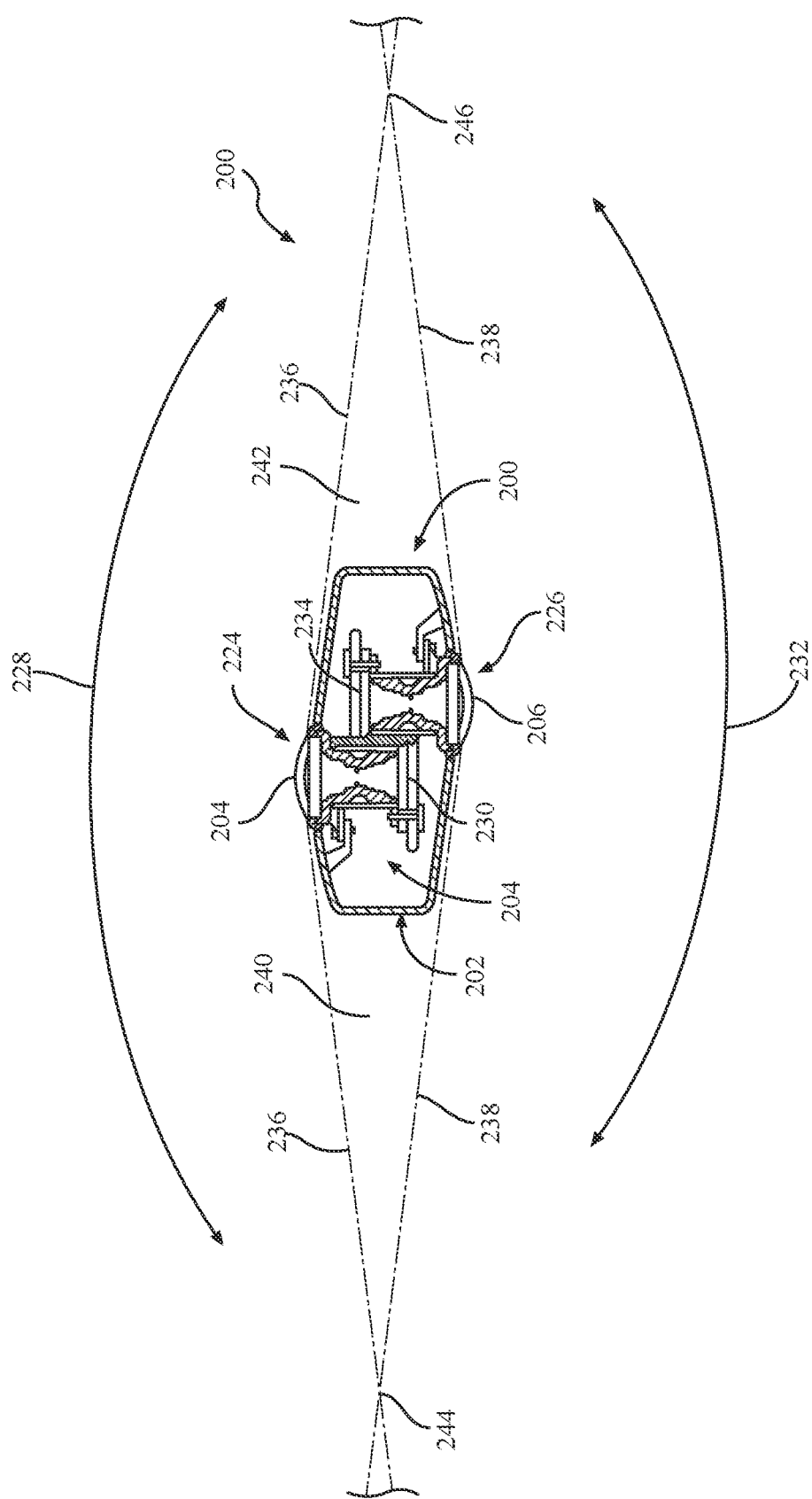
FIG. 2C is a cross-sectional view of the image capture device of FIGS. 2A-B.

FIG. 2C is a cross-sectional view of the image capture device 200 of FIGS. 2A-B. The image capture device 200 is configured to capture spherical images, and accordingly, includes a first image capture device 224 and a second image capture device 226. The first image capture device 224 defines a first field-of-view 228 as shown in FIG. 2C and includes the lens 204 that receives and directs light onto a first image sensor 230.

Similarly, the second image capture device 226 defines a second field-of-view 232 as shown in FIG. 2C and includes the lens 206 that receives and directs light onto a second image sensor 234. To facilitate the capture of spherical images, the image capture devices 224, 226 (and related components) may be arranged in a back-to-back (Janus) configuration such that the lenses 204, 206 face in generally opposite directions.

The fields-of-view 228, 232 of the lenses 204, 206 are shown above and below boundaries 236, 238, respectively. Behind the first lens 204, the first image sensor 230 may capture a first hyper-hemispherical image plane from light entering the first lens 204, and behind the second lens 206, the second image sensor 234 may capture a second hyper-hemispherical image plane from light entering the second lens 206.

One or more areas, such as blind spots 240, 242 may be outside of the fields-of-view 228, 232 of the lenses 204, 206 so as to define a "dead zone." In the dead zone, light may be obscured from the lenses 204, 206 and the corresponding image sensors 230, 234, and content in the blind spots 240, 242 may be omitted from capture. In some implementations, the image capture devices 224, 226 may be configured to minimize the blind spots 240, 242.

The fields-of-view 228, 232 may overlap. Stitch points 244, 246, proximal to the image capture device 200, at which the fields-of-view 228, 232 overlap may be referred to herein as overlap points or stitch points. Content captured by the respective lenses 204, 206, distal to the stitch points 244, 246, may overlap.

Images contemporaneously captured by the respective image sensors 230, 234 may be combined to form a combined image. Combining the respective images may include correlating the overlapping regions captured by the respective image sensors 230, 234, aligning the captured fields-of-view 228, 232, and stitching the images together to form a cohesive combined image.

A slight change in the alignment, such as position and/or tilt, of the lenses 204, 206, the image sensors 230, 234, or both, may change the relative positions of their respective fields-of-view 228, 232 and the locations of the stitch points 244, 246. A change in alignment may affect the size of the blind spots 240, 242, which may include changing the size of the blind spots 240, 242 unequally.

Incomplete or inaccurate information indicating the alignment of the image capture devices 224, 226, such as the locations of the stitch points 244, 246, may decrease the accuracy, efficiency, or both of generating a combined image. In some implementations, the image capture device 200 may maintain information indicating the location and orientation of the lenses 204, 206 and the image sensors 230, 234 such that the fields-of-view 228, 232, stitch points 244, 246, or both may be accurately determined, which may improve the accuracy, efficiency, or both of generating a combined image.

The lenses 204, 206 may be laterally offset from each other, may be off-center from a central axis of the image capture device 200, or may be laterally offset and off-center from the central axis. As compared to image capture devices with back-to-back lenses, such as lenses aligned along the same axis, image capture devices including laterally offset lenses may include substantially reduced thickness relative to the lengths of the lens barrels securing the lenses. For example, the overall thickness of the image capture device 200 may be close to the length of a single lens barrel as opposed to twice the length of a single lens barrel as in a back-to-back configuration. Reducing the lateral distance between the lenses 204, 206 may improve the overlap in the fields-of-view 228, 232.

Images or frames captured by the image capture devices 224, 226 may be combined, merged, or stitched together to produce a combined image, such as a spherical or panoramic image, which may be an equirectangular planar image. In some implementations, generating a combined image may include three-dimensional, or spatiotemporal, noise reduction (3DNR). In some implementations, pixels along the stitch boundary may be matched accurately to minimize boundary discontinuities.

FIGS. 3A-B are block diagrams of examples of image capture systems.

Referring first to FIG. 3A, an image capture system 300 is shown. The image capture system 300 includes an image capture device 310 (e.g., a camera or a drone), which may, for example, be the image capture device 200 shown in FIGS. 2A-C.

The image capture device 310 includes a processing apparatus 312 that is configured to receive a first image from a first image sensor 314 and receive a second image from a second image sensor 316. The image capture device 310 includes a communications interface 318 for transferring images to other devices. The image capture device 310 includes a user interface 320 to allow a user to control image capture functions and/or view images. The image capture device 310 includes a battery 322 for powering the image capture device 310. The components of the image capture device 310 may communicate with each other via the bus 324.

The processing apparatus 312 may be configured to perform image signal processing (e.g., filtering, tone mapping, stitching, and/or encoding) to generate output images based on image data from the image sensors 314 and 316. The processing apparatus 312 may include one or more processors having single or multiple processing cores. The processing apparatus 312 may include memory, such as a random-access memory device (RAM), flash memory, or another suitable type of storage device such as a non-transitory computer-readable memory. The memory of the processing apparatus 312 may include executable instructions and data that can be accessed by one or more processors of the processing apparatus 312.

For example, the processing apparatus 312 may include one or more dynamic random access memory (DRAM) modules, such as double data rate synchronous dynamic random-access memory (DDR SDRAM). In some implementations, the processing apparatus 312 may include a digital signal processor (DSP). In some implementations, the processing apparatus 312 may include an application specific integrated circuit (ASIC). For example, the processing apparatus 312 may include a custom image signal processor.

The first image sensor 314 and the second image sensor 316 may be configured to detect light of a certain spectrum (e.g., the visible spectrum or the infrared spectrum) and convey information constituting an image as electrical signals (e.g., analog or digital signals). For example, the image sensors 314 and 316 may include CCDs or active pixel sensors in a CMOS. The image sensors 314 and 316 may detect light incident through a respective lens (e.g., a fisheye lens). In some implementations, the image sensors 314 and 316 include digital-to-analog converters. In some implementations, the image sensors 314 and 316 are held in a fixed orientation with respective fields of view that overlap.

The communications interface 318 may enable communications with a personal computing device (e.g., a smartphone, a tablet, a laptop computer, or a desktop computer). For example, the communications interface 318 may be used to receive commands controlling image capture and processing in the image capture device 310. For example, the communications interface 318 may be used to transfer image data to a personal computing device. For example, the communications interface 318 may include a wired interface, such as a high-definition multimedia interface (HDMI), a universal serial bus (USB) interface, or a FireWire interface. For example, the communications interface 318 may include a wireless interface, such as a Bluetooth interface, a ZigBee interface, and/or a Wi-Fi interface.

The user interface 320 may include an LCD display for presenting images and/or messages to a user. For example, the user interface 320 may include a button or switch enabling a person to manually turn the image capture device 310 on and off. For example, the user interface 320 may include a shutter button for snapping pictures.

The battery 322 may power the image capture device 310 and/or its peripherals. For example, the battery 322 may be charged wirelessly or through a micro-USB interface.

Referring to FIG. 3B, another image capture system 330 is shown. The image capture system 330 includes an image capture device 340 and a personal computing device 360 that communicate via a communications link 350. The image capture device 340 may, for example, be the image capture device 100 shown in FIGS. 1A-C. The personal computing device 360 may, for example, be the user interface device described with respect to FIGS. 1A-C.

The image capture device 340 includes an image sensor 342 that is configured to capture images. The image capture device 340 includes a communications interface 344 configured to transfer images via the communication link 350 to the personal computing device 360.

The personal computing device 360 includes a processing apparatus 362 that is configured to receive, using a communications interface 366, images from the image sensor 342. The processing apparatus 362 may be configured to perform image signal processing (e.g., filtering, tone mapping, stitching, and/or encoding) to generate output images based on image data from the image sensor 342.

The image sensor 342 is configured to detect light of a certain spectrum (e.g., the visible spectrum or the infrared spectrum) and convey information constituting an image as electrical signals (e.g., analog or digital signals). For example, the image sensor 342 may include CCDs or active pixel sensors in a CMOS. The image sensor 342 may detect light incident through a respective lens (e.g., a fisheye lens). In some implementations, the image sensor 342 includes digital-to-analog converters. Image signals from the image sensor 342 may be passed to other components of the image capture device 340 via a bus 346.

The communications link 350 may be a wired communications link or a wireless communications link. The communications interface 344 and the communications interface 366 may enable communications over the communications link 350. For example, the communications interface 344 and the communications interface 366 may include an HDMI port or other interface, a USB port or other interface, a FireWire interface, a Bluetooth interface, a ZigBee interface, and/or a Wi-Fi interface. For example, the communications interface 344 and the communications interface 366 may be used to transfer image data from the image capture device 340 to the personal computing device 360 for image signal processing (e.g., filtering, tone mapping, stitching, and/or encoding) to generate output images based on image data from the image sensor 342.

The processing apparatus 362 may include one or more processors having single or multiple processing cores. The processing apparatus 362 may include memory, such as RAM, flash memory, or another suitable type of storage device such as a non-transitory computer-readable memory. The memory of the processing apparatus 362 may include executable instructions and data that can be accessed by one or more processors of the processing apparatus 362. For example, the processing apparatus 362 may include one or more DRAM modules, such as DDR SDRAM.

In some implementations, the processing apparatus 362 may include a DSP. In some implementations, the processing apparatus 362 may include an integrated circuit, for example, an ASIC. For example, the processing apparatus 362 may include a custom image signal processor. The processing apparatus 362 may exchange data (e.g., image data) with other components of the personal computing device 360 via a bus 368.

The personal computing device 360 may include a user interface 364. For example, the user interface 364 may include a touchscreen display for presenting images and/or messages to a user and receiving commands from a user. For example, the user interface 364 may include a button or switch enabling a person to manually turn the personal computing device 360 on and off. In some implementations, commands (e.g., start recording video, stop recording video, or capture photo) received via the user interface 364 may be passed on to the image capture device 340 via the communications link 350.

Referring to FIGS. 4A-6, a camera 400, such as one of the image capture device 100, the image capture device 200, or a variation thereof, includes a body 410 and a mount 420 by which the camera 400 is coupled to another mount 442 of an external support 440. The mount 420 of the camera 400 is referred to herein as the device mount 420, but may also be referred to as a camera mount when used with a camera. The other mount 442 of the external support 440 is referred to herein as the support mount 442. Cooperatively, the device mount 420 and the support mount 442 may be referred to as a mounting system. Instead of a camera 400, another type of electronic device may be similarly configured with the device mount 420 described herein, such an output device (e.g., an electronic display, or speaker), an input device (e.g., a microphone), a control device (e.g., a remote control), a peripheral device (e.g., a battery, or communications interface, hub, or dock with which other devices are in communication), which may or may not be associate with the camera 400 or another image capture device. The external support 440 may be a tripod (as shown), or another type of mounting device, such as a bar mount (e.g., for handle bars of a bicycle), an elongated arm (e.g., a "selfie stick"), or a helmet mount. The device mount 420 may also be referred to as a mount assembly.

The camera 400 includes one or more lenses 412 facing outward from the body 410 and electronic components suitable for capturing images contained therein (e.g., image sensor, image processor, memory, and/or power storage, such as a battery). For example, the camera 400 may be configured similar to the image capture device 100 as is shown (i.e., having only one lens 412) or as the image capture device 200 (i.e., having two of the lenses 412). The body 410 may, for example, be a housing that contains the electronic components therein and may be waterproof. The body 410 may, as shown, have a rectilinear shape having a bottom side 410a, an upper side opposite the bottom side 410a (not labeled in FIG. 4A), a front side 410b, a rear side opposite the front side 410b (not labeled in FIG. 4A), a right side 410c, and a left side opposite the right side 410c (not labeled in FIG. 4A). The one or more lenses 412 face outward, for example, from the front side 410b and/or the rear side. As is shown, the one or more lenses 412 are statically positioned and oriented relative to the body 410. For example, while the lenses 412 may be removable from the body 410, the one or more lenses 412 do not move relative to the various sides of the body 410 during normal operation. The body 410 may have any other suitable shape, such as having a rounded or irregular shape.

Figure 5:
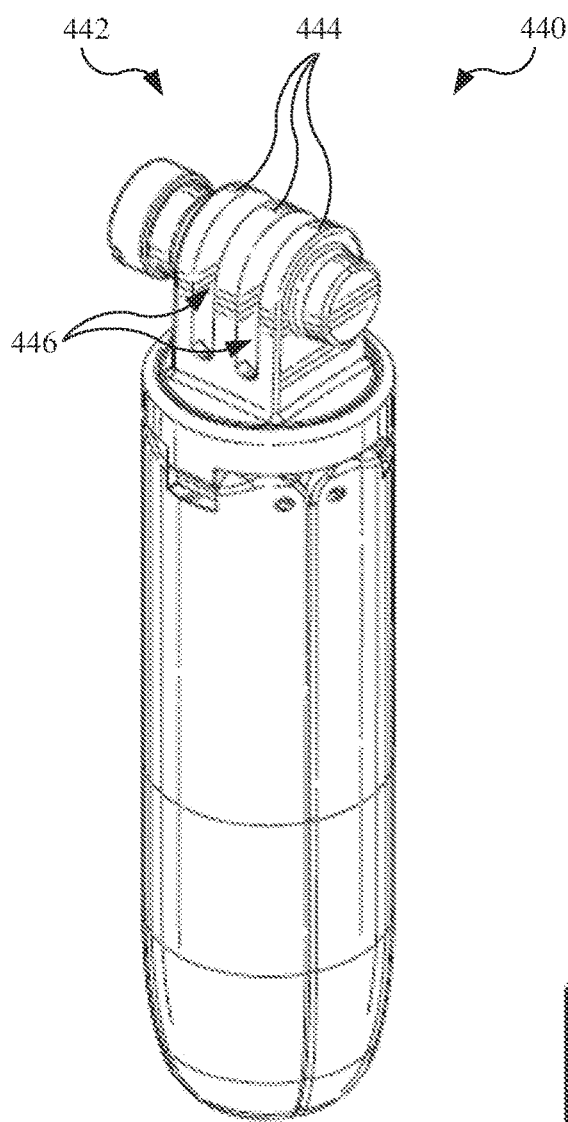
FIG. 5 is an upper perspective view of the external mount of FIG. 4A.
Figure 6:
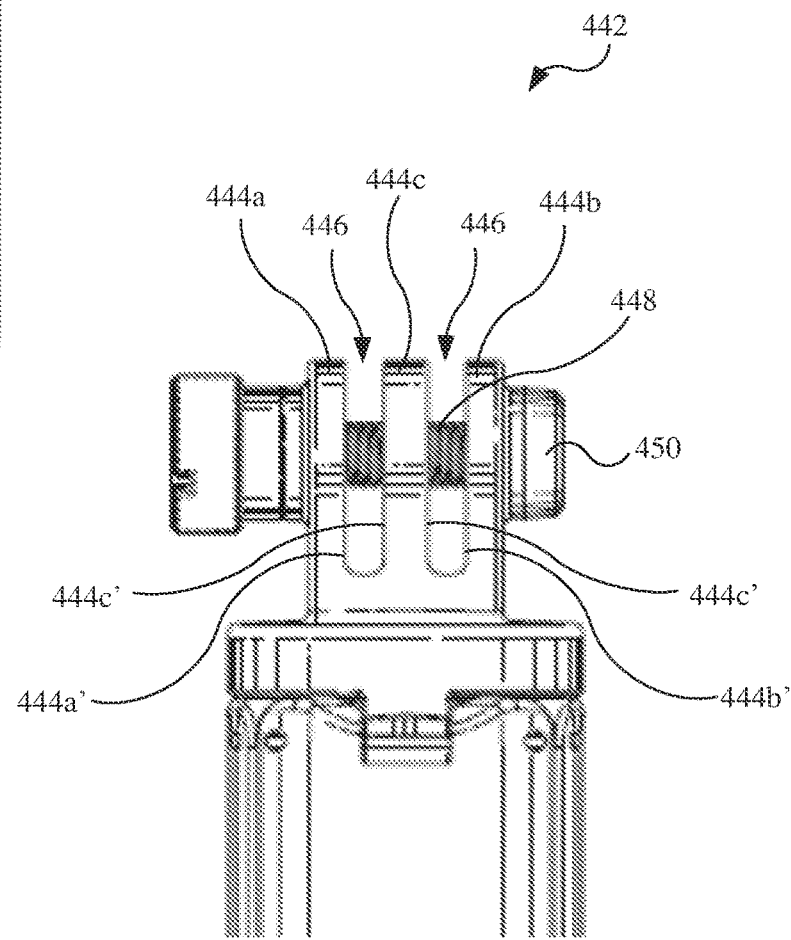
FIG. 6 is a partial side view of the external mount.

Referring additionally to FIGS. 5 and 6, the device mount 420 and the support mount 442 include interlocking fingers by which the device mount 420 and the support mount 442 couple to each other. The support mount 442 includes three finger members 444 that define two parallel slots 446 therebetween, which receive finger members 422 of the device mount 420 corresponding thereto. The support mount 442 may also be referred to as a three-finger mount, while the device mount 420 may also be referred to as a two-finger mount. As discussed in further detail below, the finger members 422 of the device mount 420 are thin, flat planar structures having opposed planar faces that define a thickness thereof that is less than a width and a length thereof (e.g., less than one quarter of the width and/or the length). The finger members 444 of the support mount 442 define the parallel slots 446 with corresponding dimensions for interfitment (e.g., receipt) therein of the finger members 422 of the device mount 420. The finger members 422, 444 may also be referred to as fingers, arms, protrusions, planar protrusions, or members.

Referring first to the support mount 442 of the external support 440, the three finger members 444 include a first outer finger member 444a, a second outer finger member 444b, and a central finger member 444c that is positioned between the first outer finger member 444a and the second outer finger member 444b. The central finger member 444c includes two planar surfaces 444c' that are parallel with and face away from each other and which may be referred to as opposed planar surfaces. The central finger member 444c has a thickness that is measured between and perpendicular to the two planar surfaces 444c' thereof.

The first outer finger member 444a includes a planar surface 444a' that faces and is parallel with one of the two planar surfaces 444c' of the central finger member 444c. A first of the slots 446 is defined between the planar surface 444a' of the first outer finger member 444a and a first of the planar surfaces 444c' of the central finger member 444c. The first slot 446 has a width that is measured between and perpendicular to the planar surface 444a' of the first outer finger member 444a and the first planar surface 444c' of the central finger member 444c.

The second outer finger member 444b includes a planar surface 444b' that faces and is parallel with a second of the two planar surfaces 444c' of the central finger member 444c. The planar surface 444b' of the second outer finger member 444b is also parallel with the first of the two planar surfaces 444c' of the central finger member 444c and the planar surface 444a' of the first outer finger member 444a. A second of the slots 446 is defined between the planar surface 444b' of the second outer finger member 444b and the second of the planar surfaces 444c' of the central finger member 444c. The second slot 446 has a width that is measured between and perpendicular to the planar surface 444b' of the second outer finger member 444b and the second planar surface 444c' of the central finger member 444c. The widths of the two slots 446 are the same. The three finger members 444 may be an integrally formed structure, such as being an injection molded plastic structure or a machined metal structure. The finger members 444 may also terminate at a common height (e.g., having rounded ends) and/or have a common width.

The support mount 442 also includes a shaft 448, which functions to retain the device mount 420 of the camera 400 to the support mount 442. The three finger members 444 include apertures (not labeled) that are aligned with each other and through which the shaft 448 is positioned. The shaft 448 extends perpendicular to the finger members 444 and the slots 446. The shaft 448 is removable from the support mount 442, for example, being a threaded shaft (e.g., a thumb screw) having a threaded end that is received by a nut 450 of the support mount 442.

Figure 4A:
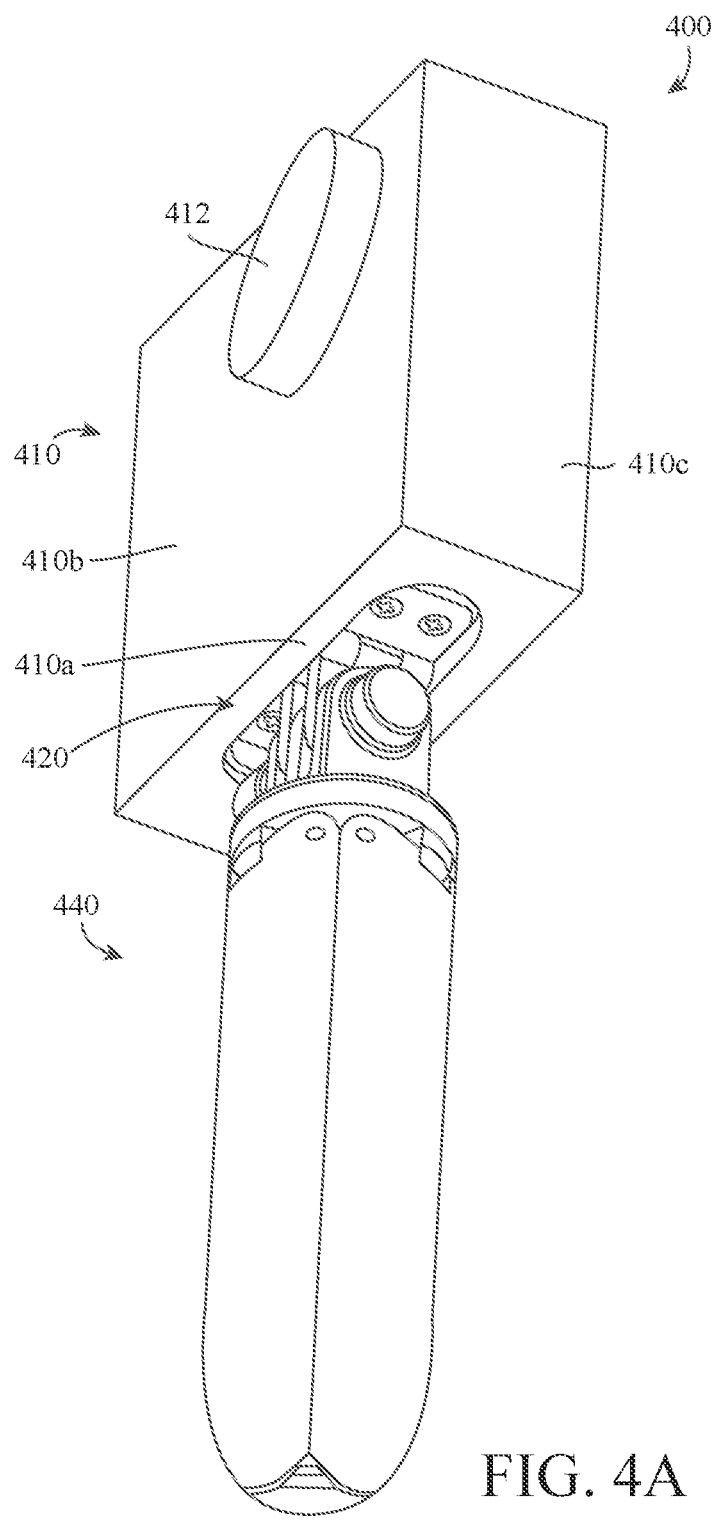
FIG. 4A is a bottom perspective view of a camera having a mount coupled to an external mount.
Figure 4B:
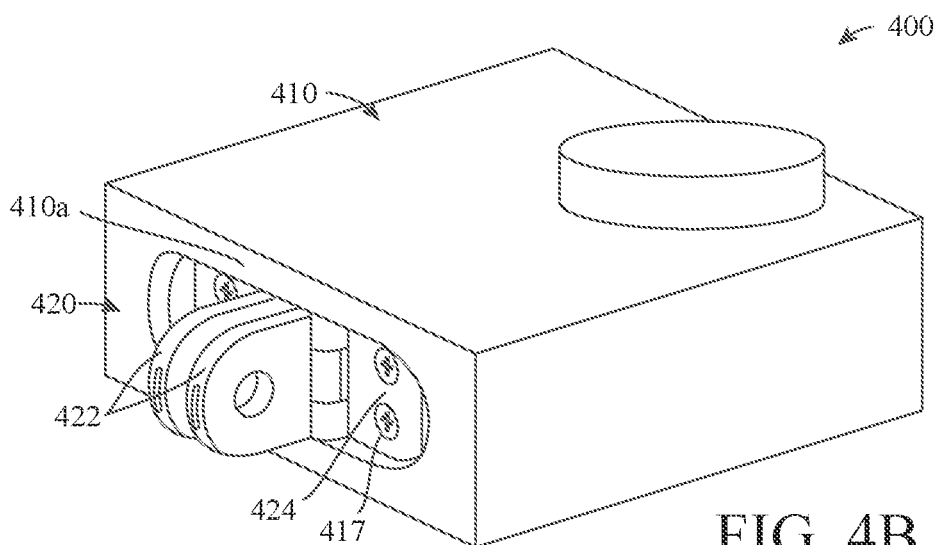
FIG. 4B is a bottom perspective view of the camera of FIG. 1 with the mount in an extended state.
Figure 4C:
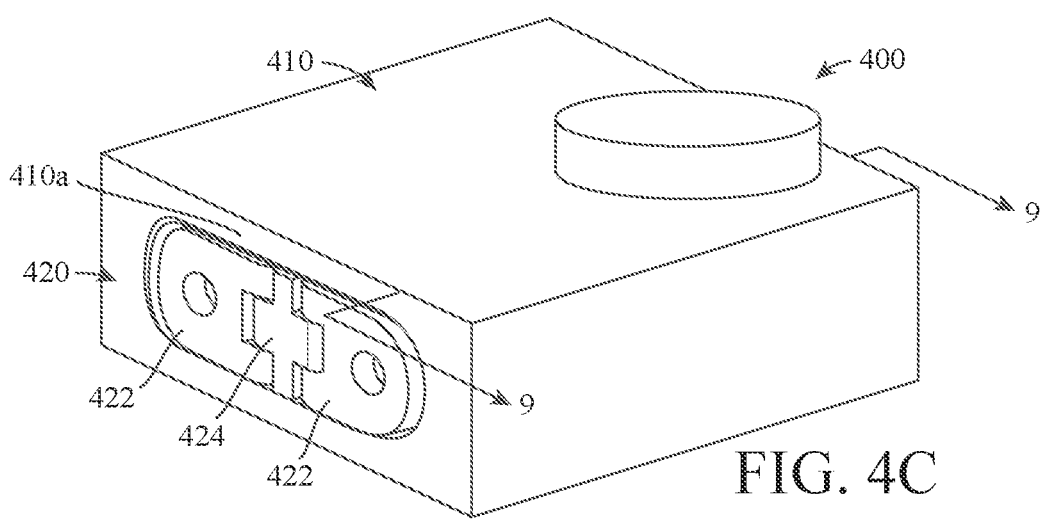
FIG. 4C is a bottom perspective view of the camera of FIG. 1 with the mount in a collapsed state.
Figure 4D:
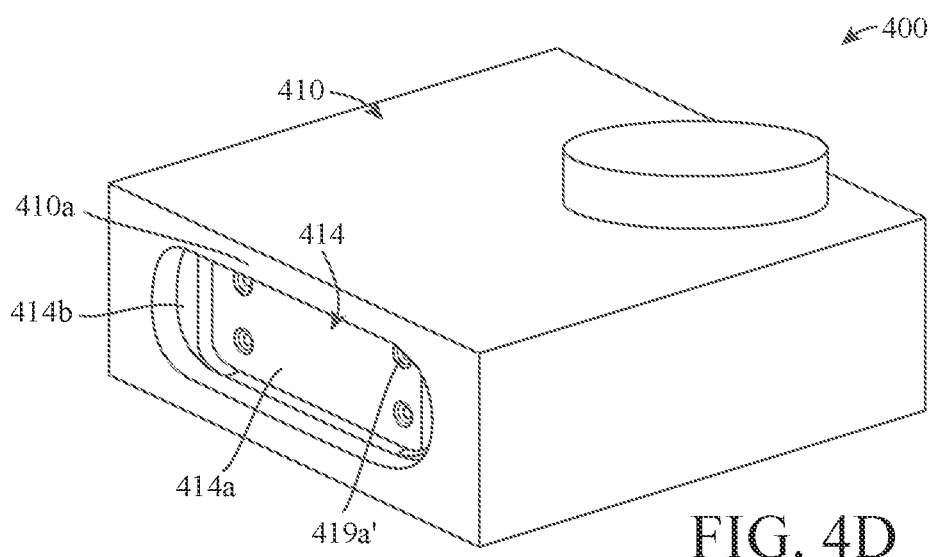
FIG. 4D is a bottom perspective view of the camera of FIG. 1 without the mount.

Referring to FIGS. 4B-4D, the device mount 420 is reconfigurable (e.g., is collapsible, movable, or foldable) between a first configuration and a second configuration. In the first configuration (shown in FIG. 4B), the device mount 420 is arranged for being coupled to the support mount 442 of the external support 440 and, in particular, extends away from the body 410 for receipt by the support mount 442. The first configuration may also be referred to as an extended, protruding, unfolded, deployed, or mounting state or configuration. In the second configuration (shown in FIG. 4C), the device mount 420 is collapsed toward the body 410, for example, to use the camera 400 without the external support 440. In the second configuration, the device mount 420 is collapsed toward the body 410, such that the camera 400 is more compact than in the extended state, for example, such that the camera 400 has a lesser height when the device mount 420 is collapsed than when extended. In the collapsed state, the device mount may be configured to not be receivable (e.g., not be fully receivable) by the support mount 442 of the external support 440 for retention thereto (e.g., with the shaft 448). The second configuration may also be referred to as a collapsed, recessed, folded, non-deployed, non-extended, or non-mounting state or configuration. The device mount 420 is also removable from the body 410 (shown in FIG. 4D), or may alternatively be permanently coupled thereto.

Figure 7:
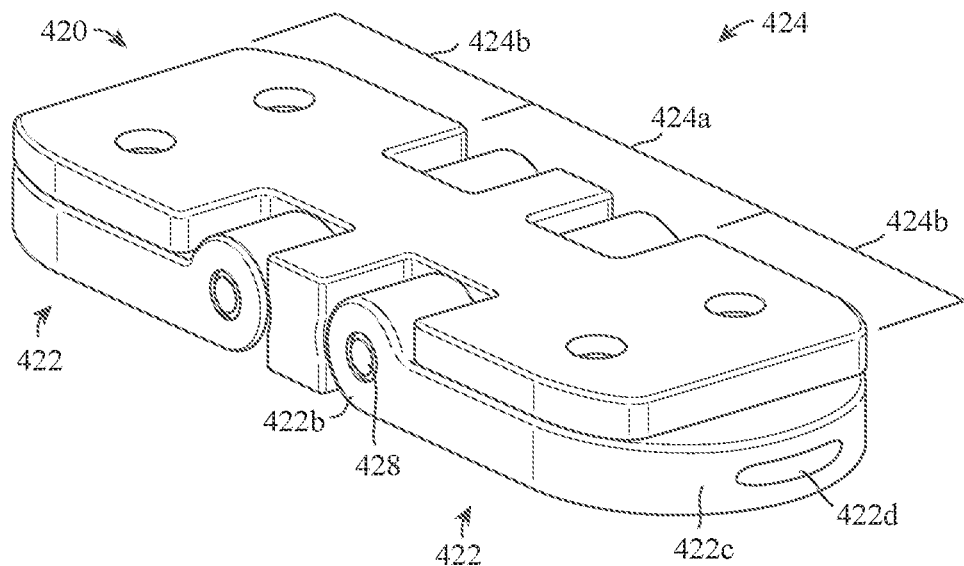
FIG. 7 is an upper perspective view of the mount in the collapsed state.
Figure 8:
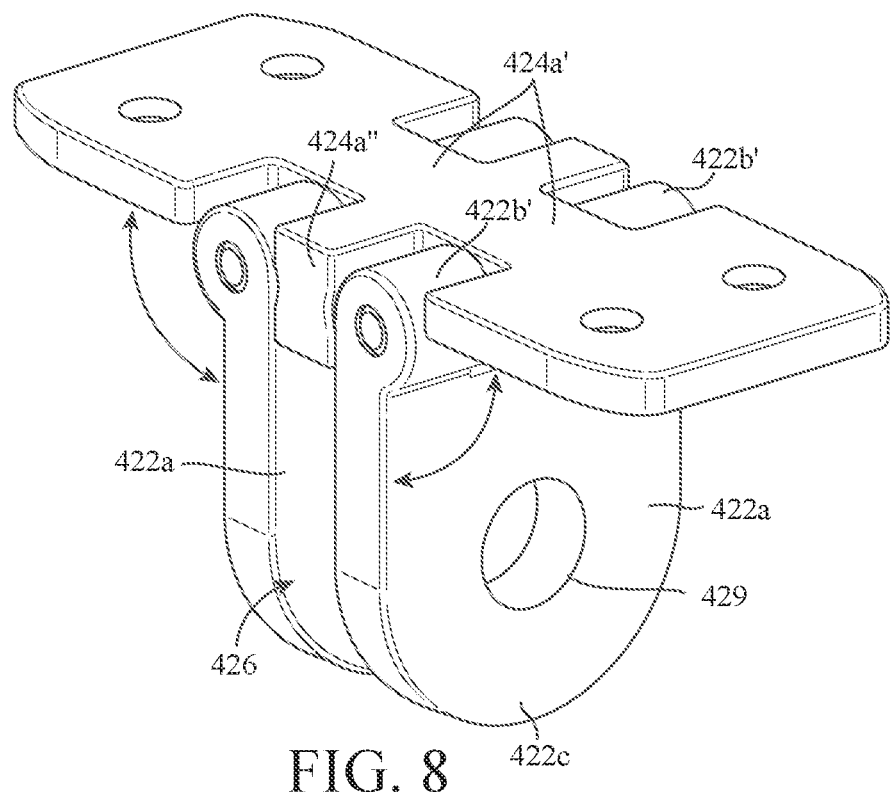
FIG. 8 is an upper perspective view of the mount in the extended state.

Referring additionally to FIGS. 7-8, the device mount 420 generally includes the two finger members 422, referenced above, and a base 424. The two finger members 422 correspond to the two slots 446 of the support mount 442 and, when the device mount 420 is in the extended state, are insertable into the slots 446 of the support mount 442.

The finger members 422 are coupled to and movable relative to the base 424. As shown, the finger members 422 rotate relative to the base 424 between respective extended positions (shown in FIG. 8; see also FIG. 4B) and collapsed positions (shown in FIG. 7; see also FIG. 4C). For example, as shown, the finger members 422 are coupled to a side of the body 410 of the camera 400 (e.g., to the bottom side 410a via the base 424) and extend away from the side in the extended positions and extend along the side in the collapsed positions. As shown and further discussed below, the axes about which the finger members 422 rotate may have a fixed orientation relative to the body 410 (e.g., the sides thereof and/or the lens 412) when coupled to the body 410. For example, the finger members 422 may rotate substantially 90 degrees between the extended and collapsed positions and/or in opposite directions from each other (e.g., as indicated by the arrows in FIG. 8). The finger members 422 may rotate independent of each other, for example, such that one of the finger members 422 may be in the extended position, while the other of the finger members 422 may simultaneously be in the collapsed position. The base 424 is in turn coupled to the camera 400 along the bottom side 410a of the body 410, such that the finger members 422 are also rotatable relative to the body 410. When the finger members 422 are in the respective extended positions, the device mount 420 is in the first or extended state, and when finger members 422 are in the respective collapsed positions, the device mount 420 is in the second or collapsed state. In the extended positions, the finger members 422 extend parallel with each other in a common direction, for example, with the planar surfaces 422a of the two finger members 422 being parallel with each other. As is shown, in the extended state, the finger members 422 extend from the bottom side 410a and away from the body 410 of the camera 400, such as downward therefrom and/or generally perpendicular to the direction in which the lens 412 faces (e.g., an optical axis thereof). In the extended state, the finger members 422 are simultaneously receivable in the slots 446 (i.e., between the finger members 444) of the support mount.

In the collapsed positions, the finger members 422 extend away from each other. For example, the finger members 422 may extend away from each other in parallel, for example, with the planar surfaces 422a of the two finger members 422 being parallel with each other and/or in a common plane (e.g., with the one of the planar surfaces 422a of each of the two finger members 422 being coplanar). When either of the finger members 422 is in the collapsed position, the finger members 422 are not simultaneously receivable in the slots 446 of the support mount. In other embodiments, the base 424 may be omitted with the finger members 422 being coupled directly to the body 410 of the camera 400, or otherwise coupled to the body 410 of the camera (e.g., with the hinge pins 428 directly engaging the body 410 of the camera 400). As compared to the extended state or positions, the finger members 422 are biased away from each other and/or toward (e.g., are closer to) the body 410 of the camera 400 when in the collapsed state or positions.

The two finger members 422 are flat, elongated members configured to be received in one of the slots 446 of the support mount 442 of the external support 440. Each finger member 422 includes a proximal portion 422b and a distal portion 422c having two planar surfaces 422a (e.g., opposed planar surfaces). The proximal portion 422b is proximal to and rotatably coupled to the base 424. The distal portion 422c extends from the proximal portion 422b and is configured to be inserted into one of the slots 446 of the external support 440. As each finger member 422 is rotated from the extended position to the collapsed position, the distal portion 422c is moved toward the body 410. As the two finger members 422 are rotated from the respective extended positions to the collapsed positions, the distal portions 422c of the two finger members are moved away from each other. The distal portion 422c may have an end shape that is rounded (e.g., semi-circular) to facilitate pivoting of the finger members 422 when coupled to the support mount 442 (e.g., about the shaft 448).

The two planar surfaces 422a of the distal portion 422c of each finger member 422 are parallel with and face away from each other. The distal portion 422c of the finger member 422 has a thickness that is measured between and perpendicular to the two planar surfaces 422a thereof. The thickness of distal portion 422c of each finger member 422 is approximately equal to the width of each slot 446 of the external support 440 into which the finger member 422 is received. As a result, the planar surfaces 422a of the finger members 422 engage the planar surfaces 444a', 444b', and 444c' of the finger members 444, which may create friction therebetween to hinder movement of the device mount 420 of the camera 400 relative to the external support 440. The thicknesses of the distal portions 422c of the two finger members 422 are the same as each other, for example, such that either finger member 422 of the device mount 420 may be inserted into either of the slots 446 of the support mount 442.

When the finger members 422 are in the respective extended positions, one of the planar surfaces 422a of each of the finger members 422 (i.e., those of the planar surfaces 422a that face away from the body 410 in the collapsed positions) are parallel with each other and spaced apart facing each other to define a slot 426 in which the central finger member 444c of the external support 440 is receivable. For example, as is shown, in the extended state, the planar surfaces 422a of the finger members 422 extend away from the body 410 of the camera 400, such as downward therefrom and/or generally perpendicular to a direction in which the lens 412 faces (e.g., forward direction). A width of the slot 426 of the device mount 420 is measured between and perpendicular to the two planar surfaces 422a of the two finger members 422 facing each other in the extended states. The width of the slot 426 of the device mount 420 is approximately equal to the thickness of the central finger member 444c of the external support 440 for receipt thereof. The width of the slot 426 of the device mount 420 may, as shown, also be approximately equal to the thickness of the two finger members 422 (e.g., within 35%, 25%, 15%, or 10% of the thickness thereof).

The finger members 422 additionally include apertures 429 extending therethrough (e.g., through the planar surfaces 422a thereof), which are configured to receive the shaft 448 of the support mount 442 therethrough. When the device mount 420 is inserted into the support mount 442 (i.e., with the finger members 422 inserted into the slots 446), the shaft 448 may be inserted through the apertures 429 of the finger members 422 and the apertures (not shown) of the support mount 442, so as to retain the device mount 420 to the support mount 442. The camera 400 may, thereby, be coupled and retained to the external support 440. Furthermore, the shaft 448 may be tightened (e.g., into the nut 450), so as to press the finger members 422 of the device mount 420 and the finger members 444 of the support mount 442 against each other to increase friction therebetween.

The finger members 422 may, for example, be made of a metal material (e.g., aluminum, steel) according to any suitable manufacturing process or combination of processes (e.g., casting and/or machining). Alternatively, the finger members 422 may be made of a polymer (e.g., injection molded plastic), composite (e.g., glass-filled nylon), or combination of metal and polymer materials (e.g., a metal inner structure hingedly coupled to the base 424 and overmolded or otherwise covered with a polymer (e.g., plastic or elastomer). In some examples, the finger members 422 are formed of a metal material (e.g., machine aluminum) that is coated with one or more additional layers (e.g., metal plating, polymer coatings, phobic coatings, paint or color, anodizing, physical vapor deposited materials, among others). The additional layers coating the metal material of the finger members 422 may, for example, provide desired friction with the support mount 442 and/or desired aesthetics (e.g., color). In one example, the finger member 422 may be formed of aluminum and coated with a physical vapor deposition and a phobic (e.g., anti-fingerprint coating). When using a polymer, composite, or combination of materials, the polymer material may insulate the planar surfaces 422a from heat conducted from the body 410 to the base 424.

As referenced above, the two finger members 422 are rotatably coupled to the base 424, which is in turn coupled to the camera 400 along the bottom side 410a of the body 410. For example, referring to FIG. 7, the base 424 may generally include a central portion 424a that is rotatably coupled to the two finger members 422, and two outer portions 424b that extend outward from the central portion 424a and are coupled to or otherwise interface with the body 410 of the camera 400. The central portion 424a and the outer portions 424b may form a unitary structure, for example, formed of metal (e.g., aluminum), polymer (e.g., injection molded plastic), composite, or combination of metal and polymer materials, or may be formed of multiple components that are coupled together.

The finger members 422 are rotatable relative to the base 424, for example, about different axes of rotation that may, for example, be parallel (as shown), intersecting, or skew. As shown, when the finger members 422 are coupled to the body 410, such as when the device mount 420 is coupled to the body 410, the axes of rotation of the finger members 422 may be statically oriented relative to the body 410 and/or the one or more lenses 412 of the camera 400. For example, while device mount 420 may be removable and the finger members 422 are able to rotate between the extended and collapsed positions, the axes of rotation do not move relative to the body 410. For example, as shown, the axes of rotation of the finger members 422 may extend (e.g., are oriented) in a forward-rearward direction and/or extend generally in a common direction in which the one or more lenses 412 face (e.g., being parallel with optical axes of the one or more lenses 412). For example, as shown, when the two finger members 422 are moved from the extended position to the retracted position, one of the finger members 422 (e.g., a right finger member) rotates toward the right side 410d of the body 410 of the camera 400 and the other of the finger members 422 (e.g., a left finger member) rotates toward the left side 410e of the body 410 of the camera 400. To distinguish between the different axes of rotation of the finger members 422, the axes of rotation may be referred to, for example, as respective axes, different respective axes, parallel axes, first and second axes, or right and left axes.

Each of the finger members 422 is coupled to the base 424, such as with a hinge pin 428. The hinge pin 428 extends through the proximal portion 422b of the finger member 422 (e.g., through a bore thereof) and the central portion 424a of the base 424. As shown, each hinge pin 428 may form the axis of rotation of the finger member 422 coupled thereto. Each hinge pin 428 may have a static position relative to the body 410 and/or the one or more lenses 412. For example, while device mount 420 may be removable from the camera 400 and the finger members 422 are able to rotate between the extended and collapsed positions, the hinge pins 428 may rotate relative to the body 410 but do not change position (e.g., in the axial or radial directions relative to the hinge pin 428), such that the axes of rotation remain in static orientation relative to the body 410. The proximal portion 422b of the finger member 422 may, for example, receive therein part of the central portion 424a of the base 424. For example, the proximal portion 422b of the finger member 422 may include end segments 422b' that are spaced apart to form a recess (e.g., a slot or gap) in which is received an outwardly-extending segment 424a' of the central portion 424a of the base 424 and through which the axes of rotation extend. As shown, the hinge pin 428 and, thereby, the axis of rotation of each finger member 422 is generally perpendicular to the direction that the apertures 429 extend through the finger member 422. The proximal portion 422b (e.g., the end segments 422b') may be rounded about the hinge pin 428 (e.g., the axis thereof). The end of the distal portion 422c may be rounded about the aperture 429 (e.g., an axis thereof). As a result, the end of the proximal portion 422b may be rounded about an axis that is perpendicular to the aperture 429 and/or the end of the distal portion 422c may be rounded about an axis that is perpendicular to the hinge pin 428 (e.g., the axis about which the finger member 422 rotates). Further, the radius of the end of the distal portion 422c may be larger than the radius of the end of the proximal portion 422b or otherwise larger than a distance from the axis of rotation to the surface of the end of the proximal portion 422b (e.g., being at least three, four, or five times greater than).

The outwardly-extending segments 424a' of the central portion 424a of the base 424 extend laterally outward (e.g., left and right) from a central segment 424a" of the central portion 424a of the base 424. For example, as shown, the outwardly-extending segments 424a' and the central segment 424a" may cooperatively form a cross-shape, such as with the outwardly-extending segments 424a' of the central portion 424a having a width (i.e., measured front to back) that is less than a width of the central segment 424a". Further, slots may be defined between central segment 424a" and the outer portion 424b in which the end segments 422b' of the finger member 422 are positioned, which may result in no portion of the base 424 being positioned between the proximal portions 422b of the finger member 422 and the body 410 of the camera 400. A sum of widths of the end segments 422b' of the finger members 422 and the width of the outwardly-extending segments 424a' may be approximately equal to a width of the central segment 424a".

Alternatively, as shown in FIGS. 18A-18E, the base 424 may be configured to be arranged between the proximal portions 422b of the finger members 422 and the external housing 419. For example, the base 424 may not define slots between the central segment 424a" of the central portion 424a and the outer portion 424b of the base 424 (e.g., with the base 424 having a generally constant thickness and/or width). For example, as described in further detail below with respect to FIGS. 18A-18E, the base 424 may instead include a generally planar portion of generally constant thickness and a cross-shaped portion (e.g., similar to that formed by the outwardly-extending segments 424a' and the central segment 424a" extending downward therefrom).

Further, the proximal portion 422b of the finger members 422 (e.g., the end segments 422b' thereof) may have a thickness (e.g., measured top to bottom in the collapsed state) that is approximately equal to a thickness of the central portion 424a of the base 424 (e.g., outwardly-extending segments 424a' and/or the central segment 424a" thereof). The thickness of the distal portion 422c (i.e., between the planar surfaces 422a) is less than the thickness of the end segments 422b' of the finger member 422. A sum of the thicknesses of the distal portion 422c of the finger member 422 and the outer portion 424b of the base (e.g., measured top to bottom in the collapsed state) may be approximately equal to the thickness of the end segments 422b' of the finger member 422, the outwardly-extending segments 424a', and/or the central segment 424a" of the central portion 424a.

When in the extended state, the finger members 422 (e.g., the proximal portion 422b and/or one of the planar surfaces 422a thereof) may abut the central portion 424a of the base 424 (e.g., the central segment 424a") to prevent further rotation toward each other. As a result, the finger members 422 are also prevented from further rotation by the central portions 244a relative to the body 410 (e.g., relative to the bottom side 410a thereof). The finger members 422, thereby, remain spaced apart to define the slot 426 of the device mount 420 between the finger members 422. When in the extended state, the apertures 429 of the finger members 422 share a common axis (e.g., of the shaft 448), which may extend perpendicular to both axes of rotation of the finger members 422 and may also be spaced below the bottom side 410a of the body 410. When in the collapsed state, the apertures 429 have different axes, which may be parallel with each other and perpendicular to both axes of rotation of the finger members 422.

When in the collapsed state, the finger members 422 abut the outer portions 424b of the base 424. A sum of a thickness of the distal portion 422c of the finger member 422 and the outer portion 424b of the base 424 may be approximately equal to the thickness of the proximal portion 422b of the finger member 422 and/or the central portion 424a of the base 424. When in the collapsed state, those planar surfaces 422a of the two finger members 422 that define the slot 426 face away from the body 410 and may be coplanar with each other. Further, when in the collapsed state, the apertures 429 of the finger members 422 have different axes that, for example, are parallel and spaced apart from each other (e.g., extending through the bottom side 410a and the top side of the body 410 of the camera 400).

While the proximal portion 422b (e.g., the end segments 422b') have a thickness that is greater than the distal portion 422c, in other configurations, the finger member 422 may be configured differently, such as having a generally constant thickness and/or being substantially planar (e.g., with planar parallel surfaces), as is illustrated with the finger members 10A-10D and 18A-18E.

Referring again to FIGS. 4B-4D, the base 424 is coupled to the camera 400 at the bottom side 410a thereof. For example, referring to FIG. 4D, the bottom side 410a of the body 410 may define a recess 414 in which is received the base 424 of the device mount 420. As is shown, when the device mount 420 is coupled to the body 410, the device mount 420 and, in particular, the base 424 is statically positioned and oriented relative to the body 410. For example, while device mount 420 may be removable and the finger members 422 are able to rotate between the extended and collapsed positions, the base 424 does not move relative to the body 410. As a result, the axes of rotation of the finger members 422 and/or the hinge pins 428 are in a static orientation relative to the body 410 of the camera 400 and/or the lenses 412 (e.g., being held in the fixed orientation by the base 424). Furthermore, as is also shown, the axes of rotation of the finger members 422 may extend through the recess 414 of the body 410 of the camera 400 and/or the hinge pins 428 may be positioned entirely with the recess 414 of the body 410 of the camera 400.

The base 424 is receivable by the recess 414 in a direction generally opposed to the side to which the base 424 is coupled (e.g., being received upward into the recess 414 on the bottom side 410a of the body 410 of the camera 400). The recess 414 may also receive the finger members 422, wholly or partially, in the collapsed positions. For example, as shown in FIG. 4C and additionally in FIGS. 9A-9D, the finger members 422 may not protrude from the recess 414 when in the collapsed state (e.g., are flush with or preferably recessed relative to surrounding surfaces of the bottom side 410a). With the device mount 420 being recessed relative to the surrounding surfaces of the bottom side 410a of the body 410 of the camera 400, the bottom side 410a may define a flat surface that allows the camera 400 to rest in a stable manner on a flat support surface (e.g., a table).

The recess 414 may have multiple depths for receipt of the base 424 of the device mount 420 and for receipt of the finger members 422 when in the collapsed state. For example, the recess 414 may have an inner region 414a and an outer region 414b, the inner region 414a being positioned inward (e.g., laterally and vertically) of the outer region 414b relative to the body 410. The inner region 414a of the recess 414 has a depth relative to the surrounding surfaces of the bottom side 410a that is greater than a depth of the outer region 414b of the recess 414.

The base 424 of the device mount 420 is received in the inner region 414a of the recess 414. The finger members 422 of the device mount 420 are received in the outer region 414b of the recess 414 when in the collapsed state. For example, the thickness of the finger members 422 (e.g., of the distal portion 422c) may be approximately the same as, or preferably less than, the depth of the outer region 414b of the recess 414. An overall thickness of the device mount 420 formed cooperatively by the thickness of the outer portion 424b of the base 424 and the thickness of the finger members 422 (e.g., the distal portion 422c between the planar surfaces 422a) may be approximately equal to or preferably less than (as shown in FIGS. 9A-9D) the depth of the inner region 414a of the recess 414. Further, the thickness of the finger members 422 (e.g., of the distal portion 422c between the planar surfaces 422a) may be approximately equal to or preferably less than (as shown in FIGS. 9A-9D) the depth of the outer region 414b of the recess 414.

As referenced above, the outer portions 424b of the base 424 extend outward from the central portion 424a. As a result, the base 424 may be considered elongated. For example, the base 424 may have a length (e.g., measured left-to-right relative to the body 410), which extends at least a majority (e.g., greater than 75%) of an overall length of the device mount 420 (e.g., measured between ends of the distal portions 422c of the finger members 422). For example, as shown, the base 424 may be sufficiently long to overlap the apertures 429 of the finger members 422. By being elongated, the base 424 may distribute loading from the device mount 420 to the camera 400 (e.g., to the body 410 or an internal structure thereof, such as a chassis) over a large area. For example, as shown, the outer portions 424b of the base 424 may be connected to the body 410 with fasteners (e.g., screws) at outer ends of the device mount 420 (e.g., two of the fasteners 417 on each of the left and right ends). Alternatively, the length of the base 424 may be shorter, for example, less than half the overall length of the device mount 420, or sufficiently short to not overlap the apertures of the finger members 422 (see, e.g., FIGS. 18A-18E).

The finger members 422, when in the collapsed positions, may block access to the fasteners (e.g., cover the fasteners). As a result, the device mount 420 may not be removable from the body 410 when the finger members 422 are the collapsed state.

The overall length of the device mount 420 may be slightly less than a length of the outer region 414b of the recess 414. By having a shorter length, ends of the distal portions 422c of the finger members 422 may be accessible within the recess 414 for a user to fold the finger members 422 outward from the collapsed state to the extended state. The distal portions 422c of the finger members 422 may further include indentations 422d (e.g., finger picks) on the ends thereof, which allow the user to pull the finger members 422 out of the recess 414 into the extended positions. Alternatively, the recess 414 may omit one or both ends thereof providing unrestricted access to the ends (e.g., the indentations 422d) of the finger members 422.

Figure 9A:
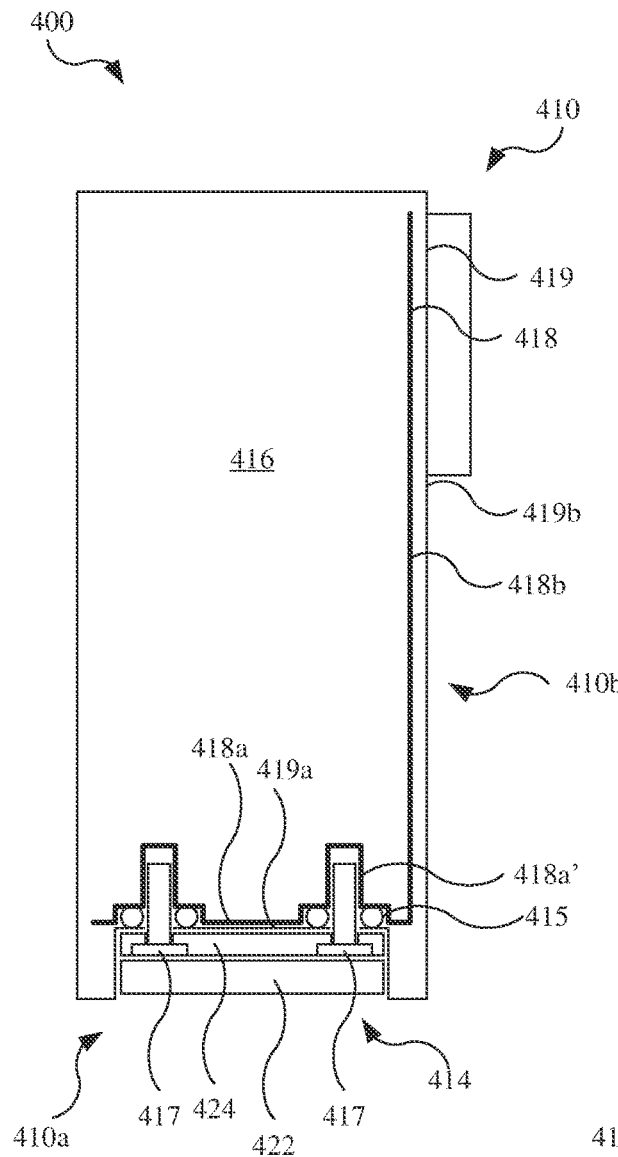
FIG. 9A is a cross-sectional view of the camera taken along line 9-9 in FIG. 4C.
Figure 9B:
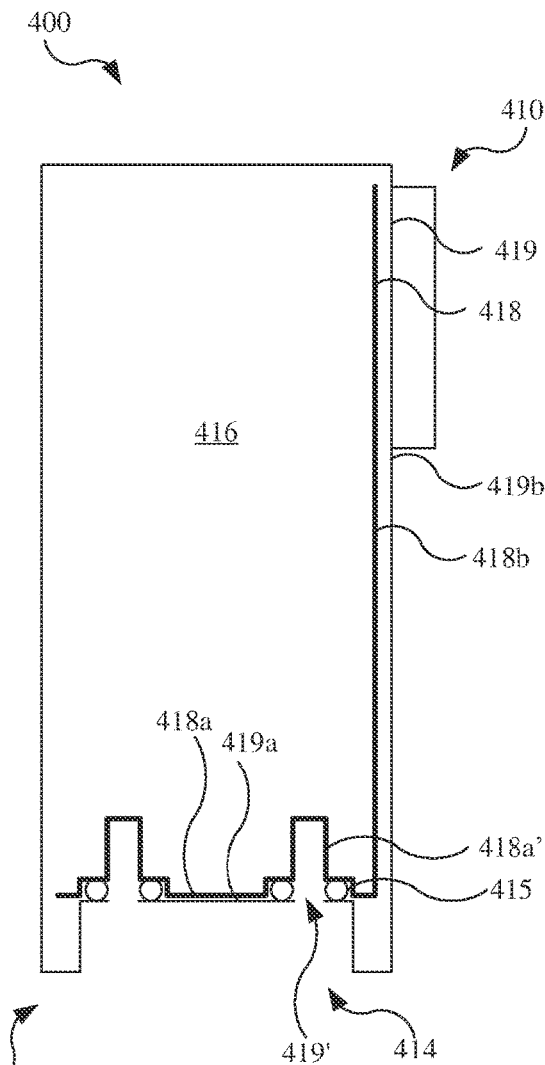
FIG. 9B is the cross-sectional view of the camera taken along line 9-9 in FIG. 4C without the mount.

Referring to the cross-sectional view FIGS. 9A-9B, the device mount 420 is configured to couple to a chassis 418 of the body 410 of the camera 400. The body 410 includes the chassis 418, which is a generally rigid structure to which the internal components of the camera 400 (e.g., the electronics, battery, etc., such as the processing apparatus 312, image sensors 314, 316, etc.) are coupled, and an external housing 419 that contains the chassis 418 and the electronic components. For example, the external housing 419 may include one or more components formed of one or more polymer materials (e.g., elastomer overmolded to plastic) that define a compartment 416 that is waterproof, so as to protect the electronics therein. For example, the external housing 419 may include two external housing components that are coupled to each other with a seal therebetween and which define a waterproof cavity therein. Any apertures in the external housing components, such as for any input/output (I/O) components (e.g., microphones, speakers, displays, power, etc.) are sealed. The chassis 418 is formed of a metal material (e.g., one or more cast aluminum components) and also functions as a heat sink to conduct heat away from the electronic components. The chassis 418 is stiffer than the external housing 419. In a variation of the body 410, the compartment 416 is not waterproof.

The chassis 418 includes a bottom segment 418a at the bottom side 410a of the body 410 and an upright segment 418b (e.g., front or rear) extending upward from the bottom segment 418a at the front side 410b or the rear side of the body 410. For example, the chassis 418 may be generally L-shaped. The bottom segment 418a sufficiently spans the thickness and/or the width of the camera 400 for being coupled to the device mount 420, such as a majority of the thickness and/or the width of the camera 400. In the case of the device mount 1820, the bottom segment 418a may instead span less than a majority of the width of the camera 400. The upright segment 418b may span a majority of the width and/or height of the camera 400 (e.g., having a forward surface area that is greater than a majority of the surface area on the front side of the camera 400). The external housing 419 similarly includes a bottom segment 419a at the bottom side 410a of the body 410 and outward of the bottom segment 418a of the chassis 418, as well as a front segment 419b at the front side 410b of the body 410 and outward of the upright segment 418b of the chassis 418. The bottom segment 419a of the external housing 419 defines the recess 414 and, further, allows the fasteners 417 (e.g., screws) to couple the base 424 of the device mount 420 directly to the chassis 418. For example, the bottom segment 418a of the chassis 418 includes four screw holes 418a' that threadably receive the fasteners 417, while the bottom segment 419a of the external housing 419 includes four corresponding through holes 419a' (labeled in FIG. 6) through which the fasteners 417 extend. Seals 415 (e.g., O-rings) extend around the screw holes 418a' and the through holes 419a' and are positioned (e.g., compressed) between the chassis 418 and the external housing 419 to prevent water leakage therebetween. Further, the screw holes 418a' are blind screw holes or are otherwise sealed, such that water does not leak through the screw holes 418a' themselves into body 410. The screw holes 418a' may engage the fasteners 417 over an axial length of, for example, above approximately 0.8 mm (e.g., above 1.0 mm) and below 3 mm (e.g., below 2 mm), such as approximately 1.2 mm or approximately 1.5 mm.

As referenced above, when the finger members 422 of the device mount 420 are in the collapsed positions, the fasteners 417 are covered, such that the fasteners 417 are not accessible and the device mount 420 is not removable from the camera 400. When the finger members 422 are moved to the extended positions, the fasteners 417 are uncovered and accessible with a suitable tool (e.g., a screw driver) and the device mount 420 is, thereby, removable from the camera 400.

Figure 9C:
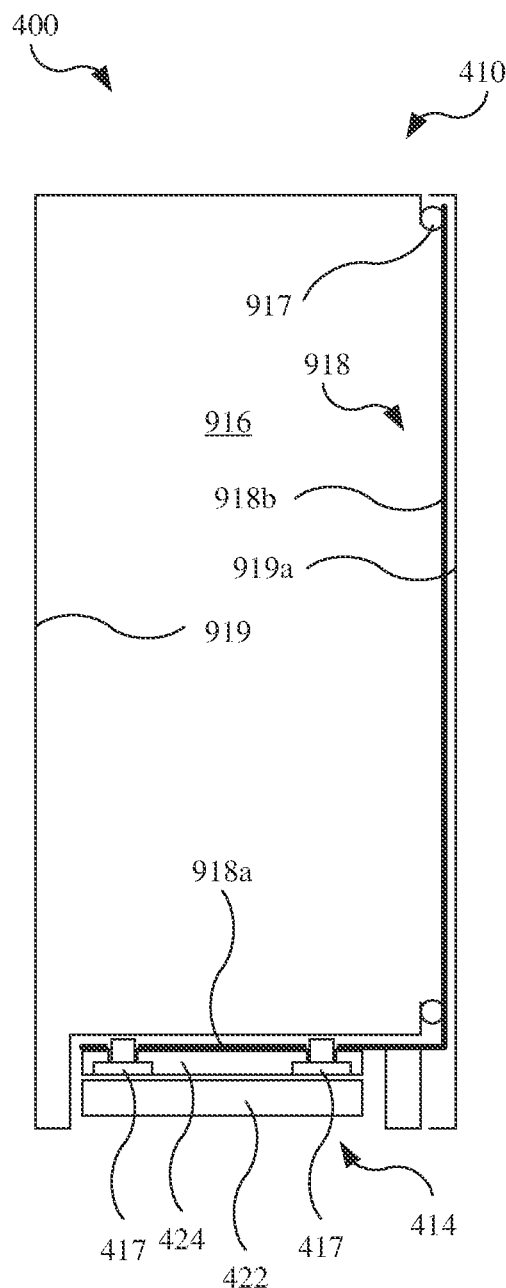
FIG. 9C is a cross-sectional view of a variation of the camera taken along line 9-9 in FIG. 4C.
Figure 9D:
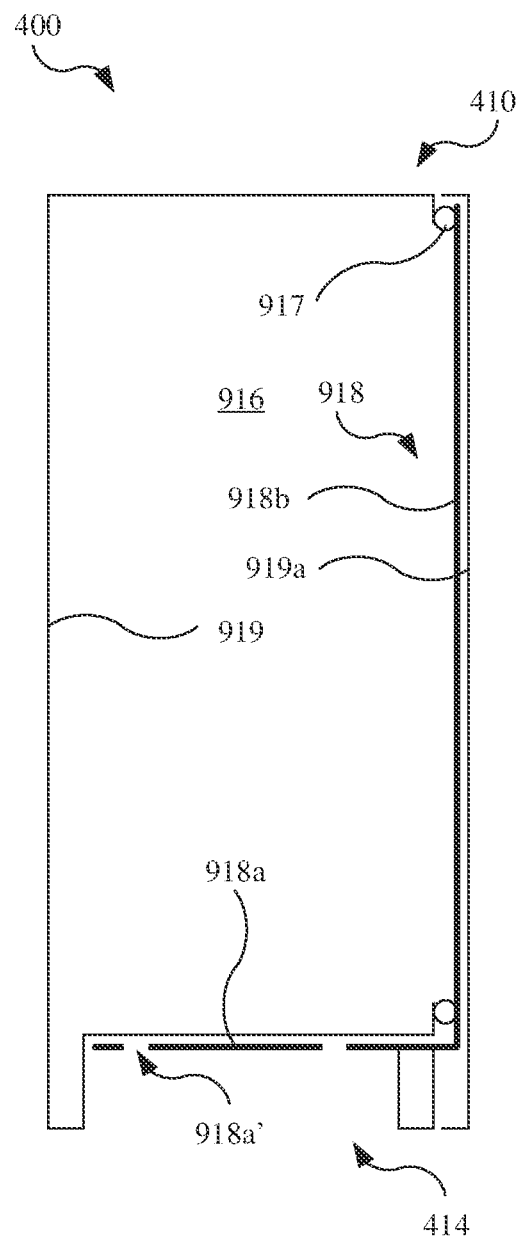
FIG. 9D is the cross-sectional view of the variation of the camera of FIG. 9C.

Referring to FIGS. 9C-9D, a variation of the body 410 includes a chassis 918 and a housing component 919 that cooperatively define a compartment 916 in which the various electronic components are positioned. Thus, rather than the chassis 918 being positioned within the compartment 416 as is the chassis 418, the chassis 918 forms a surface that itself defines an interior surface of the compartment 916. Any apertures in the chassis 918 and the housing component 919 (e.g., for I/O components) are sealed to ensure that the compartment 916 is waterproof In a variation, the compartment 916 is not waterproof.

The chassis 918 generally includes a lower segment 918a and an upright segment 918a (e.g., a front or rear segment or portion) extending upward therefrom. For example, the chassis 918 may be generally L-shaped. The lower segment 918a sufficiently spans the thickness and/or the width of the camera 400 for being coupled to the device mount 420, such as a majority of the thickness and/or the width of the camera 400. In the case of the device mount 1820, the lower segment 918a may span less than a majority of the width of the camera 400. The upright segment 918b may span a majority of the width and/or the height of the camera 400 (e.g., having a surface area that is greater than a majority of the surface area on the corresponding side of the camera 400). A cover 919a may be positioned over and/or cover from view the upright segment 918a, for example, having the same or complementary aesthetic and/or tactile properties as the housing component 919.

The chassis 918 and the housing component 919 are coupled to each other with a peripheral seal 917 therebetween, such as a gasket. The lower segment 918a is positioned outside the compartment 916, for example, being positioned below peripheral seal 917 and extending between the housing component 919 and the device mount 420 coupled thereto. With the lower segment 919b positioned outside the compartment 916, the device mount 420 may be coupled to the chassis 918 (i.e., the lower segment 918b thereof) without further waterproofing (e.g., without the seals 415 shown in FIGS. 9A-9B). For example, the chassis 918 may include screw holes 918a' in the lower segment 919, thereof, which receive the threaded fasteners 417. The screw holes 918a', being in the lower segment 919b that is outside the compartment 916, may be open holes (e.g., apertures). The screw holes 918a' may engage the fasteners 417 over an axial length of, for example, above approximately 0.8 mm (e.g., above 1.0 mm) and below 3 mm (e.g., below 2 mm), such as approximately 1.2 mm or approximately 1.5 mm.

Referring to FIGS. 10A-10D, a variation of the device mount 1020 is removable from a variation of the camera 1000 without a tool. The camera 1000 is configured similar to the camera 400 but is configured to couple to the device mount 1020 by including a stud 1016 that engages a spring clip 1027 of the device mount 1020. The stud 1016 includes a base 1016a (e.g., a plate) and a boss 1016b coupled thereto and protruding therefrom. The base 1016a is coupled to the bottom side 410a of the camera 1000, for example, being embedded in material forming the bottom segment 419a of the external housing 419. Alternatively, the base 1016a may be coupled to the chassis 418, for example, in the manner by which the base 424 is coupled to the chassis 418 (e.g., with fasteners 417, such as threaded screws). The bottom segment 419a of external housing defines a recess 414 in which the device mount 1020 is received, including an inner region 414a for receiving the base 1016a, which is deeper than an outer region 414b of the recess 414 for receiving the finger members 1022.

The boss 1016b of the stud 1016 has an outer surface with a generally constant diameter and includes opposed slots 1016c recessed into the outer surface. In an axial region that includes the slots 1016c, the boss 1016b has a variable diameter that increases moving circumferentially from a minimum diameter in the opposed slots 1016c to a maximum diameter (e.g., the generally constant diameter) at positions between the slots 1016c (e.g., rotated 90 degrees).

The device mount 1020 includes finger members 1022, a base 1024, and a spring clip 1027. The finger members 1022 are pivotally coupled to the base 1024 in substantially the same manner as the finger members 422 (e.g., within hinge pins extending therethrough). The base 1024 is a tubular member having an inner surface with a generally constant diameter that is larger than the diameter of the outer surface of the boss 1016b and having an outer surface with a generally constant diameter that is smaller than a dimension (e.g., diameter) of the inner region 414a of the recess 414. The base 1024 additionally includes slots 1024a that are opposed to each other and extend radially outward into the inner surface of the base 1024 (e.g., being an aperture extending entirely through the wall thereof).

The spring clip 1027 is configured to releasably couple the base 1024 to the boss 1016b of the camera 1000. In particular, the spring clip 1027 is configured to be received by both the slots 1016c of the boss 1016b and the slots 1024a of the base 1024. The spring clip 1027 is a generally ring-shaped member having an end portion (e.g., a lower end) with flanges 1027a that are positioned within the slots 1024a of the base 1024 and which are receivable by the slots 1016c of the boss 1016b. A central portion of the spring clip 1027 extends axially between (e.g., along) the inner surface of the base 1024 and the outer surface of the boss 1016b, and another end portion (e.g., an upper end) of the spring clip 1027 extends radially outward between an axial end of the base 1024 and the base 1016a of the stud 1016.

Figure 10A:
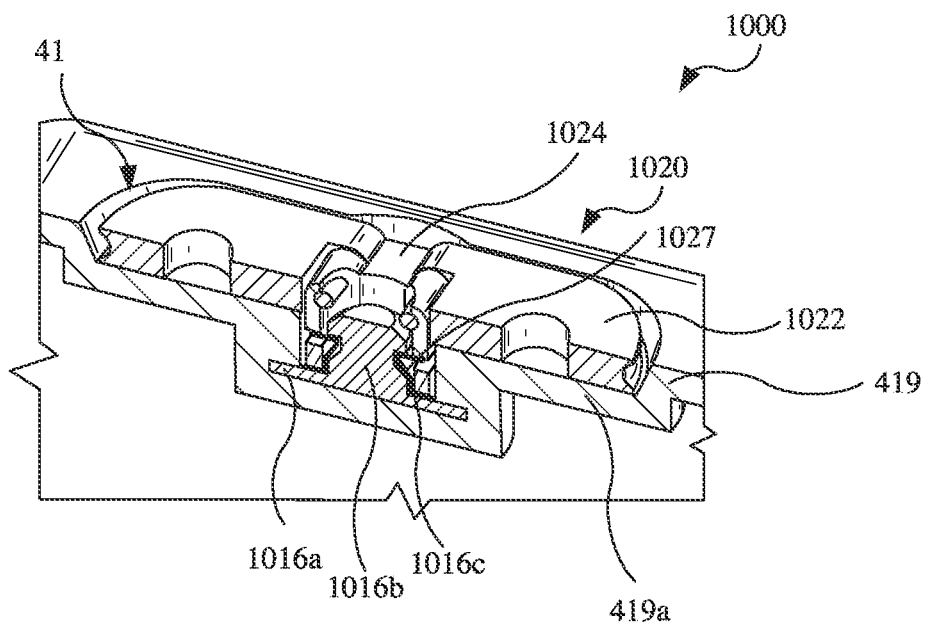
FIG. 10A is an upside down, bottom perspective, cross-sectional view of a camera having another embodiment of a mount.
Figure 10B:
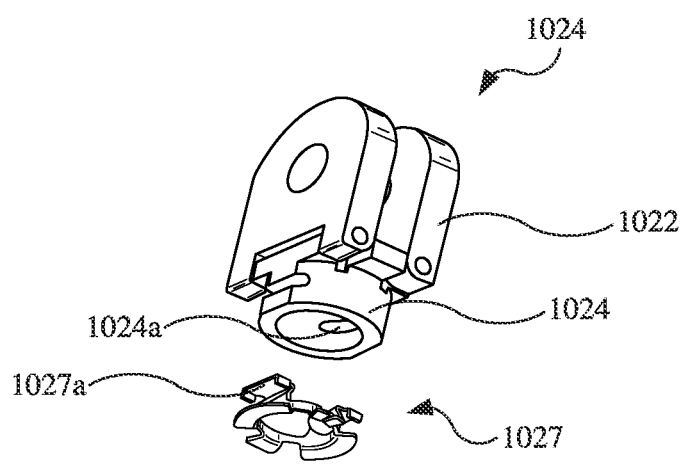
FIG. 10B is an upside down, bottom perspective, exploded view of the mount of FIG. 10B.
Figure 10C:
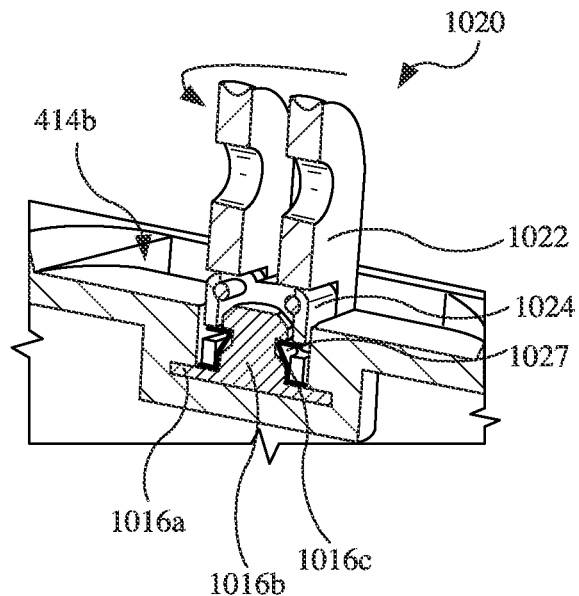
FIG. 10C is an upside down, bottom perspective, cross-sectional view of the camera with the mount of FIG. 10A in an extended and connected state.

In FIGS. 10A and 10C, the device mount 1020 is coupled to and retained on the stud 1016 of the camera 400, which may be referred to as a connected state. In particular, the flanges 1027a of the spring clip 1027 are positioned in both the slots 1016c of the stud 1016 (protruding radially inward therein) and the slots 1024a of the base 1024 (protruding radially outward therein), so as to prevent relative axial movement between the stud 1016 (i.e., the camera 1000) and the base 1024 (i.e., the device mount 1020).

Figure 10D:
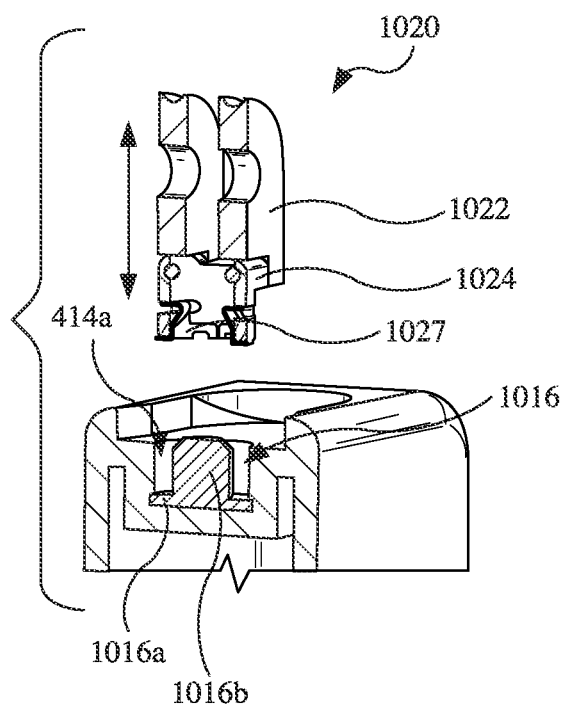
FIG. 10D is an upside down, bottom perspective, cross-sectional view of the camera with the mount of FIG. 10B in an extended and disconnected state.
Figure 11:
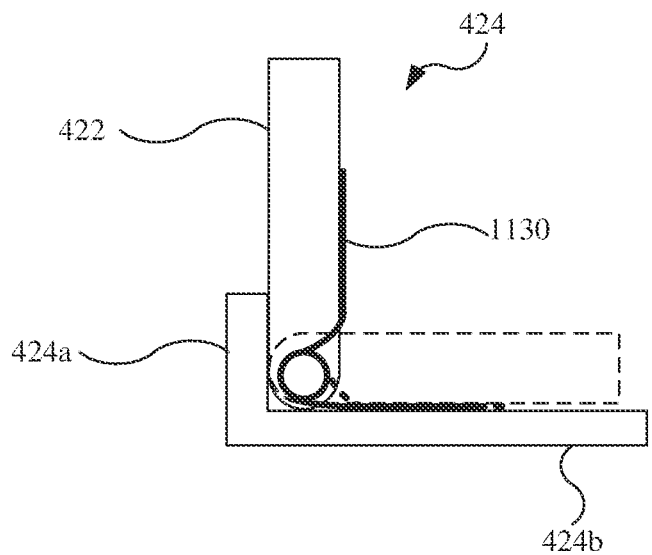
FIG. 11 is a partial, upside down view of the mount having a retention mechanism.

In FIG. 10D, the device mount 1020 is axially removable from the stud 1016, which may be referred to as a disconnected or disconnectable state. More particularly, the device mount 1020 is rotated by 90 degrees relative to the stud 1016 in the connected state, such that the flanges 1027a of the spring clip 1027 are not aligned with the slots 1016c of the boss 1016b but are instead aligned with those regions therebetween in which the outer surface of the boss 1016a has the maximum diameter. In the disconnected state, the finger members 1022 are in the extended state (discussed above with the respect to the finger members 422) and rotated 90 degrees relative to the outer region 414b of the recess 414. As the base 1024 of the device mount 1020 is received on the stud 1016 of the camera 400, the boss 1016b presses the flanges 1027a of the spring clip 1027 outward further into the slots 1024c of the base. The device mount 1020 is subsequently rotated by 90 degrees into the connected state (e.g., by a user grasping the finger members 1022), such that the flanges 1027a of the spring clip 1027 bias inward (e.g., spring inward) for receipt into the slots 1016c on the boss 1016b. The finger members 1022 may then be pivoted into the outer region 414b of the recess 414 into the collapsed stated.

To remove the device mount 1020, the finger members 1022 are pivoted out of the recess 414, and the device mount 1020 is rotated by 90 degrees, such that the flanges 1027a of the spring clip 1027 are rotated out of the slots 1016c of the boss 1016b and biased outward as the diameter of the outer surface of the boss 1016b engaged thereby increases. The device mount 1020 may then be removed axially from the boss 1016b of the stud 1016, since the flanges 1027a of the spring clip 1027 are no longer retained in the slots 1016c of the boss 1016b.

Referring to FIG. 5 and FIGS. 11-17 the camera 400 and the device mount 420, or variations thereof, may be configured to hold (e.g., retain or maintain) the two finger members 422 in the extended state and/or in the collapsed state. For example, as shown in FIG. 4C, the finger members 422 may form an interference fit with the recess 414. For example, outer surfaces of the finger members 422 (e.g., those extending between the planar surface 422a thereof) may engage inner surfaces of the bottom side 410a of the body 410, which define the recess 414, such that friction therebetween retains the finger members 422 in the recess (i.e., in the collapsed position).

As shown in FIGS. 11-17, the device mount 420 may include one or more retention mechanisms by which the finger member 422 is held in the extended position or the collapsed position relative to the base 424. In an example shown in FIG. 11, a spring 1130 (e.g., a torsion spring) biases one of the finger members 422 about the axis of rotation into the extended state. For example, the spring 1130 may bias the finger members 422 against the central segment 424a" of the central portion 424a of the base 424 into the extended state (shown in solid lines) from the collapsed state (shown in dashed lines). The spring 1130 may alternatively normally bias the finger member 422 to the collapsed state. The retention mechanism may also be referred to as retainers and components thereof may be referred to as retaining components.

Figure 12:
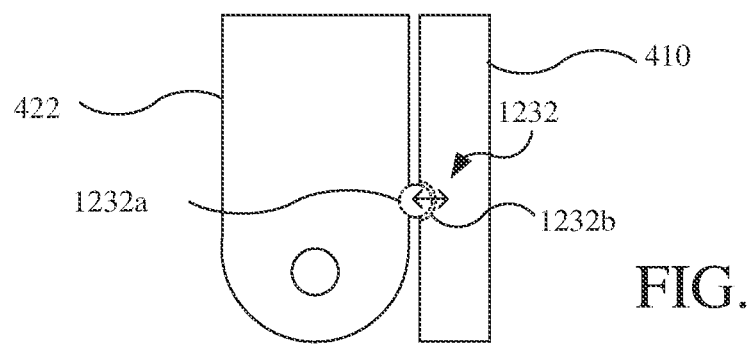
FIG. 12 is a partial view of the mount having another retention mechanism.

As shown in FIG. 12, a retention mechanism is configured as a latch 1232 that retains the finger member 422 in the collapsed state. For example, the latch 1232 includes a sprung protrusion 1232a on an edge of the finger member 422, which engages and is received by a detent 1232b in the body 410 (e.g., in the recess 414 of the body 410 as shown). The sprung protrusion 1232a may itself be elastic (e.g., being formed of an elastomer) or may include a biasing spring that presses the sprung protrusion 1232a into the detent 1232b. As the user forces the finger member 422 to move between the collapsed and extended states, the structure surrounding and defining the detent 1232b applies a lateral force (e.g., generally parallel with the axis of rotation) against the sprung protrusion 1232a, thereby biasing the sprung protrusion 1232a out of the detent 1232b for release thereof and of the finger member 422. The sprung protrusion 1232a and the detent 1232b may be arranged in an opposite configuration with the sprung member 1232a as part of the body 410 of the electronic device and the detent 1232b on the finger member 422. In a further alternative, the latch 1232 may include a latch release interface, such as a button, that may be pressed by the user to release the finger member 422 for movement.

Figure 13:
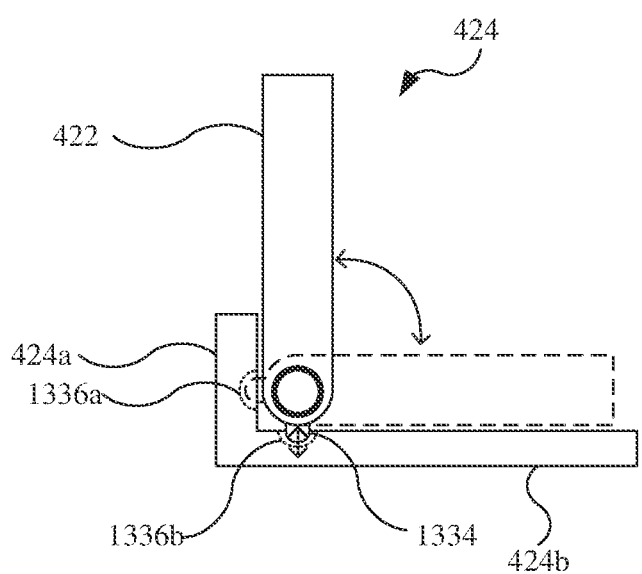
FIG. 13 is a partial view of the mount having another retention mechanism.

In another example shown in FIG. 13, the proximal portion 422b of the finger member 422 may engage detents in the base 424 the extended and/or collapsed states (both as shown). The finger member 422 includes a sprung protrusion 1334 that moves longitudinally (e.g., generally parallel with the finger member 422). The base 424 includes two detents 1336a, 1336b in the central portion 424a and the outer portion 424b, respectively, which receive and hold the sprung protrusion 1334a and, thereby, the finger member 422 in the collapsed and the extended positions, respectively.

Figure 14:
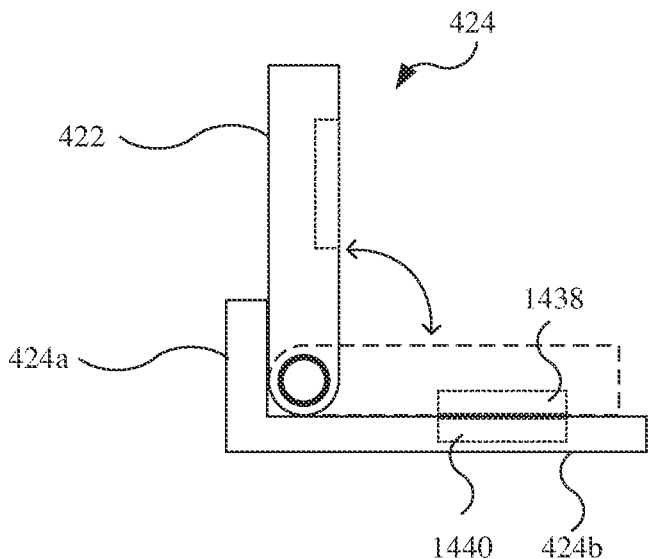
FIG. 14 is a partial view of the mount having another retention mechanism.

In another example shown in FIG. 14, the finger member 422 is retained in the collapsed position magnetically. For example, the finger member 422 includes a magnetic component 1438 (e.g., a permanent magnet or an attractor plate), while the base 424 includes another magnetic component 1440 attracted thereby (e.g., an attractor plate or a permanent magnet). The base 424 may itself form the other magnetic component 1440 (e.g., being formed of steel or other ferromagnetic material). The magnetic component 1438 may instead be incorporated into the body 410 (e.g., in the external housing 419 and/or the chassis 418 therein). The magnetic components 1438 or 1440 may, for example, be a permanent magnet formed of a suitable material, such as those described for the magnetic feature 1822h described below. The magnetic components 1438, 1440 magnetically couple to each other with a desired force (e.g., an opening force) to retain the finger member 422 in the collapsed position, while still allowing the finger member 422 to be moved easily by the user to the extended position. For example, the for example, magnetic components 1438, 1440 may magnetically couple to each other to require an opening force the finger member 422 of above 0.5 N (e.g., above 1.0 N or above 1.5 N) and below 5 N (e.g., below 4 N, or below 3 N), such as between approximately 1.5 and 2.5N (e.g., approximately 2 N), which may be measured at the distal portion 422c of the finger member 422 (e.g., at the finger pick) or the location of the magnetic component 438.

Figure 15:
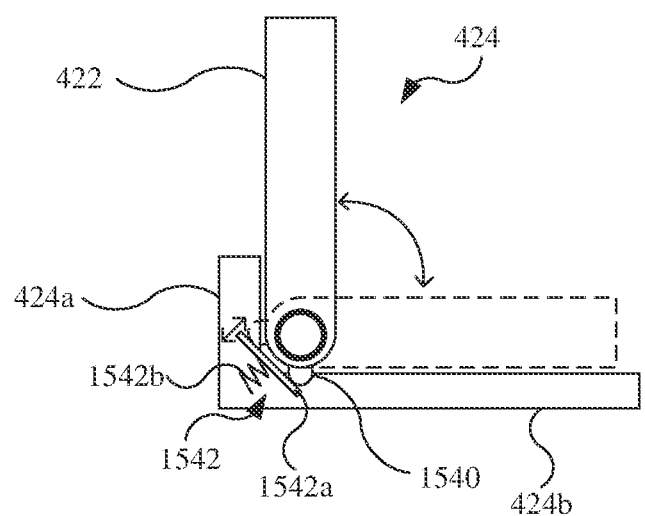
FIG. 15 is a partial view of the mount having another retention mechanism.

In another example shown in FIG. 15, the finger member 422 is retained in the collapsed and extend positions with an over-center device 1542. The over-center device 1542 includes sprung surface that engages the proximal portion 422b of the finger member 422 (e.g., a protrusion 1540 thereof). The sprung surface is biased generally toward the pivot axis to apply spring force to the proximal portion 422b of the finger member 422, which generates torque about the pivot axis that biases the distal portion 422c into either the collapsed or extended position. As the finger member 422 is pivoted between the collapsed and extended positions and crosses a mid-point in the angular range of travel, the torque generated by the spring force changes direction so as to bias the finger member 422 toward the other of the collapsed or extended position.

As illustrated schematically, the over-center device 1542 includes a spring surface 1542a that is normally biased by a spring 1542b toward the pivot axis. The spring surface 1542a may be a plate member, while the spring 1542b may be a coil spring that applies force between the base 424 and the plate member. Alternatively, the spring surface 1542a and the spring 1542b may be cooperatively formed by a single spring element (e.g., a flat torsion spring).

Figure 16:
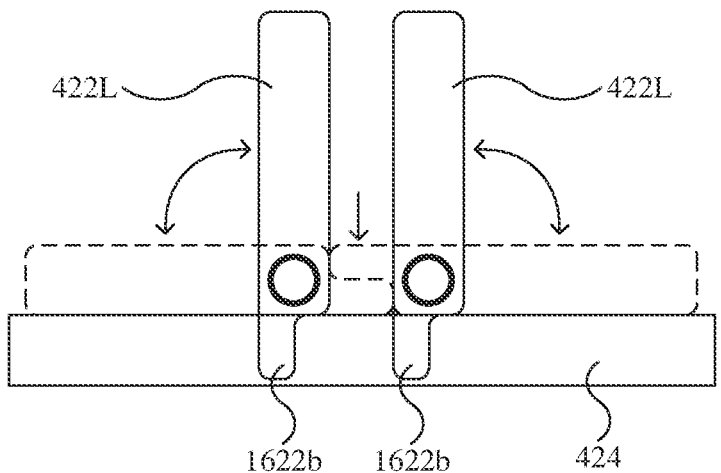
FIG. 16 is a partial view of the mount having another retention mechanism.

In another example shown in FIG. 16, movement of one of the finger members 422 causes movement of the other finger member 422. As illustrated, a right finger member 422R and a left finger member 422L include proximal portions 1622b that overlap each other. As the user moves one of the finger members 422, the proximal portions 422b engage each other such that the other of the finger members 422 moves.

Figure 17:
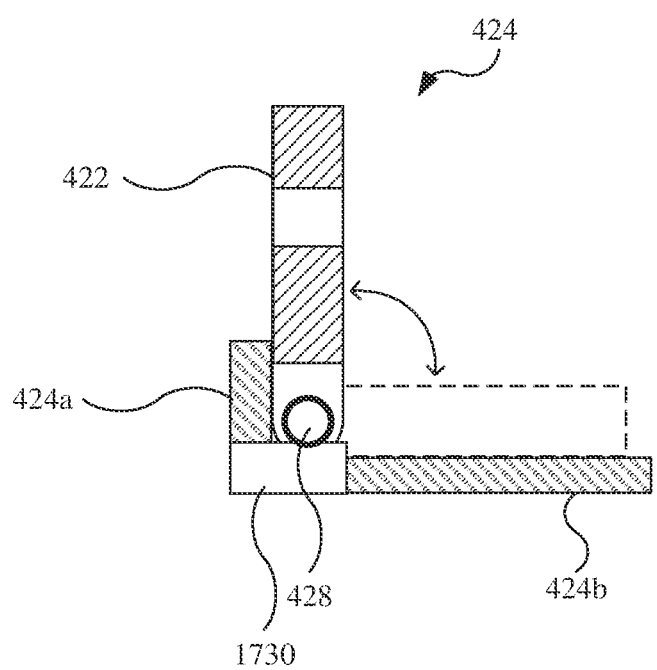
FIG. 17 is a partial view of the mount having another retention mechanism.

In another example shown in FIG. 17, the finger member 422 is retained in the collapsed, extended, and/or intermediate positions frictionally. For example, the finger member 422 includes the hinge pin 428. The finger member 422 and the hinge pin 428 are rotationally fixed, for example, with the hinge pin 428 being tightly received by the proximal portion 422b of the finger member 422 (e.g., being press-fit into apertures thereof). The hinge pin 428 is in turn frictionally engaged with the base 424 to prevent rotation therebetween. For example, the friction between the hinge pin 428 and the base 424 may be sufficient to prevent rotation of the finger member 422 relative to the base 424 due to the force of gravity.

The friction between the hinge pin 428 and the base 424 may be provided by a friction pad 1730 (e.g., a friction component). For example, the hinge pin 428 may be received by and rotate within apertures of the base 424 (not shown), while the friction pad 1730 presses against the hinge pin 428 in a radial direction to generate friction therebetween. The friction pad 1730 may also press the hinge pin 428 against the base 424 (e.g., those portions defining the apertures in which the hinge pin 428 is received), such that additional friction is generated between the hinge pin 428 and the base 424. The friction pad 1730 may, for example, be an elastic material (e.g., an elastomer, such as rubber, or other polymer). Instead or additionally, the proximal portion 422b (e.g., an end thereof) may be frictionally engaged, such as with friction pad similar to the friction pad 1730 or portion of the body 410 of the camera 400 engaging the end thereof, for example, with the end have a rounded surface concentric with the axis of rotation (e.g., of the hinge pin 428).

It should be noted that the retention mechanisms disclosed in FIGS. 11-17 may be used in any suitable combinations with each other. For example, the spring 1130 of FIG. 11 may be used in combination with the latch 1232 of FIG. 12 or the magnetic components 1438, 1440 of FIG. 14. In another example, the finger member 422 may be retained both frictionally (e.g., as describe with respect to FIG. 17) and magnetically (e.g., described with respect to FIG. 14).

Referring to FIGS. 18A-18E, a variation of the device mount 1820 is includes two finger members 1822, a base 1824, and hinge pins 1826.

The finger members 1822 may have a substantially planar configuration with opposed planar surfaces 1822a that extend parallel with each other from a proximal end 1822b to a distal end 1822c thereof (e.g., similar to the finger member 1022). As with the finger member 422, the finger member 1822 includes an aperture 1822d that extends therethrough (e.g., in a normal direction to the planar surfaces 1822a). The aperture 1828d is for receiving the shaft 448 for coupling the device mount 1820 to the support mount 442. The finger members 1822, when extended, are inserted into the slots 446 of the support mount 442, while the shaft 448 is inserted through the apertures 1822d of the finger member 1822 and the apertures (not shown) of the support mount 442.

The distal end 1822c of the finger member 1822 may be rounded, for example, having a semicircular cross-sectional shape about the aperture 1822d to permit rotation of the finger member 1822 when coupled o the support mount 442. The distal end 1822c of the finger member 1822 may include an indentation 1822g, which forms a finger pick to facilitate the user removing the finger member 1822 from a recess of the external housing 419 of the camera 400 in which the device mount 1820 is positioned and for rotating the finger member 1822 (see FIG. 18E).

The proximal end 1822b of the finger member 1822 includes end segments 1822b' that are spaced apart to form a recess 1822e (e.g., a gap or slot) in which is received a hinge portion of the base 1824 as described below. The proximal end 1822b further includes apertures 1822f extending through the end segments 1822b' in each of which is received one of the hinge pins 1826. The apertures 1822f and the hinge pin 1826 are configured to be rotationally fixed to each other (e.g., to rotate with each other), for example, with the hinge pin 1826 being press-fit into the apertures 1822f. The proximal end 1822b of the finger member 1822 may be rounded (e.g., being semi-circular in cross-section along the axis of the hinge pin 1826) to permit rotation, while being in close proximity to other structures (e.g., the base 1824).

The base 1824 generally includes a coupling portion 1824a (e.g., plate portion) and a hinge portion 1824b. The coupling portion 1824a is configured to couple to the camera 400. As shown, the coupling portion 1824a is a generally planar structure having apertures 1824c through which fasteners (not shown; see, e.g., fasteners 417) extend to couple the base 1824 to the camera 400 (e.g., similar to the base 424 of the device mount 420). The base 1824 may have a length that is relatively short as compared to the base 424, for example, being positioned between the apertures 1822d (e.g., not overlapping the apertures 1822d) of the finger members 1822 when in the collapsed position. As shown in FIG. 18E, the base 1824 may be received in the recess 414 of the external housing 419 of the camera 400. As a result, the finger members 1822 may be flush against or otherwise contact the external housing 419 when in the collapsed position. Furthermore, as also shown in FIG. 18E, the finger members 1822 and the base 1824 may be slightly recessed relative to the external housing 419, such that when the finger members 1822 are collapsed, the camera 400 may rest stably on a surface without the interference from the finger members 1822 engaging the surface.

The hinge portion 1824b protrudes from the coupling portion 1824a for the finger members 1822 to hingedly couple thereto. The hinge portion 1824b generally includes a central segment 1824b' and two outwardly extending segments 1824b". Each of the two outwardly extending segments 1824b" is received by the recess 1822e of one of the finger members 1822 and includes an aperture 1824c for receiving the hinge pin 1826 therein. The aperture 1824c and the hinge pin 1826 are cooperatively configured to permit the finger member 1822 to rotate about an axis formed thereby (e.g., about the hinge portion 1824b of the base 1824).

The central segment 1824b' is positioned between the two outwardly extending segments 1824b" and the finger members 1822. As the finger members 1822 are rotated from the collapsed positions to the extended positions, the central segment 1824b' may engage the finger members 1822 (e.g., the planar surfaces 1822a thereof) to maintain proper spacing between the finger members 1822 for receipt thereof into the slots 446 of the support mount 442 and to receive the central finger member 444c of the support mount 442 therebetween.

To facilitate coupling of the finger members 1822 to the base 1824, the base 1824 may include a base member 1824e and a base cap 1824f. The base member 1824e is a structure that forms the coupling portion 1824a and first part of the hinge portion 1824b, while the base cap 1824f forms a remaining part of the hinge portion 1824b. More particularly, the base member 1824e and the base cap 1824f cooperatively define the apertures 1824c, for example, each forming a semi-circular half thereof. Thus, to assemble the device mount 1820, the hinge pins 1826 are coupled to the finger members 1822 (e.g., being press fit therein), the hinge pins 1826 are placed in the semi-circular half of the aperture formed by the base member 1824e of the base 1824, and the base cap 1824f is then coupled to the base member 1824e, capturing the hinge pins 1826 therebetween. The base cap 1824f may be coupled to the base member 1824e, for example, with fasteners. In one embodiment, the base member 1824e is formed of a metal material (e.g., steel or other ferromagnetic material or aluminum), while the base cap 1824f is formed of metal, plastic, or other polymer material. The base cap 1824f being formed of plastic or other polymer may be advantageous by being a heat insulator, so as to hinder conduction of heat generated by the camera 400 to an exposed surface of the camera 400.

Alternatively, the base 1824 may be a unitary structure with the hinge pins 1826 being received axially by the apertures 1824c. For example, as shown in FIGS. 18F-18G, a base 1824' and a base member 1824e' thereof, which are variations of the base 1824 and the base member 1824e, may itself define the apertures 1824c in which are positioned the hinge pins 1826 (i.e., without the base cap 1824f). For example, the hinge pins 1826 may be inserted axially through the apertures 1822f of each of the finger members 1822 of the aperture 1824c of the base member 1824e' of the base 1824, so as to couple the finger members 1822 to the base member 1824e'. An outer surface of the base member 1824e' may be exposed, such that heat is conducted from the chassis (e.g., the chassis 418 or 918) of the body 410 of the camera 400 to the surface of the base member 1824e' (e.g., by the metal structure formed thereby). Alternatively, an insulative cap (not shown) or other heat insulative layer or material, which may not function to retain the hinge pin 1826 to the base, may be coupled to the base member 1824e' to insulate heat conducted through the base member 1824e'.

As shown and described above with respect to the device mount 420, when the device mount 1820 is coupled to the camera 400, the axes of rotation of the finger members 1822 may be in a static orientation (e.g., fixed orientation) relative to the body 410 of the camera 400 (e.g., relative to the sides thereof and/or the lens 412, such as extending forward and backward and/or passing through the recess 414 of the body 410 of the camera 400. For example, as shown, the hinge pins 1826 may be held in a static position and/or be positioned entirely within the recess 414 of the body 410 of the camera 400, for example, being held in the static position by the base 1824 that is statically coupled to the body 410 of the camera 400. It should be noted that while the hinge pins 1826 are in static positions, the hinge pins 1826 themselves may rotate (e.g., with the finger members 1822), while axes of the hinge pins 1826 (e.g., the axes of rotation of the finger members 1822) remain in static orientation relative to the body 410.

The device mount 1820 may additionally be configured to hold the finger members 1822 in the extended and/or collapsed states magnetically and/or fictionally. For example, the finger members 1822 may be held frictionally in the extended state, and may be held magnetically in the collapsed state.

The device mount 1820 frictionally maintains the finger members 1822 in the extended state generally described above with respect to FIG. 17. In particular, the device mount 1820 includes a friction pad 1828, which may be considered part of the base 1824. The friction pad 1828 presses against one or both of the hinge pins 1826 to generate friction therebetween for holding one or both of the finger members 1822 in the extended position. The friction pad 1828 may further press the hinge pins 1826 against the base 1824 (e.g., the hinge portion 1824b, which may be formed by the base cap 1824f) to generate friction therebetween for holding one or both of the finger members 1822 in the extended position. The friction between the base 1824 (e.g., the friction pad 1828 and/or the hinge portion 1824b) and each hinge pin 1826 is sufficient to at least overcome the force of gravity acting on the finger members 1822 to maintain the finger member 1822 in the extended position.

Figure 18A:
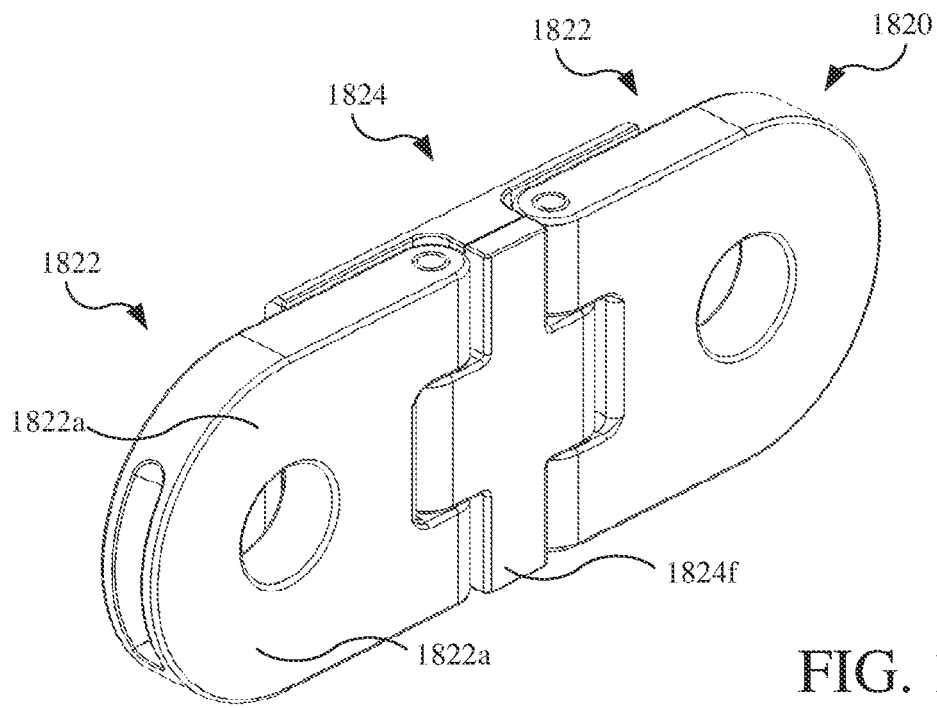
FIG. 18A is a bottom perspective view of another embodiment of a mount in a collapsed state.
Figure 18B:
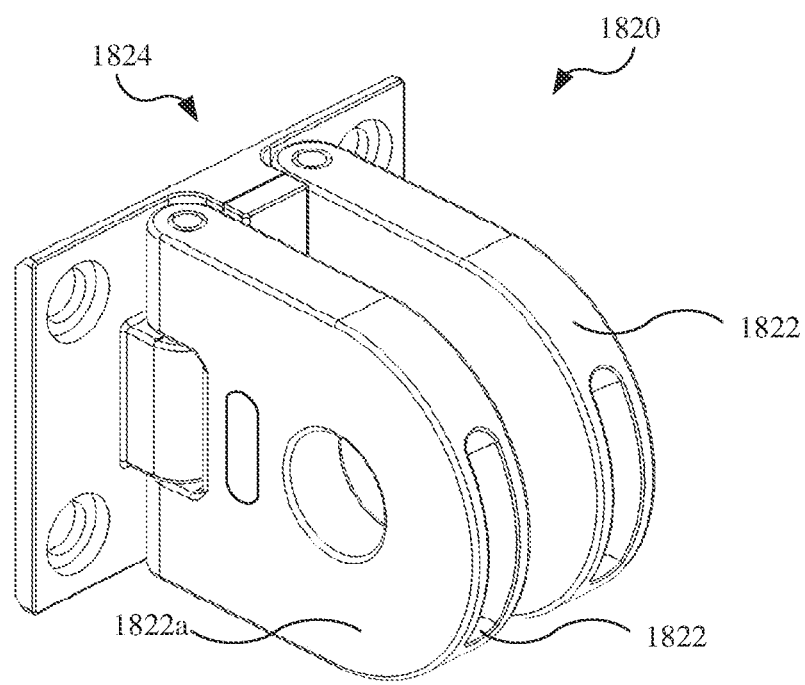
FIG. 18B is a bottom perspective view of the mount of FIG. 18A in an extended state.
Figure 18C:
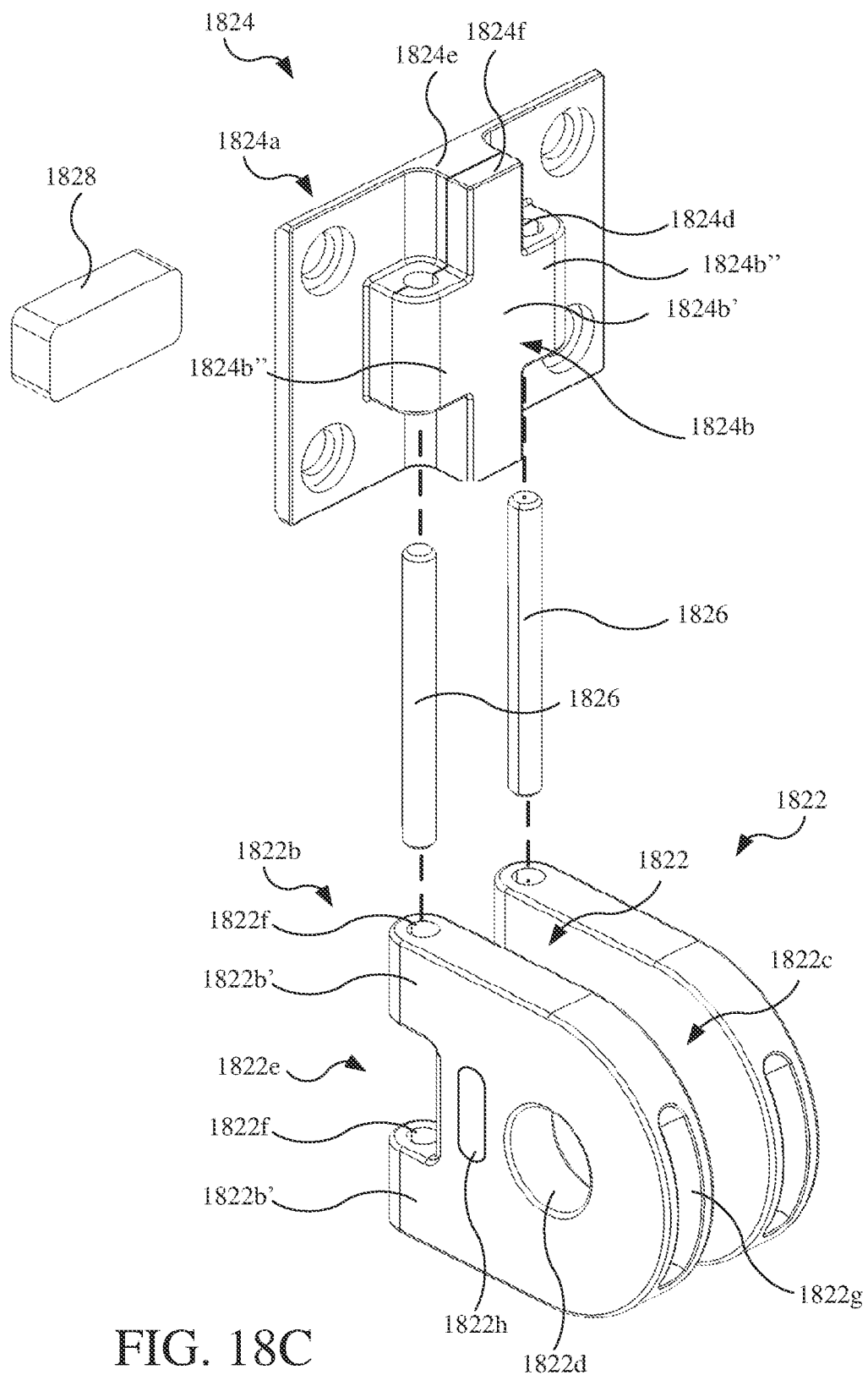
FIG. 18C is a bottom perspective, exploded view of the mount of FIG. 18A in the extended state.
Figure 18D:
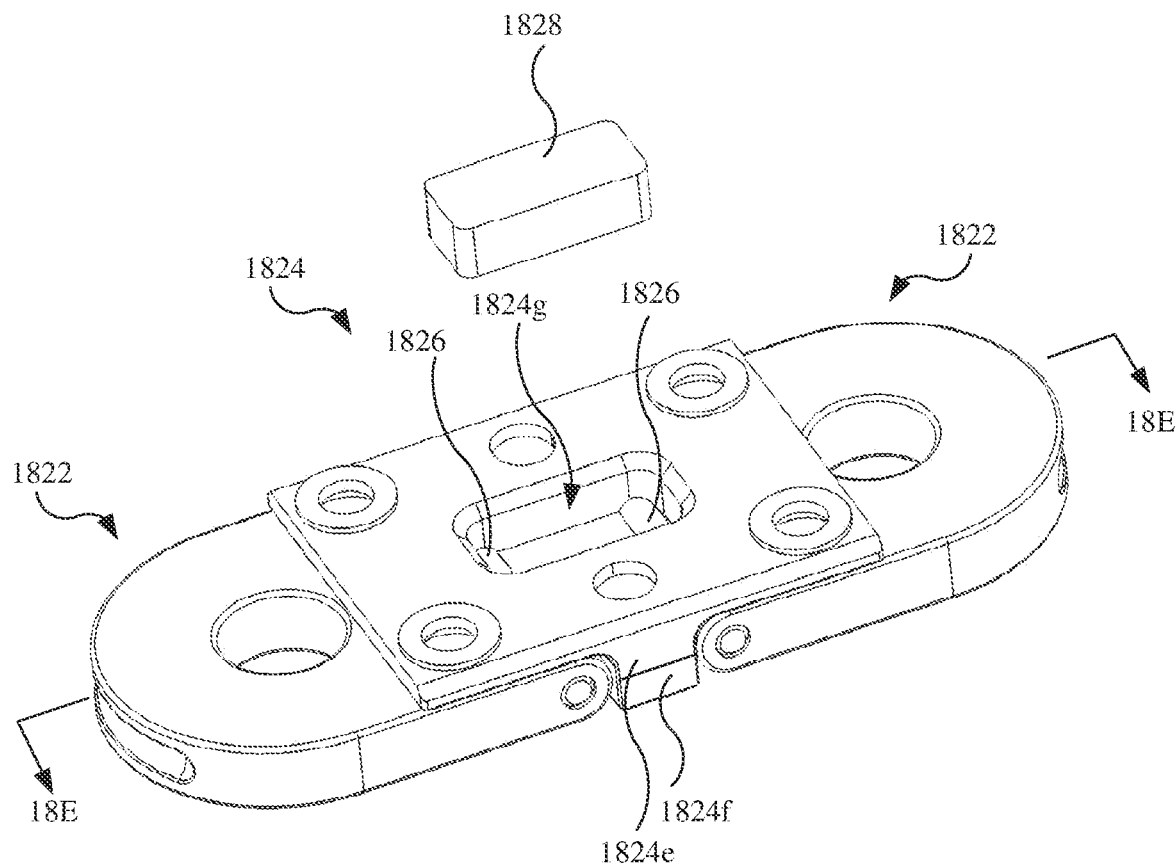
FIG. 18D is a top perspective, partial exploded view of the mount of FIG. 18A in the collapsed state.
Figure 18E:
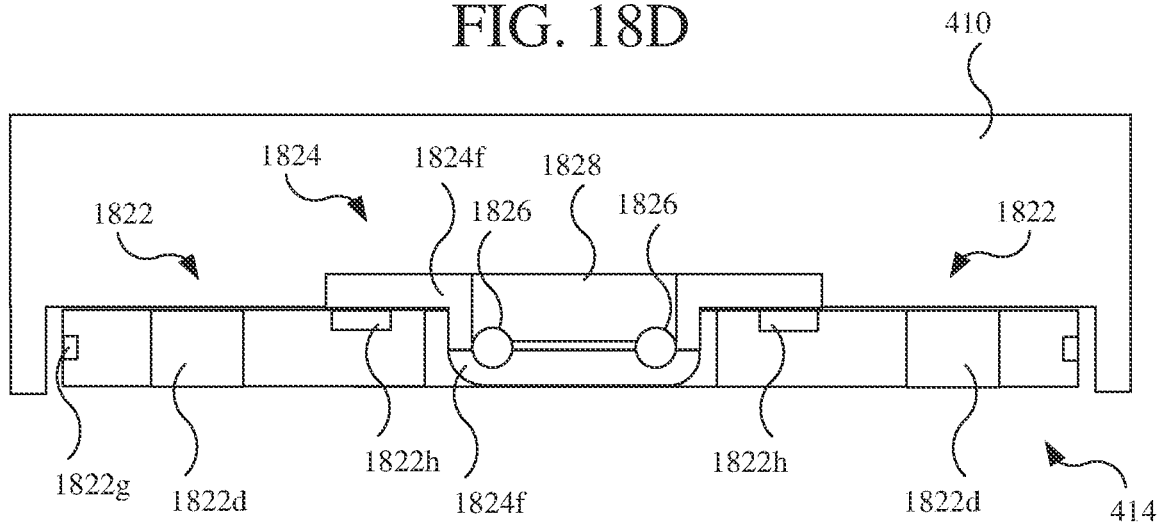
FIG. 18E is a simplified cross-sectional view of the mount taken along line 18E-18E in FIG. 18D.
Figure 18F:
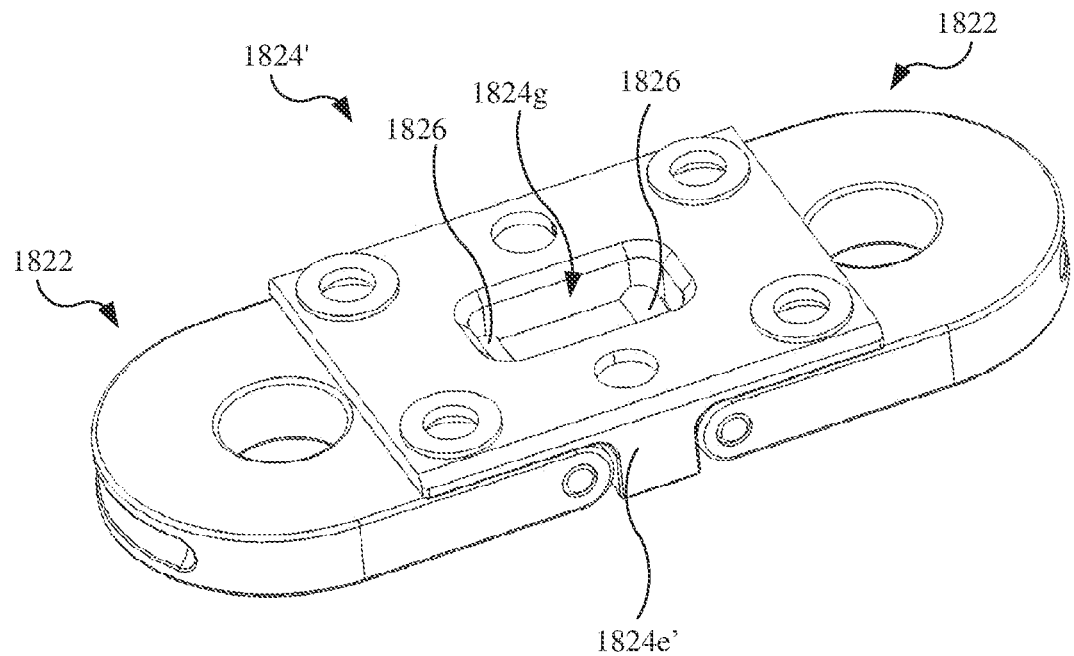
FIG. 18F is a bottom perspective view of a variation of the mount of FIG. 18A.
Figure 18G:
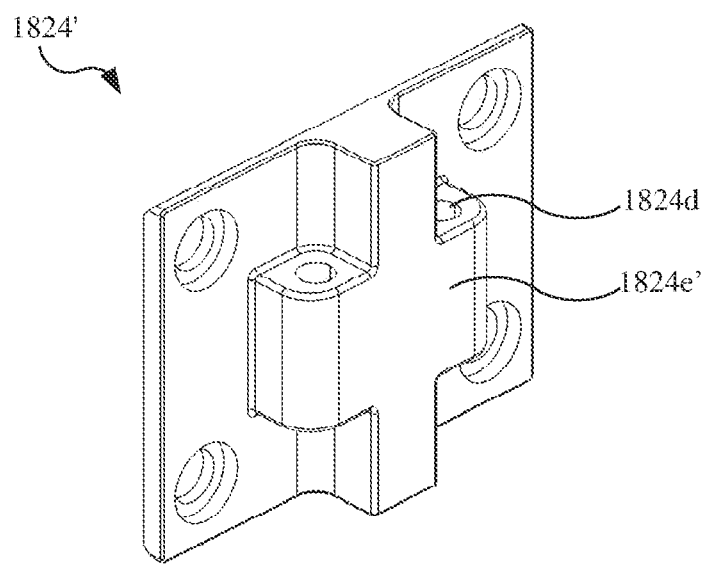
FIG. 18G is a bottom perspective view of a base of the variation of the mount of FIG. 18F.

As illustrated in FIGS. 18D and 18E, the hinge pins 1826 are pressed between the friction pad 1828 and the hinge portion 1824b of the base 1824 (e.g., against the surface defining the aperture 1824c, such as the base cap 1824f). As shown, the base 1824 defines a cavity 1824g (e.g., a recess) through which the hinge pins 1826 extend and in which the friction pad 1828 is positioned against the hinge pins 1826. The cavity 1824g has a depth, which is less than the cumulative height of the friction pad 1828 and the hinge pins 1826, such that the friction pad 1828 is compressed by the hinge pins 1826. As shown in FIG. 18D, the cavity 1824g has an upper opening from which the friction pad 1828 protrudes, so as to engage a surface of the external housing 419 of the camera 400 (see FIG. 18E). Alternatively, the cavity 1824g may be closed at an upper end (e.g., the coupling portion 1824a being continuous), while the friction pad 1828 is received by a lower opening that is enclosed by the base cap 1824f.

The device mount 1820 magnetically maintains the finger members 1822 in the collapsed state as generally described above with respect to FIG. 14. In particular, the finger member 1822 includes a magnetic feature 1822h, which forms a magnetic coupling with the base 1824. As shown, the magnetic feature 1822h is arranged between the hinge pin 1826 and the aperture 1822d of the finger member 1822. The magnetic feature 1822h may, for example, be a permanent magnet that is embedded into the material forming the finger member 1822, for example, to be flush with or recessed relative to the planar surface 1822a nearest the base 1824. For example, as described above with respect to the finger member 422, the material forming the finger member 1822 may be aluminum, which may be further coated with other materials (e.g., vapor deposited material, phobic coating, etc.). The permanent magnet may be any suitable type of permanent magnet, such as a rare earth magnet. In one particular example, the permanent magnet that forms the magnetic feature 1822h of the finger members 1822 may be a samarium cobalt magnet, which may have superior resistance to corrosion as compared to magnets formed of other materials (e.g., neodymium magnets) and may be advantageous for use of the device mount 1820 in high moisture environments, as is contemplated. Further any coating of the finger member 1822 (e.g., those described above for the finger member 422) may further protect the magnetic feature 1822h from corrosion by serving as a moisture (e.g., water) barrier that prevents or limits contact with the magnetic feature 1822h itself.

The base 1824 has a length sufficient to overlap the magnetic feature 1822h and, as referenced above, may be made of steel, another ferromagnetic material, or may include a permanent magnet of suitable orientation to form a magnetic coupling with the magnetic feature 1822h. Alternatively, the magnetic feature 1822h of the finger member 1822 may be an attractor plate or otherwise include a ferromagnetic material, while the base 1824 includes a permanent magnet that forms the magnetic coupling with the magnetic feature 1822h. As described above with respect to the finger member 422 and the magnetic components 1438, 1440, the magnetic feature 1822h is configured to provide sufficient force (e.g., the opening force) to retain the finger member 1822 in the collapsed position, while still allowing the finger member 1822 to be easily (e.g. comfortably) moved by the user to the extended positions, such as by having an opening force of above 0.5 N (e.g., above 1.0 N or above 1.5 N) and below 5 N (e.g., below 4 N, or below 3 N), such as between approximately 1.5 and 2.5N (e.g., approximately 2 N), which may be measured at the distal portion of the finger member 1822 (e.g., at the finger pick) or the location of the magnetic feature 1822h.

As a further alternative, the magnetic feature 1822h of the finger member 1822 may instead magnetically couple to the camera 400, which includes a complementary magnetic feature for forming a magnetic coupling therewith.

Figure 19:
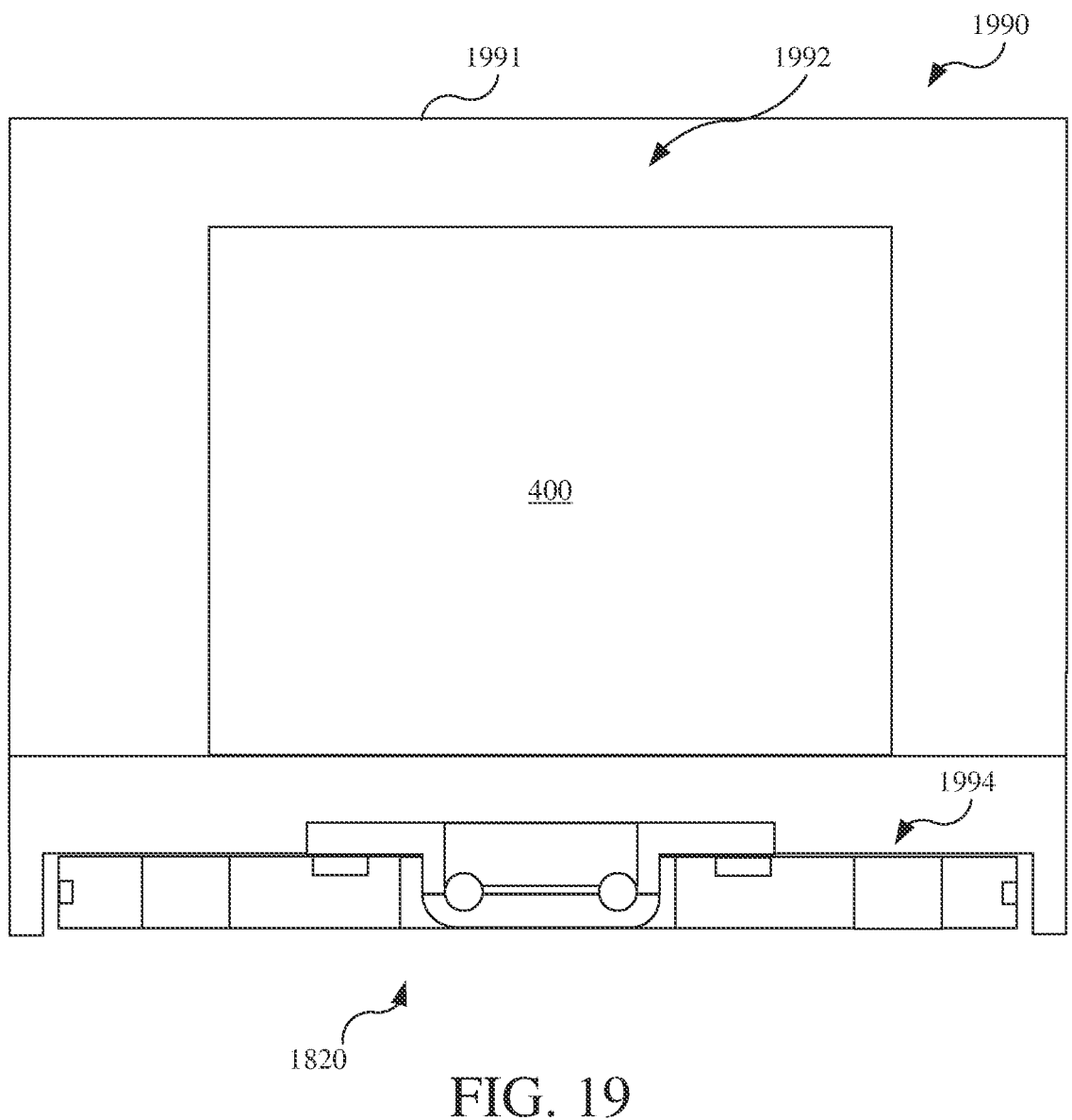
FIG. 19 is a schematic view of a housing with a mount.

Referring to FIG. 19, in addition to each of the device mount 420 and the variations thereof (e.g., 1020, 1820, and variations thereof) being couplable to a camera 400, the device mount 420 may instead or additionally be coupleable to or integrated with a detachable housing 1990 that is adapted to releasably contain a camera therein. Thus, the detachable housing 1990 (or 2090 below) may be considered to form the device mount 420, 1020, 1820, or variations thereof. The detachable housing 1990 (e.g., an open frame or waterproof housing) is configured to couple to the device mount 420 or variations thereof (e.g., the device mount 1820 as shown), or may otherwise include the finger members 422 (or others) that are rotatably coupled thereto. The detachable housing 1990 is configured to couple to or otherwise contain a camera 400 therein, or other image capture device or system 100, 200, 300 therein. As referenced above, the detachable housing 1990 may be a waterproof housing, which includes an outer housing structure that defines a receptacle 1992 for containing the camera 400 therein. For example, the outer housing structure may tightly engage the camera 400 therein, so as to couple the detachable housing 1990 to the camera 400. Alternatively, the detachable housing 1990 may be a frame having one or more open sides to the receptacle 1992. For example, the frame may have an open front face and/or an open rear face that allow a substantial majority of a front side and/or a rear side, respectively of the camera mounted therein to be exposed. Such a frame may be coupled to the camera, for example, by being clamped around left, top, right, and bottom sides of the camera and/or engaging edges of the front and/or rear sides of the camera. The combination of the camera (e.g., 400), the detachable housing (e.g., 1990), and the device mount may be referred to cooperatively as a camera system.

The outer housing structure 1991 may further include a recess 1994 in which the device mount 1820 (as shown) is positioned and that may be configured substantially similar to the recess 414. For example, the finger members 422 may be substantially contained in the recess in the collapsed state (e.g., being flush or recessed relative to the surrounding surfaces of the outer housing structure 1991) and extend therefrom in the extended state.

Figure 20A:
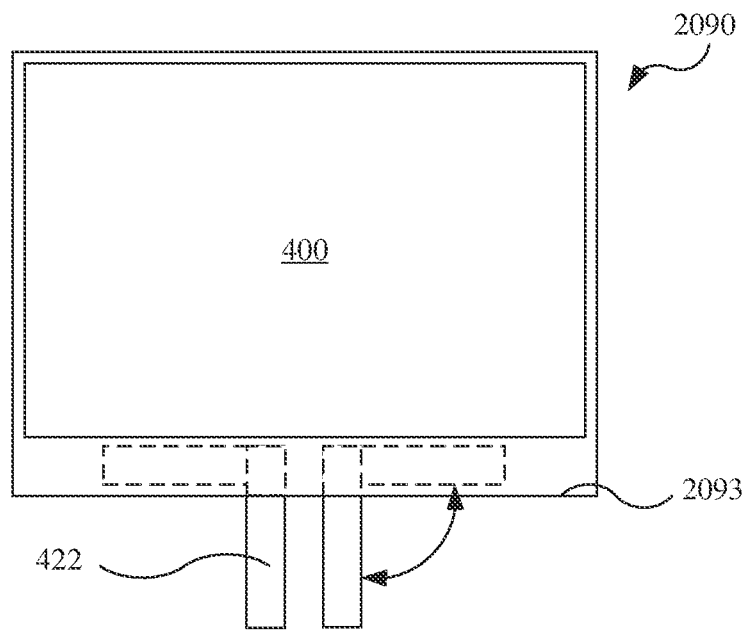
FIG. 20A is a side view of the camera of FIG. 4A with a housing.
Figure 20B:
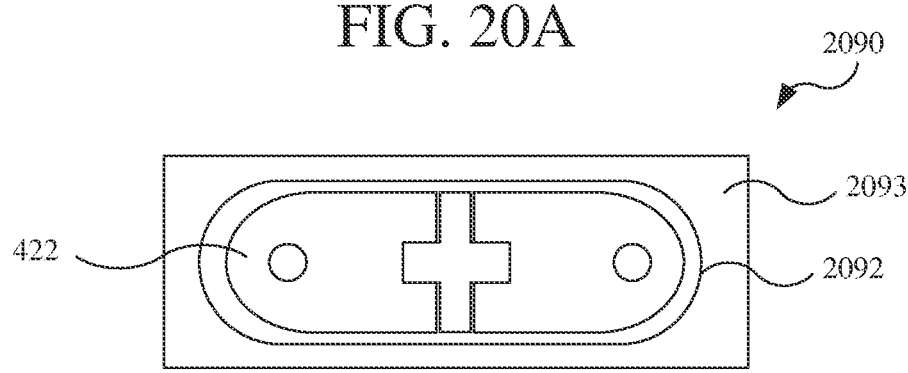
FIG. 20B is a bottom view of the camera of FIG. 4A with the housing of FIG. 20A.
Figure 21:
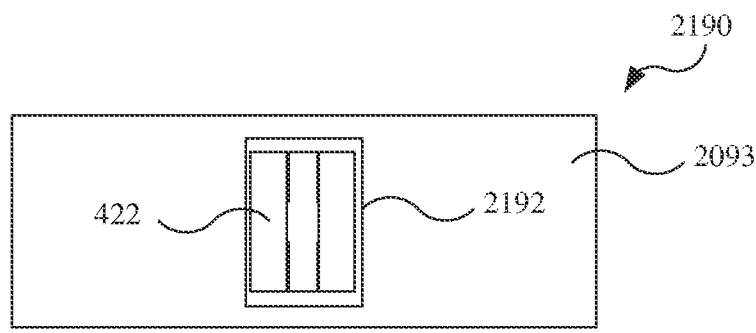
FIG. 21 is a bottom view of a variation of the housing of FIG. 20A.

Referring to FIGS. 20A-20B, a housing 2090 is provided for the camera 400 having the device mount 420 and which allows for simultaneous use of the device mount 420, 1020, 1820 and the housing 2090 with the camera 400. More particularly, the housing 2090 includes an outer housing structure that defines a receptacle (shown; not labeled) for receiving the camera 400 therein and may tightly engage outer surfaces of the camera 400 or otherwise couple to the camera 400. The housing 2090 includes one or more apertures 2092 on a bottom surface 2093 thereof, which allow the finger members 422 (or variations thereof, such as the finger members 1022 or 1822) to protrude through the bottom surface 2093 of the housing 2090 for coupling to the external support 440 (or variation thereof). In one example, the aperture 2092 permits the finger members 422 to be moved (e.g., to be rotated) between the extended and retracted states thereof. For example, as shown in FIG. 20B, the aperture 2092 has a length and a width that are greater than the length and width of the device mount 420 in the extended state (e.g., the cooperative width of the finger members 422). Alternatively, as shown in FIG. 21, a housing 2190 is otherwise configured similar to the housing 2090, but instead of the aperture 2092, instead includes an aperture 2192 that permits the finger members 422 (or variations thereof, such as the finger members 1022 or 1822) to protrude therethrough, while inhibiting movement of the finger members 422 (e.g., rotation thereof) between the extended and retracted states thereof. For example. The aperture has a width that is greater than the distance between the planar surfaces 422a of the finger members 422 in the extended state but less than the width of the device mount 420 in the extended state (e.g., the cooperative width of the finger members 422).

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

In addition to the foregoing, the following embodiments are contemplated by the present application:

1. A camera mount comprising:
two finger members coupleable to a camera, each of the two finger members having opposed planar surfaces that are parallel with and define a thickness of thereof and an aperture extending through the thickness;
characterized in that:
the two finger members are rotatable relative to the camera about different respective axes of rotation between respective extended positions and respective collapsed positions;
wherein when the finger members are in the respective extended positions, the camera mount is in an extended state with the finger members extending parallel with each other in a common direction and the apertures being coaxial with each other; and
wherein when the finger members are in the respective collapsed positions, the camera mount is in a collapsed state.

2. The camera mount according to Embodiment 1, wherein when the camera mount is in the extended state, the finger members are spaced apart to define a slot of the camera mount therebetween.

3. The camera mount according to Embodiment 2, wherein the slot has a width that is approximately equal to the thickness of each of the two finger members.

4. The camera mount according to any of embodiments 1-3, wherein when the camera mount is in the extended state, the two finger members are insertable into parallel slots of a support mount.

5. The camera mount according to Embodiment 4, wherein a central finger member of the support mount is receivable in the slot of the camera mount.

6. The camera mount according to any of embodiments 1-5, wherein when the camera mount is in the collapsed state, the finger members extend away from each other.

7. The camera mount according to Embodiment 6, wherein when the camera mount is in the collapsed state, the finger members extend away from each other in parallel.

8. The camera mount according to any of embodiments 6-7, wherein when the camera mount is in the collapsed state, the two finger members are not simultaneously receivable in parallel slots of a support mount.

9. The camera mount according to any of embodiments 1-8, wherein as the two finger members are rotated from the respective extended positions to the respective collapsed positions, distal portions of the two finger members are moved away from each other.

10. The camera mount according to Embodiment 9, wherein as the two finger members are rotated from the respective extended positions to the respective collapsed positions, the distal portions of the two finger members are moved toward a body of the camera to which the camera mount is coupled.

11. The camera mount according to any of embodiments 1-10, wherein each of the two finger members includes a proximal portion and a distal portion, the axis of rotation thereof extends through the proximal portion, and the aperture extends through the distal portion.

12. The camera mount according to Embodiment 11, wherein the proximal portion is rounded about the axis of rotation thereof.

13. The camera mount according to any of embodiments 11-12, wherein the distal portion is rounded about the aperture.

14. The camera mount according to any of embodiments 1-13, wherein the two finger members are retainable at least one of the respective extended positions or the respective collapsed positions.

15. The camera mount according to Embodiment 14, wherein the two finger members are retainable one or more of magnetically or fictionally.

16. The camera mount according to any of embodiments 14-15, wherein the two finger members are retainable frictionally in the respective extended positions.

17. The camera mount according to any of embodiments 14-16, wherein the two finger members are retainable magnetically in the respective collapsed positions.

18. The camera mount according to Embodiment 17, wherein each of the two finger members includes a magnetic component.

19. The camera mount according to any of embodiments 1-18, further comprising a base;
wherein the two finger members are coupled to the base and rotate relative to the base between the respective extended positions and the respective collapsed positions.

20. The camera mount according to Embodiment 19, wherein the base is coupleable to the camera, such that the two finger members are in turn coupleable and rotatable relative to the camera.

21. The camera mount according to Embodiment 20, wherein the camera mount is in the collapsed state, the camera mount is not removable from the camera.

22. The camera mount according to any of embodiments 1-18, further comprising a housing structure that defines a receptacle for containing the camera and is coupleable to the camera, wherein the two finger members are rotatably coupled to the housing structure, such that the two finger members are in turn coupleable and rotatable relative to the camera.

23. The camera mount according to Embodiment 22, wherein the housing structure includes a recess, the two finger members are substantially contained in the recess when the camera mount is in the collapsed state, and the two finger members extend from the recess when the camera mount is in the extended state.

24. The camera mount according to any of embodiments 22-23, wherein the receptacle is waterproof.

25. The camera mount according to any of embodiments 22-23, wherein the housing structure is a frame having one or more opens sides allowing a substantial majority of a side of the camera in the receptacle to be exposed.

26. A camera comprising:
a body;
a lens coupled to the body; and
the camera mount according to any of embodiments 1-21 coupled to the body.

27. The camera according to Embodiment 26, wherein the body defines a recess that receives the finger members when the finger members are in the respective collapsed positions.

28. The camera according to Embodiment 27, wherein the camera mount includes a base, the two finger members are coupled to the base and rotate relative to the base between the respective extended positions and the respective collapsed positions, and the base is coupled to the camera, such that the two finger members are in turn coupled and rotatable relative to the camera.

29. The camera according to Embodiment 28, wherein the camera includes a bottom side that defines the recess, and when the finger members are in the respective collapsed positions, the finger members are recessed relative to surrounding surfaces of the bottom side.

30. The camera according to Embodiment 29, wherein the base is receivable in the recess in a direction generally opposed to the bottom side.

31. The camera according to Embodiment 26, further comprising internal components that include an image sensor, wherein the body includes a chassis that is formed of a metal material and is a generally rigid structure to which the internal components of the camera are coupled, and the camera mount is coupled to the chassis.

32. The camera according to Embodiment 31, wherein the chassis includes a bottom segment at a bottom side of the camera and an upright segment extending upward from the bottom segment.

33. The camera according to Embodiment 32, wherein the camera mount is coupled to the bottom segment with threaded screws.

34. The camera according to Embodiment 32, further comprising an external housing that defines a compartment that is waterproof and that contains the chassis.

35. The camera according to Embodiment 34, wherein the external housing is formed of a polymer material.

36. The camera according to Embodiment 32, further comprising an external housing component, wherein the chassis and the external housing component cooperatively define a cavity that is waterproof and in which the image sensor is positioned.

37. The camera according to Embodiment 36, wherein the bottom segment is positioned outside the cavity.

What is claimed is:
1. A camera comprising:
a body;
an image sensor;
a lens coupled to the body and which receives and directs light onto the image sensor, the lens having an optical axis extending a direction in which the lens faces;

a first finger member coupled to the body and rotatable about a first axis of rotation that is parallel with the optical axis between a first extended position, in which the first finger member extends externally beyond an exterior envelope of the body, and a first collapsed position, in which the first finger member is located within the exterior envelope of the body; and a second finger member coupled to the body and rotatable about a second axis of rotation that is parallel with the optical axis between a second extended position, in which the second finger member extends externally beyond the exterior envelope of the body, and a second collapsed position, in which the second finger member is located within the exterior envelope of the body;

wherein the first finger member and the second finger member are configured to couple the camera to an external mount when in the first extended position and the second extended position, respectively.

2. The camera according to claim 1, wherein the first finger member and the second finger member are parallel with each other when in the first extended position and the second extended position, respectively;

wherein the first axis of rotation and the second axis of rotation are in a static orientation relative to the body;

wherein the image sensor is positioned in the body;

wherein the body includes front, rear, left, right, top, and bottom sides, the lens is coupled to the front side, and the first finger member and the second finger member are coupled to the bottom side; and wherein the lens faces a forward direction, the first finger member extends downward from a bottom side of the body when in the first extended position, and the second finger extends downward from the bottom side of the body when in the extended position.

3. The camera according to claim 1, wherein the lens faces a forward direction, the first finger member extends downward from a bottom side of the body when in the first extended position, and the second finger extends downward from the bottom side of the body when in the extended position.

4. The camera according to claim 3, wherein the first finger member and the second finger member are parallel with each other when in the first extended position and the second extended position, respectively.

5. The camera according to claim 1, wherein the first axis of rotation and the second axis of rotation are in a static orientation relative to the body.

6. The camera according to claim 1, wherein the image sensor is positioned in the body.

7. The camera according to claim 1, wherein the body includes front, rear, left, right, top, and bottom sides, the lens is coupled to the front side, and the first finger member and the second finger member are coupled to the bottom side.

8. The camera according to claim 7, further comprising another image sensor, and another lens coupled to the rear side and having another optical axis that is parallel with the optical axis.

9. A camera comprising:
a body having a plurality of sides;
a lens coupled to the body and which receives and directs light; and
a camera mount coupled directly to the body, the camera mount including finger members rotatable relative to one of the sides between extended positions and collapsed positions;
wherein the one of the sides defines a recess that receives the finger members in the collapsed positions to be flush with or recessed relative to surrounding surfaces of the one of the sides; and
wherein the finger members are configured to couple the camera to an external mount when in the extended positions.

10. The camera according to claim 9, further comprising hinge pins that form axes of rotation, wherein each of the finger members is coupled to one of the hinge pins, and each of the hinge pins is positioned entirely within the recess;
wherein the surrounding surfaces of the one side define a flat surface that allows the camera to rest in a stable manner on a flat support surface;
wherein each of the finger members has a distal end that is rounded, the recess includes rounded ends that each correspond to the distal end of one of the finger members, and when in the collapsed positions, a gap is formed between the distal end of each of the finger members and the rounded end of the recess corresponding thereto; and
wherein the one side is a bottom side of the body.

11. The camera according to claim 9, wherein the surrounding surfaces of the one side define a flat surface that allows the camera to rest in a stable manner on a flat support surface.

12. The camera according to claim 9, wherein the finger members are rotatable about axes of rotation that extend through the recess.

13. The camera according to claim 12, further comprising hinge pins that form the axes of rotation, wherein each of the finger members is coupled to one of the hinge pins, and each of the hinge pins is positioned entirely within the recess.

14. The camera according to claim 9, wherein each of the finger members has a distal end that is rounded, the recess includes rounded ends that each correspond to the distal end of one of the finger members, and when in the collapsed positions, a gap is formed between the distal end of each of the finger members and the rounded end of the recess corresponding thereto.

15. The camera according to claim 9, wherein the one side is a bottom side of the body.

16. A camera mount comprising:
a base including:
a coupling portion defining an exterior surface and configured to couple to a camera; and
a hinge portion coupled to and protruding from the coupling portion;
a first finger member and a first hinge pin by which the first finger member is rotatably coupled to the hinge portion of the base; and
a second finger member and a second hinge pin by which the second finger member is rotatably coupled to the hinge portion of the base, wherein the first finger member and the second finger member are movable about axes extending in parallel relation to the exterior surface between extended positions and collapsed positions, the first finger member and the second finger member configured to couple the camera to an external mount when in the extended positions.

17. The camera mount according to claim 16, wherein the first finger member includes a first recess, the second finger member includes a second recess, and the hinge portion includes a first outwardly extending segment that is received in the first recess of the first finger member and through which the first hinge pin extends and also includes a second outwardly extending segment that is received in the second recess of the second finger member and through which the second hinge pin extends.

18. The camera mount according to claim 17, wherein the hinge portion further includes a central segment positioned between the first outwardly extending segment and the second outwardly extending segment to be engaged by the first finger member and the second finger member to space apart the first finger member and the second finger member when in the extended positions.

19. The camera according to claim 16, further comprising a friction pad that engages the first hinge pin and the second hinge pin to retain the first finger member and the second finger member rotationally relative to the base.

20. The camera according to claim 19, wherein the friction pad is pressed against the first hinge pin and the second hinge pin by a body of the camera to which the camera mount is coupled.

* * * * *

UNITED STATES PATENT AND TRADEMARK OFFICE
CERTIFICATE OF CORRECTION

PATENT NO. : 11,662,651 B2
APPLICATION NO. : 17/181163
DATED : May 30, 2023
INVENTOR(S) : Nicholas Vitale et al.

It is certified that error appears in the above-identified patent and that said Letters Patent is hereby corrected as shown below:

On the Title Page

On Line 2 of the Abstract item (57):
Replace "two finger members movable relative to the body"
With -- two finger members are movable relative to the body --

In the Claims

Claim 10, Column 34, Line 10:
Replace "wherein the surrounding surfaces of the one side"
With -- wherein the surrounding surfaces of the one of the sides --

Claim 10, Column 34, Line 20:
Replace "wherein the one side is a bottom side of the body."
With -- wherein the one of the sides is a bottom side of the body --

Claim 11, Column 34, Line 22:
Replace "surfaces of the one side"
With -- surfaces of the one of the sides --

Claim 15, Column 34, Line 39:
Replace "wherein the one side"
With -- wherein the one of the sides --

Signed and Sealed this
Thirtieth Day of January, 2024

Katherine Kelly Vidal
*Director of the United States Patent and Trademark Office*